US012524557B2

(12) United States Patent
Nicola et al.

(10) Patent No.: US 12,524,557 B2
(45) Date of Patent: Jan. 13, 2026

(54) DATA TRANSMISSION BETWEEN DEVICES

(71) Applicant: SYNAPTRAIN TECHNOLOGIES INC., Calgary (CA)

(72) Inventors: Wilten Nicola, Calgary (CA); Aaron Gruber, Bragg Creek (CA)

(73) Assignee: Synaptrain Technologies Inc., Calgary (CA)

( * ) Notice: Subject to any disclaimer, the term of this patent is extended or adjusted under 35 U.S.C. 154(b) by 0 days.

(21) Appl. No.: 18/611,688

(22) Filed: Mar. 20, 2024

(65) Prior Publication Data
US 2024/0303352 A1 Sep. 12, 2024

Related U.S. Application Data

(63) Continuation-in-part of application No. PCT/CA2023/051323, filed on Oct. 5, 2023.

(30) Foreign Application Priority Data

Oct. 5, 2022 (CA) ................................ CA 3178441

(51) Int. Cl.
*G06F 21/60* (2013.01)
*G06F 21/62* (2013.01)

(52) U.S. Cl.
CPC .......... *G06F 21/606* (2013.01); *G06F 21/602* (2013.01); *G06F 21/6209* (2013.01)

(58) Field of Classification Search
CPC .. G06F 21/606; G06F 21/602; G06F 21/6209; H04L 9/0891; H04L 9/50; H04L 12/12; H04L 67/2869
See application file for complete search history.

(56) References Cited

U.S. PATENT DOCUMENTS

| 4,972,473 | A | 11/1990 | Ejiri et al. |
|---|---|---|---|
| 5,048,086 | A | 9/1991 | Bianco et al. |
| 5,365,589 | A | 11/1994 | Gutowitz |
| 5,423,001 | A | 6/1995 | Ueda |
| 5,740,326 | A | 4/1998 | Boulet et al. |
| 6,085,178 | A | 7/2000 | Bigus et al. |
| 6,788,787 | B1 | 9/2004 | Shono et al. |
| 6,898,616 | B2 | 5/2005 | Hirafuji |
| 7,496,548 | B1 | 2/2009 | Ershov |
| 7,697,683 | B2 | 4/2010 | Katagi et al. |
| 9,020,870 | B1 | 4/2015 | Daily et al. |
| 2003/0007635 | A1 | 1/2003 | Li et al. |
| 2003/0147530 | A1 | 8/2003 | Amano et al. |
| 2010/0220827 | A1 | 9/2010 | Yanagidate |

(Continued)

FOREIGN PATENT DOCUMENTS

| HR | P980607 A2 | 6/2003 |
|---|---|---|
| UA | 10953 U | 12/2005 |

(Continued)

OTHER PUBLICATIONS

Frady, et al., "Neuromorphic Nearest-Neighbor Search Using Intel's Pohoiki Springs," Neural and Evolutionary Computing, arXiv:2004, No. 12691, 2020, 9 pages.

(Continued)

*Primary Examiner* — Sangseok Park
(74) *Attorney, Agent, or Firm* — Lee & Hayes, P.C.

(57) ABSTRACT

This disclosure relates generally to data transmission between devices.

29 Claims, 15 Drawing Sheets

(56) References Cited

U.S. PATENT DOCUMENTS

| | | |
|---|---|---|
| 2015/0215127 A1 | 7/2015 | Sabottke |
| 2016/0094336 A1 | 3/2016 | Schenzinger et al. |
| 2016/0358066 A1* | 12/2016 | Alvarez-Icaza Rivera ............... G06N 3/063 |
| 2017/0337473 A1 | 11/2017 | Bernert et al. |
| 2019/0377738 A1 | 12/2019 | Huang et al. |
| 2019/0394636 A1 | 12/2019 | Kilian et al. |
| 2020/0272884 A1* | 8/2020 | Paul ................. G06N 3/049 |
| 2020/0304281 A1 | 9/2020 | Takahashi |
| 2020/0304284 A1 | 9/2020 | Markram et al. |
| 2020/0304285 A1 | 9/2020 | Hess et al. |
| 2020/0311251 A1 | 10/2020 | Underwood et al. |
| 2021/0110269 A1* | 4/2021 | Gobriel ................. G06N 3/048 |
| 2021/0203430 A1 | 7/2021 | Sorimachi |
| 2022/0036156 A1 | 2/2022 | Brutsche et al. |
| 2022/0038375 A1* | 2/2022 | Bielby ................. G06N 3/049 |
| 2022/0058321 A1 | 2/2022 | Xie et al. |
| 2023/0043618 A1 | 2/2023 | Sakemi |
| 2023/0045589 A1 | 2/2023 | Sakemi et al. |
| 2024/0037210 A1* | 2/2024 | R. ................. G06F 21/602 |

FOREIGN PATENT DOCUMENTS

| | | |
|---|---|---|
| UA | 10975 U | 12/2005 |
| UA | 10987 U | 12/2005 |
| WO | WO0247272 A2 | 6/2002 |

OTHER PUBLICATIONS

PCT Search Report & Written Opinion for Application No. PCT/CA2023/051323 , mailed on Jan. 22, 2024, 15 pgs.

* cited by examiner

| Spikes in Spike Store 119 | | Bits in Data Store 121 | Spikes in Modified Spike Store 122 | |
|---|---|---|---|---|
| Neuron | Propagation Stage | | Neuron | Propagation Stage |
| 514 | 32 | 1 | 514 | 32 |
| 6302 | 55 | 0 | | |
| 2105 | 69 | 1 | 2105 | 69 |
| 3099 | 87 | 0 | | |
| 4152 | 92 | 1 | 4152 | 92 |
| 2002 | 112 | 1 | 2002 | 112 |
| 8452 | 151 | 0 | | |
| 6067 | 160 | 0 | | |
| 862 | 181 | 1 | 862 | 181 |
| 3554 | 198 | 0 | | |

| Spikes in Spike Store 119 | | Amplitude of Associated Basis Function | Spikes in Modified Spike Store 122 | |
|---|---|---|---|---|
| Neuron | Propagation Stage | | Neuron | Propagation Stage |
| 514 | 32 | 13 | 514 | 45 |
| 6302 | 55 | 33 | 6302 | 88 |
| 2105 | 69 | 29 | 2105 | 98 |
| 3099 | 87 | 10 | 3099 | 97 |
| 4152 | 92 | 0 | 4152 | 92 |
| 2002 | 112 | 8 | 2002 | 120 |
| 8452 | 151 | 38 | 8452 | 189 |
| 6067 | 160 | 37 | 6067 | 197 |
| 862 | 181 | 3 | 862 | 184 |
| 3554 | 198 | 16 | 3554 | 214 |

FIG. 8

| Spikes in Spike Store 119 | | Amplitude of Associated Basis Function | Spikes in Modified Spike Store 122 | |
|---|---|---|---|---|
| Neuron | Propagation Stage | | Neuron | Propagation Stage |
| 514 | 32 | 13 | 527 | 32 |
| 6302 | 55 | 33 | 6335 | 55 |
| 2105 | 69 | 29 | 2134 | 69 |
| 3099 | 87 | 10 | 3109 | 87 |
| 4152 | 92 | 0 | 4152 | 92 |
| 2002 | 112 | 8 | 2010 | 112 |
| 8452 | 151 | 38 | 8490 | 151 |
| 6067 | 160 | 37 | 6104 | 160 |
| 862 | 181 | 3 | 865 | 181 |
| 3554 | 198 | 16 | 3570 | 198 |

FIG. 9

| Spikes in Spike Store 119 | | Bits | Shift | Spikes in Modified Spike Store 122 | |
|---|---|---|---|---|---|
| Neuron | Propagation Stage | | | Neuron | Propagation Stage |
| 514 | 32 | 0110 | 6 | 514 | 38 |
| 6302 | 55 | 1001 | 9 | 6302 | 64 |
| 2105 | 69 | 0001 | 1 | 2105 | 70 |
| 3099 | 87 | 1100 | 12 | 3099 | 99 |
| 4152 | 92 | 0000 | 0 | 4152 | 92 |
| 2002 | 112 | 1011 | 11 | 2002 | 123 |
| 8452 | 151 | 0010 | 2 | 8452 | 153 |
| 6067 | 160 | 0101 | 5 | 6067 | 165 |
| 862 | 181 | 1001 | 9 | 862 | 190 |
| 3554 | 198 | 0010 | 2 | 3554 | 200 |

| Spikes in Spike Store 119 | | Bits | Shift | Spikes in Modified Spike Store 122 | |
|---|---|---|---|---|---|
| Neuron | Propagation Stage | | | Neuron | Propagation Stage |
| 514 | 32 | 0110 | 6 | 520 | 32 |
| 6302 | 55 | 1001 | 9 | 6311 | 55 |
| 2105 | 69 | 0001 | 1 | 2106 | 69 |
| 3099 | 87 | 1100 | 12 | 3111 | 87 |
| 4152 | 92 | 0000 | 0 | 4152 | 92 |
| 2002 | 112 | 1011 | 11 | 2013 | 112 |
| 8452 | 151 | 0010 | 2 | 8454 | 151 |
| 6067 | 160 | 0101 | 5 | 6072 | 160 |
| 862 | 181 | 1001 | 9 | 871 | 181 |
| 3554 | 198 | 0010 | 2 | 3556 | 198 |

| Spikes in Spike Store 162 | | Spikes in Modified Spike Store 164 | | Bits in Data Store 169 |
|---|---|---|---|---|
| Neuron | Propagation Stage | Neuron | Propagation Stage | |
| 514 | 32 | 514 | 32 | 1 |
| 6302 | 55 | | | 0 |
| 2105 | 69 | 2105 | 69 | 1 |
| 3099 | 87 | | | 0 |
| 4152 | 92 | 4152 | 92 | 1 |
| 2002 | 112 | 2002 | 112 | 1 |
| 8452 | 151 | | | 0 |
| 6067 | 160 | | | 0 |
| 862 | 181 | 862 | 181 | 1 |
| 3554 | 198 | | | 0 |

FIG. 14

| Spikes in Spike Store 162 | | Spikes in Modified Spike Store 164 | | Bits in Data Store 169 |
|---|---|---|---|---|
| Neuron | Propagation Stage | Neuron | Propagation Stage | |
| 514 | 32 | 514 | 32 | |
| | | 3084 | 46 | 1 |
| 6302 | 55 | | | 0 |
| 2105 | 69 | 2105 | 69 | |
| | | 2907 | 79 | 1 |
| 3099 | 87 | | | 0 |
| 4152 | 92 | 4152 | 92 | |
| | | 3687 | 98 | 1 |
| 2002 | 112 | 2002 | 112 | |
| | | 977 | 147 | 1 |
| 8452 | 151 | | | 0 |
| 6067 | 160 | | | 0 |
| 862 | 181 | 862 | 181 | |
| | | 4803 | 195 | 1 |
| 3554 | 198 | | | 0 |

FIG. 15

| Spikes in Spike Store 162 | | Spikes in Modified Spike Store 164 | | Amplitude of Associated Basis Function |
|---|---|---|---|---|
| Neuron | Propagation Stage | Neuron | Propagation Stage | |
| 514 | 32 | 514 | 45 | 13 |
| 6302 | 55 | 6302 | 88 | 33 |
| 2105 | 69 | 2105 | 98 | 29 |
| 3099 | 87 | 3099 | 97 | 10 |
| 4152 | 92 | 4152 | 92 | 0 |
| 2002 | 112 | 2002 | 120 | 8 |
| 8452 | 151 | 8452 | 189 | 38 |
| 6067 | 160 | 6067 | 197 | 37 |
| 862 | 181 | 862 | 184 | 3 |
| 3554 | 198 | 3554 | 214 | 16 |

FIG. 16

| Spikes in Spike Store 162 | | Spikes in Modified Spike Store 164 | | Shift | Bits |
|---|---|---|---|---|---|
| Neuron | Propagation Stage | Neuron | Propagation Stage | | |
| 514 | 32 | 520 | 32 | 6 | 0110 |
| 6302 | 55 | 6311 | 55 | 9 | 1001 |
| 2105 | 69 | 2106 | 69 | 1 | 0001 |
| 3099 | 87 | 3111 | 87 | 12 | 1100 |
| 4152 | 92 | 4152 | 92 | 0 | 0000 |
| 2002 | 112 | 2013 | 112 | 11 | 1011 |
| 8452 | 151 | 8454 | 151 | 2 | 0010 |
| 6067 | 160 | 6072 | 160 | 5 | 0101 |
| 862 | 181 | 871 | 181 | 9 | 1001 |
| 3554 | 198 | 3556 | 198 | 2 | 0010 |

FIG. 17

DATA TRANSMISSION BETWEEN DEVICES

RELATED APPLICATION

This application is a continuation-in-part of PCT application no. PCT/CA2023/051323 filed Oct. 5, 2023, which claims the benefit of, and priority to, Canadian patent application no. 3,178,441 filed Oct. 5, 2022. The entire contents of PCT application no. PCT/CA2023/051323 and Canadian patent application no. 3,178,441 are incorporated by reference herein.

FIELD

This disclosure relates generally to data transmission between devices.

RELATED ART

Known methods of data transmission between devices may not be secure.

SUMMARY

According to at least one embodiment, a data-transmission method comprises: causing at least one data-receiving device to receive at least one data-transmission signal from at least one data-transmitting device implementing a data-transmission dynamical system; and causing the at least one data-receiving device to compare (a) at least some of transmission data transmitted by the at least one data-transmission signal to (b) at least some output of a data-receiving dynamical system implemented by the at least one data-receiving device.

According to at least one embodiment, a data-transmission method comprises: causing at least one data-transmitting device to generate transmission data according to, at least, at least some output of a data-transmission dynamical system implemented by the at least one data-transmitting device; and causing the at least one data-transmitting device to transmit, to at least one data-receiving device implementing a data-receiving dynamical system, at least one data-transmission signal transmitting at least the transmission data.

According to at least one embodiment, a method of producing a cryptographic hash output comprises: causing at least one device to receive at least one input signal encoding at least one input value, wherein the at least one device implements a dynamical system comprising a plurality of node values, each node value of the plurality of node values modifiable according to at least the at least one input value; causing the at least one device to identify at least a plurality of dynamical-system events, each event of the plurality of dynamical-system events associated with a respective node value of the plurality of node values and with a respective propagation stage of the dynamical system when the node value satisfied a discretizing criterion; and causing the at least one device to produce at least one output signal identifying at least the plurality of dynamical-system events.

According to at least one embodiment, a data-transmission apparatus comprises at least one data-receiving device configured to, at least: receive at least one data-transmission signal from at least one data-transmitting device configured to implement a data-transmission dynamical system; and compare (a) at least some of transmission data transmitted by the at least one data-transmission signal to (b) at least some output of a data-receiving dynamical system implemented by the at least one data-receiving device.

According to at least one embodiment, a data-transmission apparatus comprises at least one data-transmitting device configured to, at least: generate transmission data according to, at least, at least some output of a data-transmission dynamical system implemented by the at least one data-transmitting device; and transmit, to at least one data-receiving device configured to implement a data-receiving dynamical system, at least one data-transmission signal transmitting at least the transmission data.

According to at least one embodiment, an apparatus for producing a cryptographic hash output comprises at least one device configured to, at least: receive at least one input signal encoding at least one input value, wherein the at least one device is configured to implement a dynamical system comprising a plurality of node values, each node value of the plurality of node values modifiable according to at least the at least one input value; identify at least a plurality of dynamical-system events, each event of the plurality of dynamical-system events associated with a respective node value of the plurality of node values and with a respective propagation stage of the dynamical system when the node value satisfied a discretizing criterion; and produce at least one output signal identifying at least the plurality of dynamical-system events.

Other aspects and features will become apparent to those ordinarily skilled in the art upon review of the following description of illustrative embodiments in conjunction with the accompanying figures.

BRIEF DESCRIPTION OF THE DRAWINGS

FIG. 8 schematically illustrates an example of operation of the program codes of FIG. 7.

FIG. 9 schematically illustrates an example of operation of an alternative to the program codes of FIG. 7.

FIG. 14 schematically illustrates an example of operation of the program codes of FIG. 13.

FIG. 15 schematically illustrates an example of operation of an alternative to the program codes of FIG. 13.

FIGS. 16 and 17 schematically illustrate examples of operation of other example program codes of the program memory of the data-storage device of the data-receiving device of the data-transmission system of FIG. 1.

DETAILED DESCRIPTION

Figure 1:
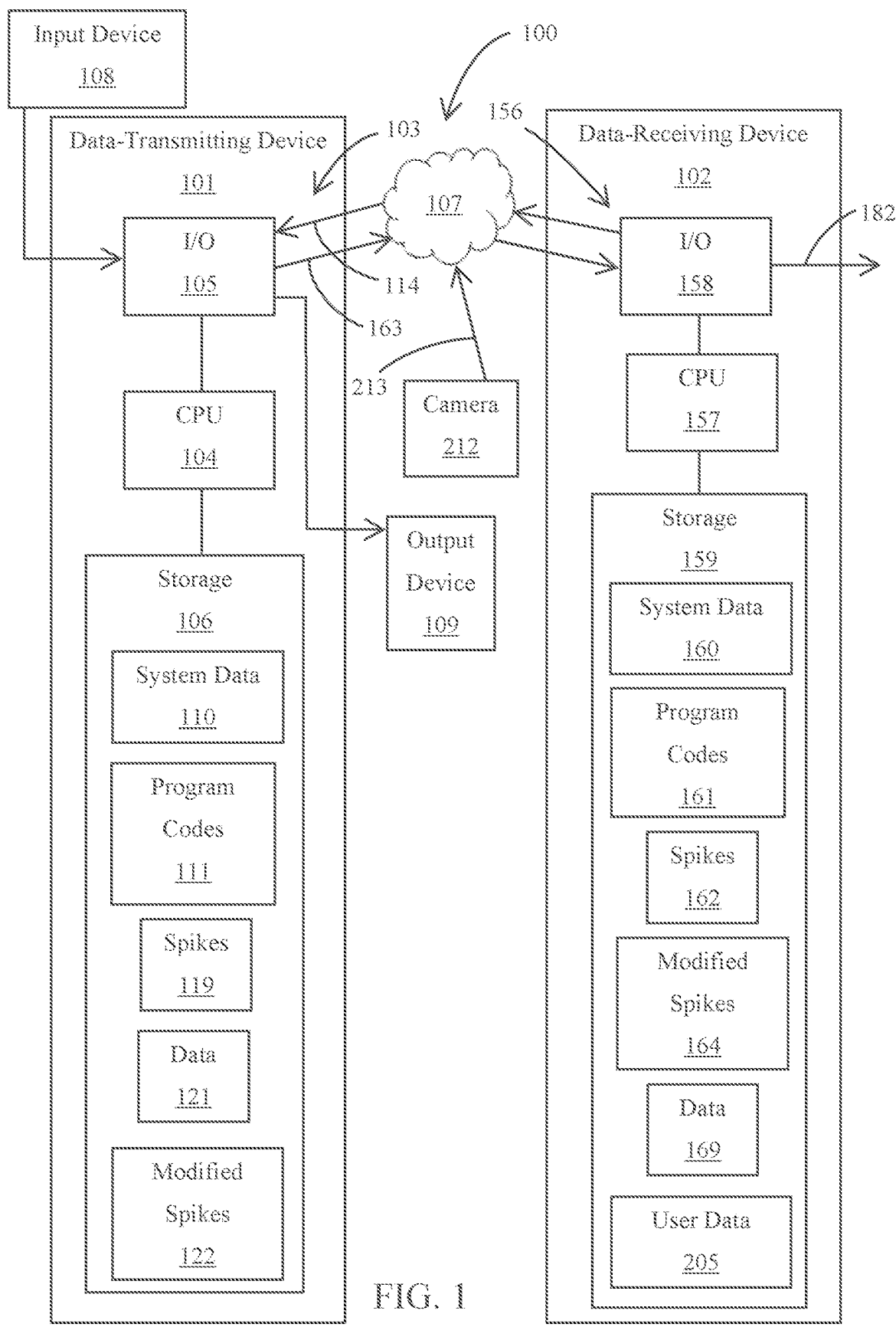
FIG. 1 schematically illustrates a data-transmission system according to one embodiment.

Referring to FIG. 1, a data-transmission system according to one embodiment is shown generally at 100 and includes a data-transmitting device 101 and a data-receiving device 102. The system 100 is an example only, and alternative embodiments (including alternative embodiments described herein) may differ.

Herein, "data" may refer to any type of information that may be coded, uncoded, or both in one or more signals. In general, a "signal" herein may be electrical, optical, electromagnetic, or otherwise non-transitory.

Also herein, "data-transmitting" and "data-receiving" are simply descriptions of possible functions of devices and do not require any devices actually to be transmitting or receiving at all times or at any times. In other words, a device that is described herein as "data-transmitting" and "data-receiving" need not be transmitting or receiving data at all times or at any times. Rather, a "data-transmitting device" herein includes a device that may transmit data even when not actually transmitting data, and a "data-receiving device" herein includes a device that may receive data even when not actually receiving data.

Data-Transmitting Device

The data-transmitting device 101 is a computing device and may, in various embodiments, include a user computing device, a server computing device, a personal computer, a laptop computer, a tablet computer, a smartphone, a smart watch, a network node for a computer network, a router for a computer network, a mobile device, a telephone, or one more other devices including one or more other computing devices as described herein, or a combination of two or more thereof.

The data-transmitting device 101 includes a processor circuit shown generally at 103 and including a central processing unit (CPU) 104. However, alternative embodiments may include one or more alternatives to the CPU 104, such as one or more microprocessors, one or more analog circuits, one or more configurable logic blocks, one or more application-specific integrated circuits (ASICs), or one or more field programmable gate arrays (FPGAs), for example. The processor circuit 103 also includes an input/output (I/O) interface 105 and a data-storage device 106 in communication with the CPU 104.

The I/O interface 105 may include various signal interfaces, analog-to-digital converters (ADCs), receivers, transmitters, and/or other circuitry to receive, produce, and transmit signals as described herein, for example. In general, signals as described herein may include one or more radio signals, one or more optical signals, one or more electronic signals, or a combination of two or more thereof. In the embodiment shown, the I/O interface 105 is operable to transmit signals to, and receive signals from, a computer network 107 using one or more networks such as the Internet, one or more wired networks, one or more wireless networks, or a combination of two or more thereof, for example. However, alternative embodiments may differ and may, for example, transmit signals using radio signals.

The I/O interface 105 may be operable to receive signals from one or more input devices, such as an input device 108 that may include a keyboard, a mouse, a touchscreen, a microphone, another user-input device, another input device, or a combination of two or more thereof to receive inputs, such as user inputs from a user of the data-transmitting device 101 for example. In embodiments in which data-transmitting device 101 is a router or other network node for a computer network, the I/O interface 105 may be operable to receive signals from the computer network, transmit signals to the computer network, or both. Also, in embodiments in which data-transmitting device 101 is a camera, the input device 108 may include an image sensor for the camera. Also, the I/O interface 105 may be operable to transmit signals to one or more output devices such as an output device 109 that may include a display screen, an audio speaker, a projector, another user-output device, another output device, or a combination of two or more thereof to control one or more such output devices to produce output, for example for the user of the data-transmitting device 101. The input device 108 and the output device 109 are shown as separate devices, but may be collectively one device such as a touchscreen or a combined microphone and audio speaker, for example. Also, the input device 108 and the output device 109 are shown in FIG. 1 as separate from the data-transmitting device 101, but in alternative embodiments one or more input devices, one or more output devices, or both may be part of the data-transmitting device 101.

The data-storage device 106 may include one or more of the same or different computer-readable and/or computer-writable data-storage media, which in various embodiments may include one or more of a read-only memory (ROM), a random access memory (RAM), a hard disc drive (HDD), a solid-state drive (SSD), and other computer-readable and/or computer-writable data-storage media.

The processor circuit 103 is an example only, and alternative embodiment may differ. For example, alternative embodiments may include more, fewer, or different components. Also, in alternative embodiments, components described herein may be combined or separated into separate components. Alternative embodiments may include one or more alternatives to components as described herein. Further, an alternative to the data-transmitting device 101 may include multiple devices that collectively function as a data-transmitting device.

The data-storage device 106 includes a system-data store 110. In general, stores described herein describe data that may be stored on one or more computer-readable and/or computer-writable data-storage media, but stores described herein are not necessarily limited to any manner of data storage. For example, data of a store as described herein are not necessarily stored together.

The system-data store 110 may store data defining a data-transmission dynamical system that may be implemented by the data-transmitting device 101 and data indicating a state for the data-transmission dynamical system that may be implemented by the data-transmitting device 101.

In general, a dynamical system is a system that varies either in actual time or by propagation in stages that are not necessarily associated with actual time. In general, at any propagation stage (which may be an actual time or another measure of propagation), a dynamical system has a state that may be represented by various numbers, and such a state may vary with propagation of the dynamical system. Also, in general, such a state of a dynamical system at one stage of propagation depends at least on part on such a state of the dynamical system at a previous stage of propagation. Also, in general, a dynamical system may produce an output that may vary with propagation of the dynamical system.

The data-transmission dynamical system implemented by the data-transmitting device 101 is an artificial spiking neural network, although alternative embodiments may differ.

Artificial Spiking Neural Network

In some embodiments, an artificial spiking neural network may simulate N artificial neurons, each having a respective node value (or simulated voltage) $v_i$ (i={1, 2, 3, ..., N}) that may be modified during propagation of the artificial spiking neural network according to N input values $r_j$ (j={1, 2, 3, ..., N}) and according to weights $w_{ij}$. In some embodiments, $$E(w_{ij}) = 0 \quad \text{(Eq. 1)}$$

where E is an expectation operator, such that the weights $w_{ij}$ are effectively random. Also, in some embodiments, $$E(w_{ij}^2) = 0(N^{-1}) \quad \text{(Eq. 2)}$$

where O indicates an order of approximation, such that variance of the weights $w_{ij}$ scales with size of the artificial spiking neural network. However, Equations 1 and 2 are examples only. In some embodiments, weights $w_{ij}$ may be randomly generated, pseudorandomly generated, or otherwise, and weights may not necessarily be according to Equation 1, Equation 2, or both.

In some embodiments, an artificial spiking neural network may implement a leaky-integrate-and-fire model. For example, in some embodiments, during propagation of the artificial spiking neural network, a node value of an artificial neuron i={1, 2, 3, ..., N} may be modified from $v_i$ (at a current stage of propagation of the artificial spiking neural network) to $v_i'$ (at an immediately subsequent stage of propagation of the artificial spiking neural network) according to $$\tau_m v_i' = -v_i + I + \sum_{j=1}^{N} w_{ij} r_j \quad \text{(Eq. 3)}$$

where $\tau_m$ is a decay constant, I is a constant, and $r_j$ is the jth of the N input values at the current stage of propagation of the artificial spiking neural network.

Further, spikes may be generated during propagation of the artificial spiking neural network. For example, when a node value $v_j$ of an artificial neuron j={1, 2, 3, ..., N} equals or exceeds a constant threshold value $T_j$ of the artificial neuron, a kth spike of the jth artificial neuron may be generated by the jth artificial neuron at a propagation stage $t_{jk}$ of the artificial spiking neural network.

Spikes generated during propagation of the artificial spiking neural network are examples of dynamical-system events of a dynamical system. In general, dynamical-system events of a dynamical system may be in response to one or more discretizing criteria of the dynamical system. The threshold value $T_j$ are examples of discretizing criteria of the artificial spiking neural network.

At the propagation stage $t_{jk}$ of the artificial spiking neural network, when the jth artificial neuron generates the kth spike of the jth artificial neuron, the node value $v_j$ of the jth artificial neuron may be reset to a constant starting node value $s_j$ of the jth artificial neuron.

The kth spike of the ith artificial neuron may be represented by data (such as an ordered pair, for example) representing both the artificial neuron that generated the spike (for example, an identifier (i={1, 2, 3, ..., N}) identifying the artificial neuron that generated the spike) and a propagation stage $t_{jk}$ of the artificial spiking neural network when the artificial neuron generated the spike. Such an ordered pair may be denoted as (i, $t_{jk}$), for example.

In some embodiments, the input values $r_j$ may also be modified during propagation of the artificial spiking neural network from $r_j$ (at a current stage of propagation of the artificial spiking neural network) to $r_j'$ (at an immediately subsequent stage of propagation of the artificial spiking neural network) according to $$\tau_s r_j' = -r_j + \sum_{t_{jk} < t} \delta(t - t_{jk}) \quad \text{(Eq. 4)}$$

where $\tau_s$ is a decay constant, $\delta$ is the Dirac delta function, t is a current stage of propagation of the artificial spiking neural network, and $\sum_{t_{jk} < t}$ is a sum of all of the spike times $t_{jk} < t$ of the jth artificial neuron so that $\delta(t - t_{jk})$ changes $r_j$ when the jth artificial neuron generates the kth spike of the jth artificial neuron. As a result, each of the input values $r_j$ may decay or otherwise change during propagation of the artificial spiking neural network but may also be incremented or otherwise changed in response to a spike of the jth artificial neuron of the artificial spiking neural network.

Equations 1-4 are examples only, and alternative embodiments may implement other spiking neural networks or other dynamical systems. Such other dynamical systems may generate other dynamical-system events, for example according to one or more other discretizing criteria.

In some embodiments, the weights $w_{ij}$ and the constants $\tau_s$, $\tau_m$, I, $T_j$, and $s_j$ as described above may not change as a result of propagation of the artificial spiking neural network but may change for other reasons, for example to update or vary the artificial spiking neural network. Therefore, a constant as described herein (such as the constants $\tau_s$, $\tau_m$, I, $T_j$, and $s_j$ as described above) is not necessarily to a value that never changes, but may instead be a value that does not change as a result of propagation of the artificial spiking neural network but that may nevertheless change for other reasons. In other words, in some embodiments, the plurality of data-transmission weights remain constant during implementation of the data-transmission dynamical system, and the plurality of data-receiving weights remain constant during implementation of the data-receiving dynamical system.

The system-data store 110 may store data representing the node values $v_i$ and of the input values $r_j$ as described above and as those values change during propagation of the data-transmission dynamical system implemented by the data-transmitting device 101. The system-data store 110 may also store data representing the weights $w_{ij}$ and of the constants $\tau_s$, $\tau_m$, I, $T_j$, and $s_j$ as described above and as those values may or may not change over time.

In some embodiments, the weights $w_{ij}$ as described above may be important for security of data transmission. Therefore, in some embodiments, data representing the weights $w_{ij}$ may be stored in a manner that is intended to be secure. For example, data representing the weights $w_{ij}$ in the system-data store 110 may be encrypted such that the data representing the weights $w_{ij}$ in the system-data store 110 may only be decrypted in response to entering a correct password using an input device such as the input device 108. In other embodiments, data representing the weights $w_{ij}$ may be in a separate data-storage device that is detachable from the remainder of the data-transmitting device 101. In some embodiments, values of the weights $w_{ij}$ may be encoded in a plurality of resistors or other circuit elements. In such embodiments, the resistors or other circuit elements may allow the processor circuit 103 (or an alternative to the processor circuit 103) to perform operations according to the weights $w_{ij}$ while the actual values of the weights $w_{ij}$ may be difficult or impossible to determine.

The system-data store 110 may also store data representing a propagation stage t of the data-transmission dynamical system implemented by the data-transmitting device 101. For example, a propagation stage t of the data-transmission dynamical system implemented by the data-transmitting device 101 may be incremented or otherwise updated each time the artificial spiking neural network is propagated according to Equations 3 and 4 above. In other embodiments, the propagation stage t may simply be identified from a clock of the data-transmitting device 101.

The weights $w_{ij}$, and the constants $\tau_s$, $\tau_m$, I, $T_j$, and $s_j$ may collectively define the data-transmission dynamical system implemented by the data-transmitting device 101, and the node values $v_i$ and the input values $r_j$ may collectively define a state of the data-transmission dynamical system implemented by the data-transmitting device 101. Further, an initial state of the data-transmission dynamical system implemented by the data-transmitting device 101 may include initial node values $v_i$ and initial input values $r_j$. However, alternative embodiments may differ.

The data-storage device 106 includes a program-codes store 111 storing program codes that, when executed by the CPU 104, cause the processor circuit 103 to implement functions of the data-transmitting device 101 such as those described herein, for example.

Figure 2:
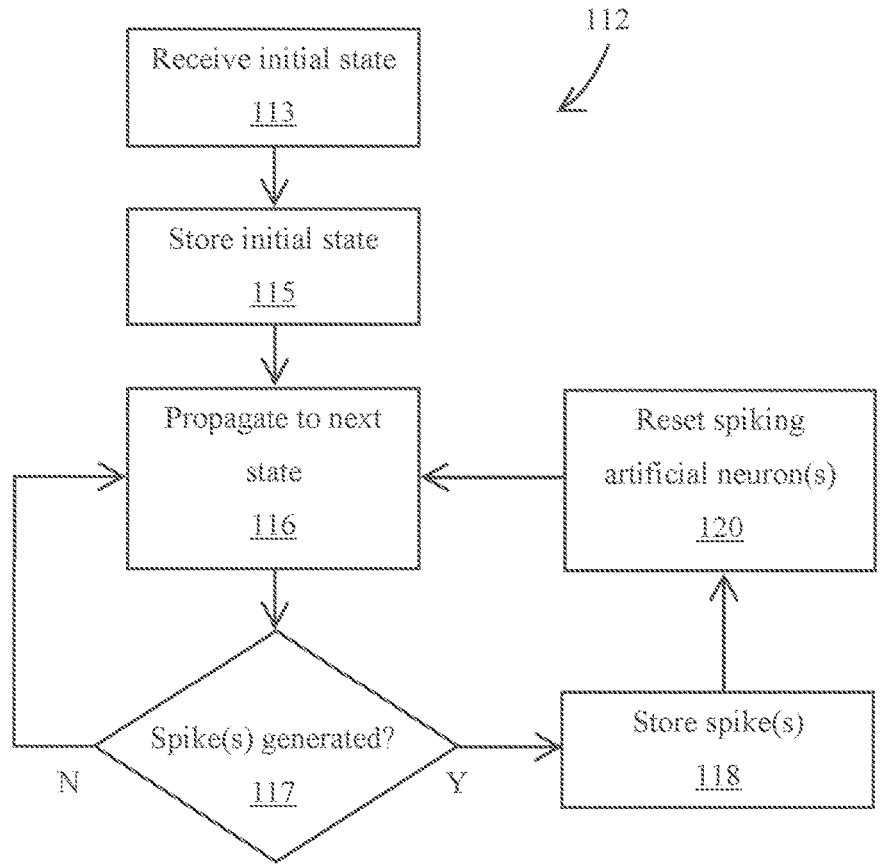
FIG. 2 schematically illustrates some example program codes of a program memory of a data-storage device of a data-transmitting device of the data-transmission system of FIG. 1.

For example, referring to FIGS. 1 and 2, program codes stored in the program-codes store 111 may include blocks of program codes shown generally at 112 that, when executed by the CPU 104, cause the processor circuit 103 to propagate the data-transmission dynamical system implemented by the data-transmitting device 101.

The blocks 112 may begin at a block 113 including program codes that, when executed by the CPU 104, cause the I/O interface 105 to receive one or more data-transmitting-device-initial-state-indication signals 114 indicating an initial state for the data-transmission dynamical system implemented by the data-transmitting device 101. For example, the one or more data-transmitting-device-initial-state-indication signals 114 may indicate initial node values $v_i$ and initial input values $r_j$, but alternative embodiments may differ.

The one or more data-transmitting-device-initial-state-indication signals 114 may also indicate other information, such as a range of propagation stages during which output of the data-transmission dynamical system implemented by the data-transmitting device 101 may be relevant for data transmission as described herein, for example. In general, a range of propagation stages, as described herein, may be range of propagation stages after any initial or transient propagation stages. Such one or more data-transmitting-device-initial-state-indication signals may, when also indicating such a range of propagation stages, also be considered to be one or more propagation-identification signals.

After the block 113, the blocks 112 may continue at a block 115 including program codes that, when executed by the CPU 104, cause the processor circuit 103 to store, in the system-data store 110, data representing the initial state as indicated in the one or more data-transmitting-device-initial-state-indication signals 114.

The one or more data-transmitting-device-initial-state-indication signals 114 may be transmitted from the data-receiving device 102 or from one or more other devices. In some embodiments, the data-receiving device 102 may generate the initial state for the data-transmission dynamical system implemented by the data-transmitting device 101, for example using a pseudorandom number generator. However, an initial state for a data-transmission dynamical system may be generated in other ways.

For example, in some embodiments, the data-transmitting device 101 may generate an initial state for the data-transmission dynamical system implemented by the data-transmitting device 101, for example using a pseudorandom number generator. Such generation of the initial state for the data-transmission dynamical system implemented by the data-transmitting device 101 may be in response to the data-transmitting device 101 receiving one or more signals.

Also, in some embodiments, the data-transmitting device 101 may generate an initial state for the data-transmission dynamical system implemented by the data-transmitting device 101 in response to a user name, password, or both (or, more generally, according to a key, which may be any input and not necessarily a user name or a password), which may be entered by a user of the data-transmitting device 101 using an input device such as the input device 108. In such embodiments, the processor circuit 103 may, for example, apply a hash function to the user name, to the password, or to both (or, more generally, to a key). Such a hash function may produce an integer according to the user name, password, or both (or, more generally, according to a key), and such an integer may be a seed for a pseudorandom number generator. The pseudorandom number generator, initialized with such a seed, may then generate initial node values $v_i$ and initial input values $r_j$ according to such output from the hash function. However, alternative embodiments may differ.

In summary, the data-transmitting device 101 may generate an initial state for the data-transmission dynamical system implemented by the data-transmitting device 101 in response to user input to the data-transmitting device 101, or in other ways. Therefore, the blocks 113 and 115 and the one or more data-transmitting-device-initial-state-indication signals 114 are examples only, and alternative embodiments may differ.

After the block 115, or after an initial state for the data-transmission dynamical system implemented by the data-transmitting device 101 in some other way, the blocks 112 may continue at a block 116 including program codes that, when executed by the CPU 104, cause the processor circuit 103 to propagate the data-transmission dynamical system implemented by the data-transmitting device 101 to an immediately subsequent state. For example, the program codes at the block 116, when executed by the CPU 104, may cause the CPU 104 to update values stored in the system-data store 110 for each of the node values $v_i$ and for each of the input values $r_j$ according to Equations 3 and 4 above. Further, the program codes at the block 116, when executed by the CPU 104, may cause the CPU 104 to increment or otherwise update the propagation stage t of the artificial spiking neural network as stored in the system-data store 110 to reflect the propagation of the data-transmission dynamical system implemented by the data-transmitting device 101 at the block 116.

After the block 116, the blocks 112 may continue at a block 117 including program codes that, when executed by the CPU 104, cause the CPU 104 to determine whether any spikes were generated in the most recent propagation at the block 116. For example, the program codes at the block 117, when executed by the CPU 104, may cause the CPU 104 to determine whether, for any artificial neuron i, $v_i \geq T_i$ as $v_i$ and $T_i$ are described above.

After the block 117, if no spikes were generated in the most recent propagation at the block 116, then the blocks 112 may continue at the block 116 as previously described.

However, after the block 117, if one or more spikes were generated in the most recent propagation at the block 116, then the blocks 112 may continue at a block 118 including program codes that, when executed by the CPU 104, cause the CPU 104 to store, in a spike store 119 in the data-storage device 106, data representing the one or more spikes. For example, as described above, for each of the one or more spikes, the program codes at the block 118, when executed by the CPU 104, may cause the CPU 104 to store, in the spike store 119, data representing both the artificial neuron that generated the spike (for example, an identifier i identifying the artificial neuron that spiked) and a propagation stage $t_{jk}$ (for example, as stored in the system-data store 110) of the artificial spiking neural network when the spike was generated, for example as an ordered pair (i, $t_{jk}$).

After the block 118, the blocks 112 may continue at a block 120 including program codes that, when executed by the CPU 104, cause the CPU 104 to reset $v_i$ of each artificial neuron that generated the spike to a constant starting node value $s_i$ of the ith artificial neuron as described above.

After the block 120, the blocks 112 may continue at the block 116 as previously described. The blocks 112 may continue during some range of propagation. For example, the blocks 112 may continue during a range of propagation identified by the one or more data-transmitting-device-initial-state-indication signals 114 as described above. As another example, the blocks 112 may continue during a range of propagation identified by program codes stored in the program-codes store 111.

In summary, the blocks 112, when executed by the CPU 104, cause the processor circuit 103 to propagate the data-transmission dynamical system implemented by the data-transmitting device 101 according to data in the system-data store 110 by updating data in the system-data store 110 and in the spike store 119 to reflect propagation of the data-transmission dynamical system implemented by the data-transmitting device 101, and the data in the spike store 119 represent some or all of the spikes generated by the data-transmission dynamical system implemented by the data-transmitting device 101.

The data in the spike store 119 do not necessarily represent all of the spikes generated by the data-transmission dynamical system implemented by the data-transmitting device 101. Rather, in some embodiments, the data in the spike store 119 may represent only the most recently generated spikes by the data-transmission dynamical system implemented by the data-transmitting device 101 up to a maximum number of spikes, or the data in the spike store 119 may represent only the spikes generated by the data-transmission dynamical system implemented by the data-transmitting device 101 within a particular range of propagation stages. Such a range of propagation stages may be identified by the one or more data-transmitting-device-initial-state-indication signals 114, or by program codes stored in the program-codes store 111, for example.

Modifying Spikes

The program-codes store 111 may include other blocks of program codes.

For example, referring back to FIG. 1, the program codes stored in the program-codes store 111 may include blocks of program codes that, when executed by the CPU 104, cause the processor circuit 103 to encode or encrypt data stored in a data store 121 in the data-storage device 106 and to transmit the encoded or encrypted data. In general, the program codes stored in the program-codes store 111, when executed by the CPU 104, cause the processor circuit 103 to encode or encrypt the data stored in the data store 121 by modifying spikes represented by the data stored in the spike store 119 according to the data stored in the data store 121 and to store, in a modified-spike store 122 of data-storage device 106, data representing the modified spikes.

As with the spike store 119, the modified-spike store 122 may store data (such as an ordered pair (i, $t_{jk}$), for example) representing both an artificial neuron that generated a spike (for example, an identifier i identifying the artificial neuron that spiked) and a propagation stage $t_{jk}$ (for example, as stored in the system-data store 110) of the artificial spiking neural network when the spike was generated, except that the spikes represented by data stored in the modified-spike store 122 are modified according to the data stored in the data store 121.

Embodiments such as those described herein do not necessarily involve modifying all of the spikes generated by the data-transmission dynamical system implemented by the data-transmitting device 101. Rather, in some embodiments, only the most recently generated spikes by the data-transmission dynamical system implemented by the data-transmitting device 101 up to a maximum number of spikes may be modified, or only the spikes generated by the data-transmission dynamical system implemented by the data-transmitting device 101 within a particular range of propagation stages may be modified. Again, such a range of propagation stages may be identified by the one or more data-transmitting-device-initial-state-indication signals 114, or by program codes stored in the program-codes store 111, for example.

Spike-Deletion Method

For example, in some embodiments, modifying spikes may involve a spike-deletion method involving iterating through bits of the data stored in the data store 121 and iterating through some or all of the spikes stored in the spike store 119, and:

1. for each bit that is 1, storing a spike represented by data stored in the spike store 119 in the modified-spike store 122; and
2. for each bit that is 0, not storing a spike (or an omitted dynamical-system event) represented by data stored in the spike store 119 in the modified-spike store 122.

Figure 3:
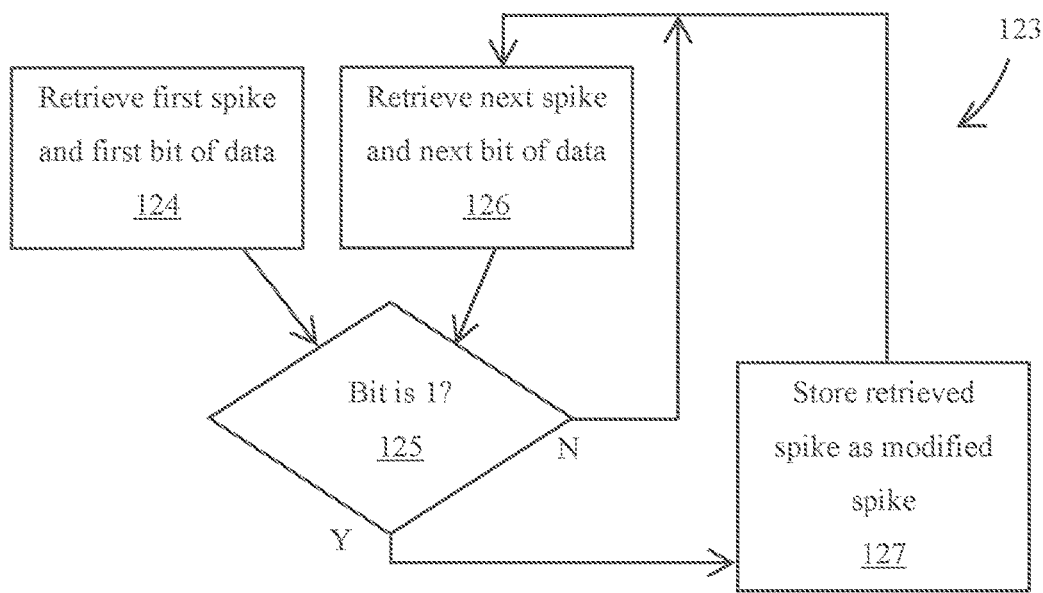
FIG. 3 schematically illustrates other example program codes of the program memory of the data-storage device of the data-transmitting device of the data-transmission system of FIG. 1.

Referring to FIGS. 1 and 3, blocks of program codes that may be stored in the program-codes store 111 to modify spikes according to such a spike-deletion method are shown generally at 123 and may begin at a block 124 including program codes that, when executed by the CPU 104, cause the CPU 104 to retrieve a first spike represented by data stored in the spike store 119 and a first bit of data from the data store 121. Such a first spike is not necessarily the first spike in the spike store 119, and such a first bit is not necessarily the first bit of data from the data store 121. Rather, the first spike and the first bit at the block 124 simply represent any beginning of an iterative process of the spike-deletion method.

After the block 124, the blocks 123 may continue at a block 125 including program codes that, when executed by the CPU 104, cause the CPU 104 to determine whether the bit retrieved at the block 124 is 1.

After the block 125, if at the block 125 the bit retrieved at the block 124 is not 1, then the blocks 123 may continue (without storing, in the modified-spike store 122, data representing the spike retrieved most recently at the block 124 or 126) at a block 126 including program codes that, when executed by the CPU 104, cause the CPU 104 to retrieve a next spike represented by data stored in the spike store 119 and a next bit of data from the data store 121. Such a next spike at the block 126 is a next spike represented by data stored in the spike store 119, after the most recent spike at the block 124 or 126, in the iterative process of the spike-deletion method, and such a next bit of data is a next bit of data from the data store 121, after the most recent spike at the block 124 or 126, in the iterative process of the spike-deletion method. Such next spikes are not necessarily sequential in the spike store 119, and such next bits of data are not necessarily sequential in the data store 121.

After the block 126, the blocks 123 may continue at the block 125 as previously described, except that when the block 125 follows the block 126, the program codes at the block 125, when executed by the CPU 104, cause the CPU 104 to determine whether the bit retrieved at the block 126 (instead of the bit retrieved at the block 124) is 1.

After the block 125, if at the block 125 the bit retrieved most recently at the block 124 or 126 is 1, then the blocks 123 may continue at a block 127 including program codes that, when executed by the CPU 104, cause the CPU 104 to store, in the modified-spike store 122, data representing the spike retrieved most recently at the block 124 or 126.

Figures 4, 5:
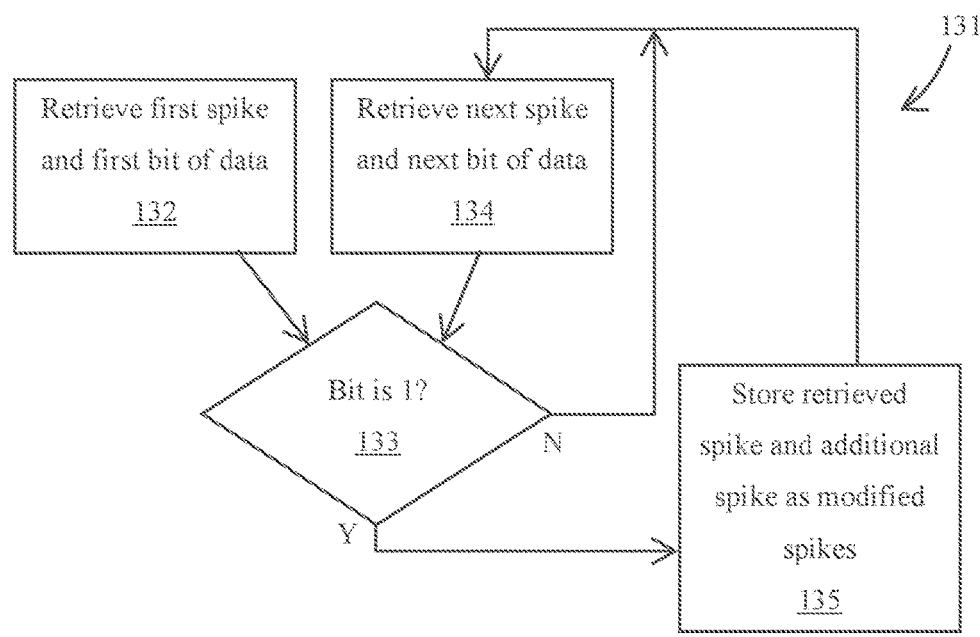
FIG. 4 schematically illustrates an example of operation of the program codes of FIG. 3.
FIG. 5 schematically illustrates other example program codes of the program memory of the data-storage device of the data-transmitting device of the data-transmission system of FIG. 1.

FIG. 4 illustrates an example of the spike-deletion method of FIG. 3. In FIG. 4, examples of spikes represented by data stored in the spike store 119 are shown generally at 128 and include ordered pairs of identifiers of artificial neurons and respective propagation stages of spikes of those artificial neurons. Also, in FIG. 4, examples of bits of data from in the data store 121 are shown generally at 129, and examples of spikes represented by data stored in the modified-spike store 122 are shown generally at 130 and include ordered pairs of identifiers of artificial neurons and respective propagation stages of spikes of those artificial neurons.

As shown in the example of FIG. 4, according to the spike-deletion method, the spikes represented by data stored in the modified-spike store 122 are modified according to the data stored in the data store 121 such that 0s in data from the data store 121 are represented by spikes represented by the data stored in the spike store 119 that are not represented by data stored in the modified-spike store 122, and 1s in data from the data store 121 are represented by spikes represented by the data stored in the spike store 119 that are represented by data stored in the modified-spike store 122. Therefore, the spikes that are represented by data stored in the modified-spike store 122 are modified according to, and encode, encrypt, or both, data from the data store 121.

However, alternative embodiments may differ. For example, according to a different spike-deletion method, the spikes represented by data stored in the modified-spike store 122 are modified according to the data stored in the data store 121 such that 0s in data from the data store 121 are represented by spikes represented by the data stored in the spike store 119 that are represented by data stored in the modified-spike store 122, and 1s in data from the data store 121 are represented by spikes represented by the data stored in the spike store 119 that are not represented by data stored in the modified-spike store 122.

Spike-Insertion Method

As another example, in some embodiments, modifying spikes may involve a spike-insertion method involving iterating through bits of the data stored in the data store 121 and iterating through some or all of the spikes stored in the spike store 119, and:

1. for each bit that is 1, storing a spike represented by data stored in the spike store 119 in the modified-spike store 122 and an additional spike (or an added dynamical-system event); and
2. for each bit that is 0, not storing a spike (or an omitted dynamical-system event) represented by data stored in the spike store 119 in the modified-spike store 122.

Referring to FIGS. 1 and 5, blocks of program codes that may be stored in the program-codes store 111 to modify spikes according to such a spike-insertion method are shown generally at 131 and may begin at a block 132 including program codes that, when executed by the CPU 104, cause the CPU 104 to retrieve a first spike represented by data stored in the spike store 119 and a first bit of data from the data store 121. Such a first spike is not necessarily the first spike in the spike store 119, and such a first bit is not necessarily the first bit of data from the data store 121. Rather, the first spike and the first bit at the block 132 simply represent any beginning of an iterative process of the spike-insertion method.

After the block 132, the blocks 131 may continue at a block 133 including program codes that, when executed by the CPU 104, cause the CPU 104 to determine whether the bit retrieved at the block 132 is 1.

After the block 133, if at the block 133 the bit retrieved at the block 132 is not 1, then the blocks 131 may continue (without storing, in the modified-spike store 122, data representing the spike retrieved most recently at the block 132 or 134) at a block 134 including program codes that, when executed by the CPU 104, cause the CPU 104 to retrieve a next spike represented by data stored in the spike store 119 and a next bit of data from the data store 121. Such a next spike at the block 134 is a next spike represented by data stored in the spike store 119, after the most recent spike at the block 132 or 134, in the iterative process of the spike-insertion method, and such a next bit of data is a next bit of data from the data store 121, after the most recent spike at the block 132 or 134, in the iterative process of the spike-insertion method. Such next spikes are not necessarily sequential in the spike store 119, and such next bits of data are not necessarily sequential in the data store 121.

After the block 134, the blocks 131 may continue at the block 133 as previously described, except that when the block 133 follows the block 134, the program codes at the block 133, when executed by the CPU 104, cause the CPU 104 to determine whether the bit retrieved at the block 134 (instead of the bit retrieved at the block 132) is 1.

After the block 133, if at the block 133 the bit retrieved most recently at the block 132 or 134 is 1, then the blocks 131 may continue at a block 135 including program codes that, when executed by the CPU 104, cause the CPU 104 to store, in the modified-spike store 122, data representing the spike retrieved most recently at the block 132 or 134, and an additional spike 126. Such an additional spike may be created according to a pseudorandom number generator or otherwise created to appear like a spike represented by the data stored in the spike store 119 without actually being a spike represented by the data stored in the spike store 119.

Figure 6:
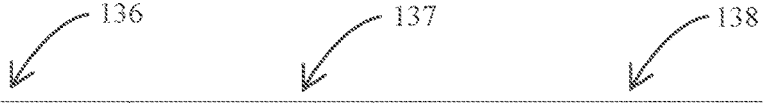
FIG. 6 schematically illustrates an example of operation of the program codes of FIG. 5.

FIG. 6 illustrates an example of the spike-insertion method of FIG. 5. In FIG. 6, examples of spikes represented by data stored in the spike store 119 are shown generally at 136 and include ordered pairs of identifiers of artificial neurons and respective propagation stages of spikes of those artificial neurons. Also, in FIG. 6, examples of bits of data from in the data store 121 are shown generally at 137, and examples of spikes represented by data stored in the modified-spike store 122 are shown generally at 138 and include ordered pairs of identifiers of artificial neurons and respective propagation stages of spikes of those artificial neurons.

In the example of FIG. 6, spikes represented by data stored in the modified-spike store 122 include additional spikes (namely (3084, 46), (2907, 79), (3687, 98), (977, 147), and (4803, 195)), each not represented by the data stored in the spike store 119 but rather inserted to represent a 1 in the data stored in the data store 121.

As shown in the example of FIG. 6, according to the spike-insertion method, the spikes represented by data stored in the modified-spike store 122 are modified according to the data stored in the data store 121 such that 0s in data from the data store 121 are represented by spikes represented by the data stored in the spike store 119 that are not represented by data stored in the modified-spike store 122, and 1s in data from the data store 121 are represented by spikes represented by data stored in the modified-spike store 122 that are not represented by the data stored in the spike store 119. Therefore, the spikes that are represented by data stored in the modified-spike store 122 are modified according to, and encode, encrypt, or both, data from the data store 121.

However, alternative embodiments may differ. For example, according to a different spike-insertion method, the spikes represented by data stored in the modified-spike store 122 are modified according to the data stored in the data store 121 such that 0s in data from the data store 121 are represented by spikes represented by data stored in the modified-spike store 122 that are not represented by the data stored in the spike store 119, and 1s in data from the data store 121 are represented by spikes represented by the data stored in the spike store 119 that are not represented by data stored in the modified-spike store 122.

Basis-Function Methods

As another example, in some embodiments, modifying spikes may involve a basis-function-propagation-shift method.

In general, basis functions may be elements of a function space, and basis functions may have respective amplitudes such that basis functions, aggregated according to their respective amplitudes, represent data from the data store 121.

Figure 7:
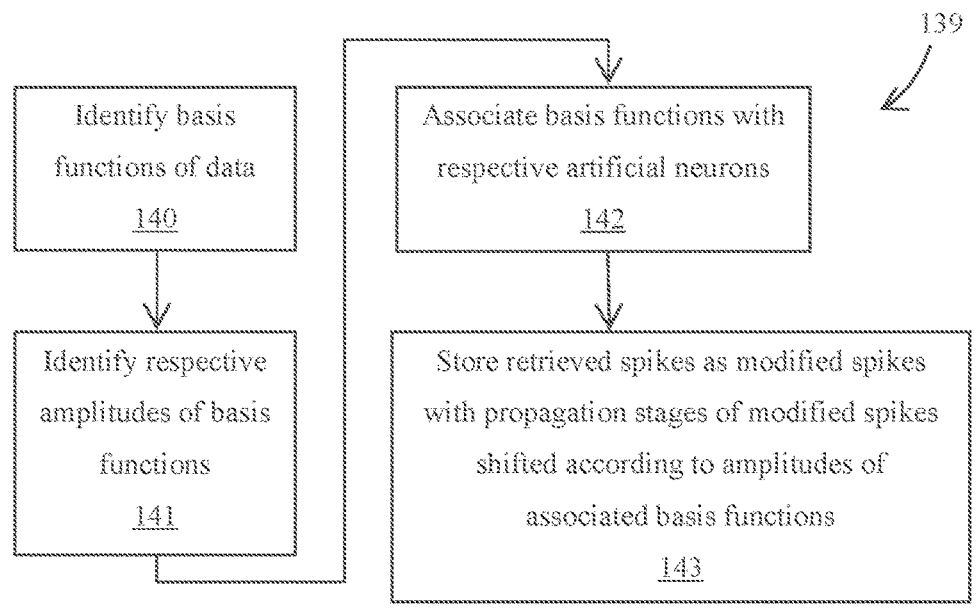
FIG. 7 schematically illustrates other example program codes of the program memory of the data-storage device of the data-transmitting device of the data-transmission system of FIG. 1.

Referring to FIGS. 1 and 7, blocks of program codes that may be stored in the program-codes store 111 to modify spikes according to such a basis-function-propagation-shift method are shown generally at 139 and may begin at a block 140 including program codes that, when executed by the CPU 104, cause the CPU 104 to identify basis functions of data from the data store 121.

After the block 140, the blocks 139 may continue at a block 141 including program codes that, when executed by the CPU 104, cause the CPU 104 to identify respective amplitudes of the basis functions of the data from the data store 121.

After the block 141, the blocks 139 may continue at a block 142 including program codes that, when executed by the CPU 104, cause the CPU 104 to associate the basis functions with respective artificial neurons of an artificial neural network as described above, for example.

After the block 142, the blocks 139 may continue at a block 143 including program codes that, when executed by the CPU 104, cause the CPU 104 to store, in the modified-spike store 122, for each spike represented by the data stored in the spike store 119, data representing the spike but shifted in propagation stage (therefore, a shifted dynamical-system event) according to the amplitude of the basis function associated with the artificial neuron that generated the spike.

FIG. 8 illustrates an example of the basis-function-propagation-shift method of FIG. 7. In FIG. 8, examples of spikes represented by data stored in the spike store 119 are shown generally at 144 and include ordered pairs of identifiers of artificial neurons and respective propagation stages of spikes of those artificial neurons. Also, in FIG. 8, examples of bits of data from in the data store 121 are shown generally at 145, and examples of spikes represented by data stored in the modified-spike store 122 are shown generally at 146 and include ordered pairs of identifiers of artificial neurons and respective propagation stages of spikes of those artificial neurons. In the example of FIG. 8, spikes represented by data stored in the modified-spike store 122 are shifted in propagation stage from spikes represented by data stored in the spike store 119 according to the amplitudes of the basis functions associated with the artificial neurons that generated the spikes. Therefore, the spikes that are represented by data stored in the modified-spike store 122 are modified according to, and encode, encrypt, or both, data from the data store 121.

However, alternative embodiments may differ. For example, according to a basis-function-neuron-shift method, spikes represented by data stored in the modified-spike store 122 may be shifted (therefore, shifted dynamical-system events) to other artificial neurons (instead of in propagation stage) from spikes represented by data stored in the spike store 119 according to the amplitudes of the basis functions associated with the artificial neurons that generated the spikes. FIG. 9 illustrates an example of the basis-function-neuron-shift method. In the example of FIG. 9, spikes represented by data stored in the modified-spike store 122 are shifted to other artificial neurons (instead of in propagation stage) from spikes represented by data stored in the spike store 119 according to the amplitudes of the basis functions associated with the artificial neurons that generated the spikes.

Also, in the embodiment shown, a basis function having no amplitude is represented by a spike from an artificial neuron associated with the basis function and having zero shift. However, in alternative embodiments, a basis function having no amplitude may be represented by omitting, from the modified spikes, a spike from an artificial neuron associated with the basis function.

Other Shift Methods

As another example, in some embodiments, modifying spikes may involve shifting some or all of the spikes represented by data stored in the spike store 119 in other ways. For example, referring to FIGS. 1 and 10, blocks of program codes that may be stored in the program-codes store 111 to modify spikes according to a multiple-bit-propagation-shift method are shown generally at 147 and may begin at a block 148 including program codes that, when executed by the CPU 104, cause the CPU 104 to retrieve a first spike represented by data stored in the spike store 119 and a first n bits of data from the data store 121. Such a first spike is not necessarily the first spike in the spike store 119, and such n bits are not necessarily the first n bits of data from the data store 121. Rather, the first spike and the first n bits at the block 148 simply represent any beginning of an iterative process of the multiple-bit-propagation-shift method.

In the embodiment shown, n is 4, but in alternative embodiments n may be more or less, or even 1.

After the block 148, the blocks 147 may continue at a block 149 including program codes that, when executed by the CPU 104, cause the CPU 104 to determine a shift amount according to the bits retrieved at the block 148. The shift amount may simply be a binary value of the bits retrieved at the block 148. For example, the shift amount from four bits 0010 may be 2, and the shift amount from four bits 0110 may be 6.

After the block 149, the blocks 147 may continue at a block 150 including program codes that, when executed by the CPU 104, cause the CPU 104 to store, in the modified-spike store 122, data representing the spike retrieved at the block 148 but shifted in propagation stage according to the shift determined at the block 149.

After the block 150, the blocks 147 may continue at a block 151 including program codes that, when executed by the CPU 104, cause the CPU 104 to retrieve a next spike represented by data stored in the spike store 119 and next n bits of data from the data store 121. Such a next spike at the block 151 is a next spike represented by data stored in the spike store 119, after the most recent spike at the block 148 or 151, in the iterative process of the multiple-bit-propagation-shift method, and such next n bits of data are the next n bits of data from the data store 121, after the most recent spike at the block 148 or 151, in the iterative process of the multiple-bit-propagation-shift method. Such next spikes are not necessarily sequential in the spike store 119, and such next bits of data are not necessarily sequential in the data store 121.

After the block 151, the blocks 147 may continue at the block 149 as previously described, except that when the block 149 follows the block 151, the program codes at the block 149, when executed by the CPU 104, cause the CPU 104 to determine a shift amount according to the bits retrieved at the block 151 (instead of according to the bits retrieved at the block 148), and when the block 150 follows the block 151, the program codes at the block 150, when executed by the CPU 104, cause the CPU 104 to store, in the modified-spike store 122, data representing the spike retrieved at the block 151 (instead of the spike retrieved at the block 148) but shifted in propagation stage according to the shift determined at the block 149.

Figure 10:
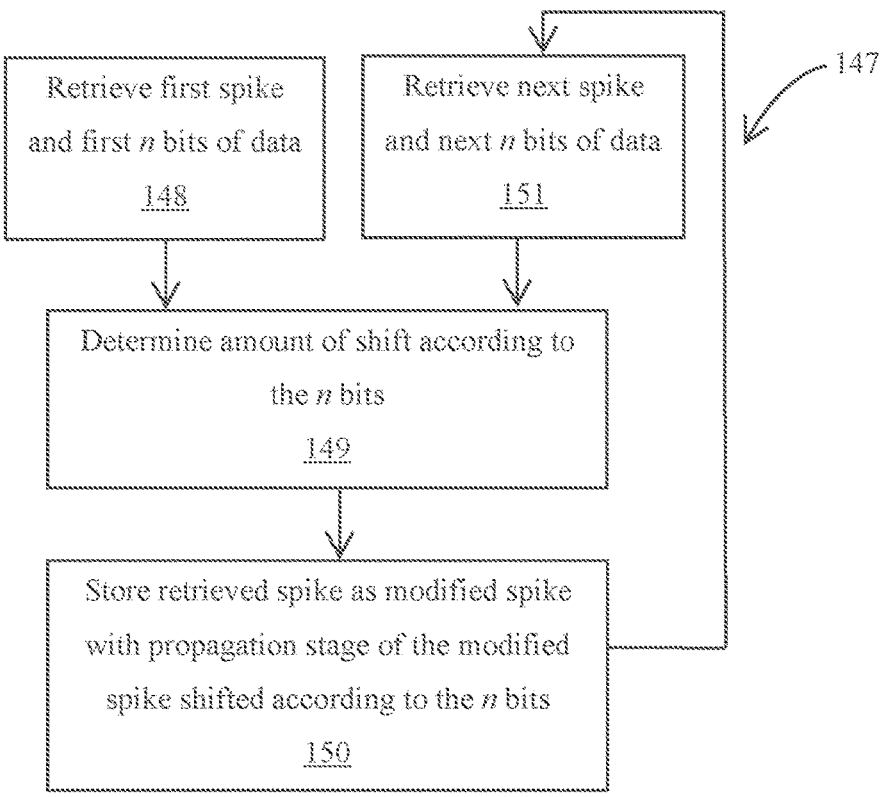
FIG. 10 schematically illustrates other example program codes of the program memory of the data-storage device of the data-transmitting device of the data-transmission system of FIG. 1.
Figure 11:
FIG. 11 schematically illustrates an example of operation of the program codes of FIG. 10.

FIG. 11 illustrates an example of the multiple-bit-propagation-shift method of FIG. 10. In FIG. 10, examples of spikes represented by data stored in the spike store 119 are shown generally at 152 and include ordered pairs of identifiers of artificial neurons and respective propagation stages of spikes of those artificial neurons. Also, in FIG. 11, examples of bits of data from in the data store 121 are shown generally at 153, and examples of shift amounts according to those bits are shown generally at 154. Also, in FIG. 11, examples of spikes represented by data stored in the modified-spike store 122 are shown generally at 155 and include ordered pairs of identifiers of artificial neurons and respective propagation stages of spikes of those artificial neurons. In the example of FIG. 11, spikes represented by data stored in the modified-spike store 122 are shifted in propagation stage from spikes represented by data stored in the spike store 119 according to respective sets of 4 bits of data stored in the modified-spike store 122. Therefore, the spikes that are represented by data stored in the modified-spike store 122 are modified according to, and encode, encrypt, or both, data from the data store 121.

Figures 12, 13:
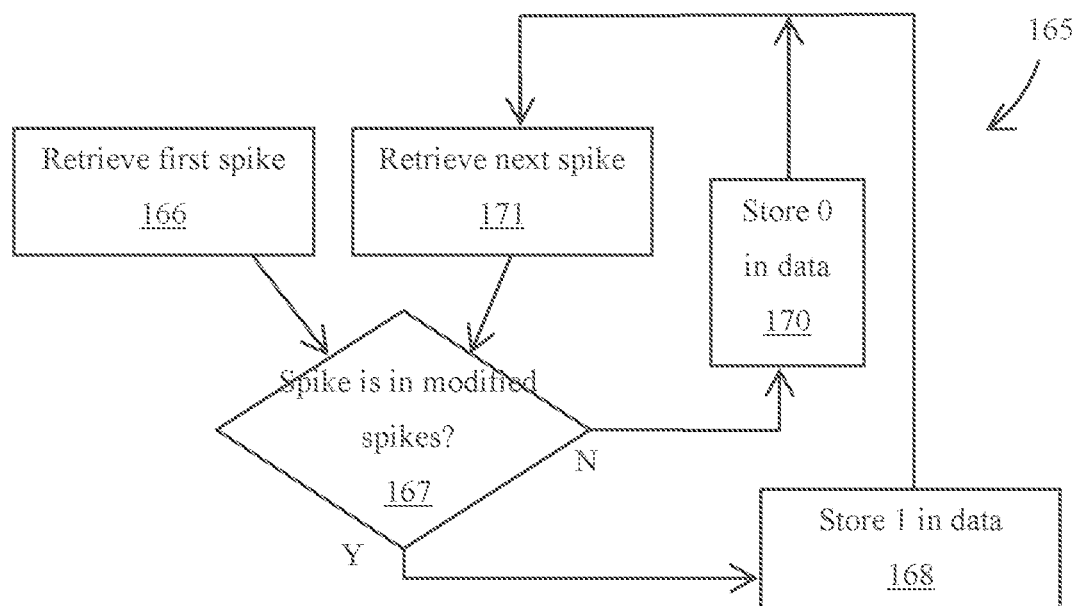
FIG. 12 schematically illustrates an example of operation of an alternative to the program codes of FIG. 10.
FIG. 13 schematically illustrates some example program codes of a program memory of a data-storage device of a data-receiving device of the data-transmission system of FIG. 1.

However, alternative embodiments may differ. For example, according to a multiple-bit-neuron-shift method, spikes represented by data stored in the modified-spike store 122 may be shifted to other artificial neurons (instead of in propagation stage) from spikes represented by data stored in the spike store 119 according to respective sets of bits of data stored in the modified-spike store 122. FIG. 12 illustrates an example of the multiple-bit-neuron-shift method. In the example of FIG. 12, spikes represented by data stored in the modified-spike store 122 are shifted to other artificial neurons (instead of in propagation stage) from spikes represented by data stored in the spike store 119 according to respective sets of bits of data stored in the modified-spike store 122.

More generally, the examples of FIGS. 3-12 are examples only, and alternative embodiments may differ. In general, embodiments according to the examples of FIGS. 3-12, or according to alternatives, may involve modifying output of a dynamical system with modifications according to data to encode the data, encrypt the data, or both.

Data-Receiving Device

Referring back to FIG. 1, the data-receiving device 102 is a computing device and may, in various embodiments, include a user computing device, a server computing device, a personal computer, a laptop computer, a tablet computer, a smartphone, a smart watch, a network node for a computer network, a router for a computer network, a mobile device, a telephone, a camera or one more other devices including one or more other computing devices as described herein, or a combination of two or more thereof.

The data-receiving device 102 includes a processor circuit shown generally at 156 and including a CPU 157. However, alternative embodiments may include one or more alternatives to the CPU 157, such as one or more microprocessors, one or more analog circuits, one or more configurable logic blocks, one or more ASICs, or one or more FPGAS, for example.

The processor circuit 156 also includes an I/O interface 158 and a data-storage device 159 in communication with the CPU 157. The I/O interface 158 may include various signal interfaces, ADCs, receivers, transmitters, and/or other circuitry to receive, produce, and transmit signals as described herein, for example. In the embodiment shown, the I/O interface 158 is operable to transmit signals to, and receive signals from, the computer network 107. However, as indicated above, alternative embodiments may differ and may, for example, transmit signals using radio signals.

The data-storage device 159 may include one or more of the same or different computer-readable and/or computer-writable data-storage media, which in various embodiments may include one or more of a ROM, a RAM, an HDD, a SSD, and other computer-readable and/or computer-writable data-storage media.

The processor circuit 156 is an example only, and alternative embodiments may differ. For example, alternative embodiments may include more, fewer, or different components. Also, in alternative embodiments, components described herein may be combined or separated into separate components. Alternative embodiments may include one or more alternatives to components as described herein. Further, an alternative to the data-receiving device 102 may include multiple devices that collectively function as a data-receiving device.

The data-storage device 159 includes a system-data store 160 storing data defining a data-receiving dynamical system implemented by the data-receiving device 102 and data indicating a state for the data-receiving dynamical system implemented by the data-receiving device 102. The data-receiving dynamical system implemented by the data-receiving device 102 shown is a spiking neural network as described above, and the system-data store 160 may store data as described above regarding the system-data store 110, although alternative embodiments may differ.

The data-storage device 159 also includes a program-codes store 161 storing program codes that, when executed by the CPU 157, cause the processor circuit 156 to implement functions of the data-receiving device 102 such as those described herein, for example.

For example, program codes stored in the program-codes store 161 may include blocks of program codes similar to the blocks 112 that, when executed by the CPU 157, cause the processor circuit 156 to propagate the data-receiving dynamical system implemented by the data-receiving device 102. Like the blocks 112, program codes stored in the program-codes store 161 may, when executed by the CPU 157, cause the processor circuit 156 to propagate the data-receiving dynamical system implemented by the data-receiving device 102 according to data in the system-data store 160 by updating data in the system-data store 160 and by updating data in a spike store 162 (similar to the spike store 119 of the data-transmitting device 101) to reflect propagation of the data-receiving dynamical system implemented by the data-receiving device 102.

As with the data-transmission dynamical system implemented by the data-transmitting device 101, the data in the spike store 162 do not necessarily represent all of the spikes generated by the data-receiving dynamical system implemented by the data-receiving device 102. Rather, in some embodiments, the data in the spike store 162 may represent only the most recently generated spikes by the data-receiving dynamical system implemented by the data-receiving device 102 up to a maximum number of spikes, or the data in the spike store 162 may represent only the spikes generated by the data-receiving dynamical system implemented by the data-receiving device 102 within a particular range of propagation stages.

Synchronizing Dynamical Systems

As a result, if the system-data store 110 of the data-transmitting device 101 and the system-data store 160 of the data-receiving device 102

1. both have the same weights $w_{ij}$ and constants $\tau_s$, $\tau_m$, I, $T_j$, and $s_j$,
2. are both initialized to the same initial state (for example, with the same initial node values $v_i$ and the same the initial input values $r_j$), and
3. are both propagated to the same propagation stage, then the spikes represented by the data stored in the spike store 119 of the data-transmitting device 101 will be the same as the spikes represented by the data stored in the spike store 162 of the data-receiving device 102.

In some embodiments, when the spikes represented by the data stored in the spike store 119 of the data-transmitting device 101 will be the same as the spikes represented by the data stored in the spike store 162 of the data-receiving device 102, the data-transmission dynamical system implemented by the data-transmitting device 101 and the data-receiving dynamical system implemented by the data-receiving device 102 may be considered to be synchronized.

Therefore, in some embodiments, causing the data-transmission dynamical system implemented by the data-transmitting device 101 and the data-receiving dynamical system implemented by the data-receiving device 102 to be synchronized may involve causing the system-data store 110 of the data-transmitting device 101 and the system-data store 160 of the data-receiving device 102 both 1. to have the same weights $w_{ij}$ and constants $\tau_s$, $\tau_m$, I, $T_j$, and $s_j$,
2. to be initialized to the same initial state (for example, with the same initial node values $v_i$ and the same the initial input values $r_j$), and
3. to be propagated to the same propagation stage.

However, in some embodiments, the system-data store 110 of the data-transmitting device 101 and the system-data store 160 of the data-receiving device 102 may both be initialized to only part of an initial state (for example, to have only some, but not of all, of the same initial node values $v_i$ and the same input values $r_j$), and in such embodiments, the data-transmission dynamical system implemented by the data-transmitting device 101 and the data-receiving dynamical system implemented by the data-receiving device 102 may nevertheless converge and become synchronized after sufficient propagation.

In some embodiments, the one or more data-transmitting-device-initial-state-indication signals 114 may facilitate causing the system-data store 110 of the data-transmitting device 101 and the system-data store 160 of the data-receiving device 102 to be both initialized to some or all of the same initial state. Therefore, in some embodiments, the one or more data-transmitting-device-initial-state-indication signals 114 may cause the data-transmission dynamical system implemented by the data-transmitting device 101 and the data-receiving dynamical system implemented by the data-receiving device 102 to be synchronized.

In some embodiments, synchronizing the data-transmission dynamical system implemented by the data-transmitting device 101 and the data-receiving dynamical system implemented by the data-receiving device 102 may involve a fast identity online (FIDO) protocol.

Identifying Differences in Spikes

The processor circuit 103 may cause the I/O interface 105 (and thus the data-transmitting device 101) to transmit, to the I/O interface 158 (and thus to the data-receiving device 102), one or more data-transmission signals 163 including transmission data representing some or all of the spikes represented by data stored in the modified-spike store 122. The spikes represented by data stored in the modified-spike store 122 represent data from the data store 121, so the one or more data-transmission signals 163 also represent the data from the data store 121.

As indicated above, in some embodiments, the data-transmitting device 101 may generate the initial state for the data-transmission dynamical system implemented by the data-transmitting device 101. In such embodiments, the one or more data-transmission signals 163 may also encode the initial state for the data-transmission dynamical system implemented by the data-transmitting device 101 such that the the one or more data-transmission signals 163 may encode a key-response pair. In such embodiments, in response to receiving the one or more data-transmission signals 163, the processor circuit 156 may cause the data in the system-data store 160 to reflect the initial state as encoded in and received from the one or more data-transmission signals 163, and the one or more data-transmission signals 163 may be considered to be one or more data-receiving-device-initial-state-indication signals indicating at least an initial state for the data-receiving dynamical system implemented by the data-receiving device 102. However, in other embodiments, one or more other data-receiving-device-initial-state-indication signals may indicate at least an initial state for the data-receiving dynamical system implemented by the data-receiving device 102.

In embodiments in which the data-transmitting device 101 generates the initial state for the data-transmission dynamical system implemented by the data-transmitting device 101, a transmission of a key-response pair may be intercepted and retransmitted. Therefore, in such embodiments, the data-receiving device 102 may ensure that a key-response pair has not previously been transmitted.

As also indicated above, in some embodiments, output of the data-transmission dynamical system implemented by the data-transmitting device 101 may be from a range of propagation stages of the data-transmission dynamical system implemented by the data-transmitting device 101. In some embodiments, the one or more data-transmission signals 163 may also encode such a range of propagation stages. In such embodiments, the one or more data-transmission signals 163 may be considered to be one or more propagation-identification signals.

In response to receiving the one or more data-transmission signals 163, the processor circuit 156 may cause a modified-spike store 164 of the data-storage device 159 to store data representing the spikes represented by the transmission data of the one or more data-transmission signals 163, and the processor circuit 156 may cause the data-receiving device 102 to identify the data from the data store 121 by identifying differences between spikes represented by the data stored in the spike store 162 and spikes represented by the data stored in the modified-spike spike store 164 (which are the spikes represented by the transmission data in the one or more data-transmission signals 163, which are the spikes represented by data in the modified-spike store 122).

For example, if the spikes represented by data in the modified-spike store 122 (and thus the spikes represented by data in the modified-spike store 164) were modified according to the spike-deletion method of FIG. 4, then the differences between the spikes represented by the data stored in the spike store 162 and the spikes represented by the data stored in the modified-spike spike store 164 may be identified according to blocks of program codes shown generally at 165 and that may be stored in the program-codes store 161.

Referring to FIG. 13, the blocks 165 may begin at a block 166 including program codes that, when executed by the CPU 157, cause the CPU 157 to retrieve a first spike represented by data stored in the spike store 162. Such a first spike is not necessarily the first spike in the spike store 162, but is rather a first spike of an iterative process of the spike-deletion method.

After the block 166, the blocks 165 may continue at a block 167 including program codes that, when executed by the CPU 157, cause the CPU 157 to determine whether the spike retrieved at the block 166 is one of the spikes represented by the data stored in the modified-spike spike store 164.

After the block 167, if at the block 167 the spike retrieved at the block 166 is one of the spikes represented by the data stored in the modified-spike spike store 164, then the blocks 165 may continue at a block 168 including program codes that, when executed by the CPU 157, cause the CPU 157 to store a 1 in a data store 169 in the data-storage device 159.

However, after the block 167, if at the block 167 the spike retrieved at the block 166 is not one of the spikes represented by the data stored in the modified-spike spike store 164, then the blocks 165 may continue at a block 170 including program codes that, when executed by the CPU 157, cause the CPU 157 to store a 0 in the data store 169 in the data-storage device 159.

After the block 168 or after the block 170, the blocks 165 may continue at a block 171 including program codes that, when executed by the CPU 157, cause the CPU 157 to retrieve a next spike represented by data stored in the spike store 162. Such a next spike at the block 171 is a next spike represented by data stored in the spike store 162, after the most recent spike at the block 166 or 171, in the iterative process of the spike-deletion method. Such next spikes are not necessarily sequential in the spike store 162.

After the block 171, the blocks 165 may continue at the block 167 as previously described, except that when the block 167 follows the block 171, the program codes at the block 167, when executed by the CPU 157, cause the CPU 157 to determine whether the bit retrieved at the block 171 (instead of the spike retrieved at the block 166) is one of the spikes represented by the data stored in the modified-spike spike store 164.

FIG. 14 illustrates an example of identifying differences, according to the method of FIG. 13, between the spikes represented by the data stored in the spike store 162 and the spikes represented by the data stored in the modified-spike spike store 164 when the spikes represented by data in the modified-spike store 122 (and thus the spikes represented by data in the modified-spike store 164) were modified according to the spike-deletion method of FIG. 4.

In FIG. 14, examples of spikes represented by data stored in the spike store 162 are shown generally at 172 and include ordered pairs of identifiers of artificial neurons and respective propagation stages of spikes of those artificial neurons. In the embodiment shown, the data-receiving dynamical system implemented by the data-receiving device 102 is synchronized with the data-transmission dynamical system implemented by the data-transmitting device 101, so the data stored in the spike store 162 (as shown at 172) represent the same spikes as the data stored in the spike store 119 (as shown at 128).

Also, in FIG. 14, examples of spikes represented by data stored in the modified spike store 164 are shown generally at 173 and also include ordered pairs of identifiers of artificial neurons and respective propagation stages of spikes of those artificial neurons. Also, in FIG. 14, examples of bits that are identified, by identifying differences according to the method of FIG. 13 between the spikes represented by the data stored in the spike store 162 and the spikes represented by the data stored in the modified-spike spike store 164, and stored in the data store 169 are shown generally at 174.

FIG. 15 is similar to FIG. 14 but illustrates an example of identifying differences between the spikes represented by the data stored in the spike store 162 and the spikes represented by the data stored in the modified-spike spike store 164 when the spikes represented by data in the modified-spike store 122 (and thus the spikes represented by data in the modified-spike store 164) were modified according to the spike-insertion method of FIG. 5.

FIG. 16 illustrates an example of identifying differences between the spikes represented by the data stored in the spike store 162 and the spikes represented by the data stored in the modified-spike spike store 164 when the spikes represented by data in the modified-spike store 122 (and thus the spikes represented by data in the modified-spike store 164) were modified according to the basis-function-propagation-shift method of FIG. 7.

In FIG. 16, examples of spikes represented by data stored in the spike store 162 are shown generally at 175 and include ordered pairs of identifiers of artificial neurons and respective propagation stages of spikes of those artificial neurons. Also, in FIG. 16, examples of spikes represented by data stored in the modified spike store 164 are shown generally at 176 and also include ordered pairs of identifiers of artificial neurons and respective propagation stages of spikes of those artificial neurons. Also, in FIG. 16, examples of amplitudes of basis functions, that are identified by identifying differences between the spikes represented by the data stored in the spike store 162 and the spikes represented by the data stored in the modified-spike spike store 164, and stored in the data store 169 are shown generally at 177.

FIG. 17 illustrates an example of identifying differences between the spikes represented by the data stored in the spike store 162 and the spikes represented by the data stored in the modified-spike spike store 164 when the spikes represented by data in the modified-spike store 122 (and thus the spikes represented by data in the modified-spike store 164) were modified according to the multiple-bit-neuron-shift method of FIG. 12.

In FIG. 17, examples of spikes represented by data stored in the spike store 162 are shown generally at 178 and include ordered pairs of identifiers of artificial neurons and respective propagation stages of spikes of those artificial neurons. Also, in FIG. 17, examples of spikes represented by data stored in the modified spike store 164 are shown generally at 179 and also include ordered pairs of identifiers of artificial neurons and respective propagation stages of spikes of those artificial neurons. Also, in FIG. 17, examples of amplitudes of shift amounts that are identified by identifying differences between the spikes represented by the data stored in the spike store 162 and the spikes represented by the data stored in the modified-spike spike store 164 are shown generally at 180. Also, in FIG. 17, examples of bits that are identified from the identified shift amounts and stored in the data store 169 are shown generally at 181.

Communication Data

In the examples of FIGS. 1 to 17, data from the data store 121 of the data-transmitting device 101 may be transmitted to the data store 169 of the data-receiving device 102. Such data may be considered to be communication data. In various embodiments, such communication data may include one or more documents (including documents at least partially generated by artificial intelligence as described elsewhere herein), voice data, video data, other data, or a combination of two or more thereof. In some embodiments, data such as voice data or video data may be communicated as described herein in real time to permit secure discussions by voice, by video, or both, for example.

However, transmitting such communication data in the examples of FIGS. 1 to 17 between the data-transmitting device 101 and the data-receiving device 102 involves transmitting the one or more data-transmission signals 163 including transmission data representing some or all of the spikes represented by data stored in the modified-spike store 122. If another party intercepted the one or more data-transmission signals 163, and if the other party does not have any information regarding the data-transmission dynamical system implemented by the data-transmitting device 101 (such as information from the system-data store 110) or any information regarding the data-receiving dynamical system implemented by the data-receiving device 102 (such as information from the system-data store 160), then the one or more data-transmission signals 163 may, at best, indicate only spikes represented by data stored in the modified-spike store 122, and determining the communication data transmitted from the data store 121 to the data store 169 may be very difficult or impossible for the other party. Therefore, the modification of spikes in the examples of FIGS. 3-12 are examples of encrypting (or, more generally, encoding) data from the data store 121 of the data-transmitting device 101, and the examples of FIGS. 13-17 are examples of decrypting (or, more generally, decoding), by the data-receiving device 102, the data from the data store 121 of the data-transmitting device 101.

In some embodiments, the data stored in the system-data store 110 may be modified to create a different data-transmission dynamical system, and the spikes represented by data stored in the modified-spike store 122 may be replaced with spikes modified according to the different data-transmission dynamical system. As a result, modifying the data stored in the system-data store 110 may prevent the data-receiving device 102 from further decoding or decrypting data from the data store 121 without a corresponding modification to the data in the system-data store 160.

Examples of the System 100 and Some Alternative Embodiments

Embodiments of the system 100 may vary, and alternative embodiments may differ.

For example, the system 100 as described above includes one-way communication from the data-transmitting device 101 to the data-receiving device 102, but alternative embodiments may differ. For example, some embodiments may include two or more devices, each of which may function as a data-transmitting device, as a data-receiving device, or as both as described above to permit two-way communication, communication between two or more devices, or both. For example, the system 100 may facilitate encryption within a virtual private network (VPN).

Also, in some embodiments, the data-transmitting device 101 and the data-receiving device 102 may be in short-term communication, intermittent communication, or constant communication, communicating communication data as described above. To do so, the data-transmitting device 101 and the data-receiving device 102 may propagate their respective dynamical systems intermittently, constantly, or otherwise as may be required to produce enough spikes for whatever communication may be desired.

In some embodiments, the data-receiving device 102 may be a medical device (such as a pacemaker or an insulin pump), and the data-transmitting device 101 may transmit communication data to control the medical device. Such a medical device may also function as a data-transmitting device as described herein.

Also, in some embodiments, the data-receiving device 102 may be a drone, an autonomous vehicle, another vehicle, an Internet of things (IoT) device, or another device, and the data-transmitting device 101 may transmit communication data to control such a vehicle or device. Such a vehicle or device may also function as a data-transmitting device as described herein.

Also, in some embodiments, the data-transmitting device 101 may include or be in communication with one or more sensors, and communication data as described above may indicate measurements of the one or more sensors.

Also, in some embodiments, the data-receiving device 102 may produce an output signal 182 that may include some or all of the communication data or may otherwise be responsive to some or all of the communication data, for example to control a medical device, a drone, an autonomous vehicle, another vehicle, or another device as described above.

Some embodiments may involve machine-to-machine applications. Such a machine-to-machine application may include a protocol for sharing data between two or more devices. As described above, a device may function as a data-transmitting device, as a data-receiving device, or as both to permit two-way communication, communication between two or more devices, or both. System 100 configured as a machine-to-machine application may facilitate securely exchanging data between the devices of the machine-to-machine application. Additionally, or alternatively, an identity of a device or data from a device may be authenticated as described herein.

A machine, as described herein, may include, or be, a hardware device such as a sensor, an actuator, a motor, etc. Additionally, or alternatively, a machine may include, or be, an at least partially software implemented device such as an artificial intelligence system, software simulation, etc. In some embodiments, the artificial intelligence system includes, or is, a machine learning system. The machine learning system may include, or be, a trained machine learning system. The at least partially software implemented device may be implemented by, for example, a processor configured to execute instructions which when executed cause operation of the software implemented device. The instructions may, for example, be retrieved from a data store. Additionally, or alternatively, a machine may include, or be, any device described herein.

In some embodiments, the machine-to-machine application includes at least one principal device and one or more data collection devices which collect data and may transmit communication data (which indicates the collected data) to control the principal device. The at least one principal device may include, or be, an autonomous or semi-autonomous system such as a robot, an autonomous vehicle, a factory, a supply chain, etc.

In some embodiments, a data-receiving device (such as the data-receiving device 102) may be the at least one principal device. Each of the one or more data collection devices may include or be a data-transmitting device (such as the data-transmitting device 101), and may transmit communication data as described above to the principal device to control the principal device. A data collection device may transmit data independently of another data collection device. The at least one principal device may also function as a data-transmitting device as described herein.

In some embodiments, the principal device may include or be a physical system such as a robot, a factory, a supply chain, etc. The one or more data collection devices may, for example, include or be one or more sensors. The communication data transmitted by the data collection devices may indicate measurements of the one or more sensors, and may be used to at least partially control the physical system.

In some embodiments, the principal device includes or is an at least partially software implemented system comprising for example, a simulation of a physical system such as a robot, a factory, a supply chain, etc. The one or more data collection devices may include or be one or more sensors. The communication data transmitted by the data collection devices may indicate measurements of the one or more sensors, and may be used to at least partially control the software implemented system.

In some embodiments, the principal device includes both a physical system and a software implemented system.

In some embodiments, the machine-to-machine application includes a network (or networks) of devices. As described above, the devices may be hardware devices or software implemented devices or both. In some embodiments, the machine-to-machine application includes networks of artificial intelligence systems, sensors, robots, human-accessible interface machines, machines, etc.

In some embodiments, at least some data may be collected from a human by at least one device of a machine-to-machine application. For example, a human-accessible interface machine may include a user interface to collect data from a human user. In some embodiments, the human user may input data through the input device 108 of the data-transmitting device 101. In some embodiments, the machine-to-machine application includes a network (or networks) of devices which collect data from any one of, more than one of, or all of humans, machines, sensors, or other sources.

Still other embodiments of the system 100 may differ. In general, embodiments of the system 100 or alternative embodiments may modify output of a data-transmission dynamical system with modifications according to communication data to encode the communication data, encrypt the communication data, or both, and embodiments of the system 100 may compare the modified output of the data-transmission dynamical system (which is received as transmission data) to output of a data-receiving dynamical system synchronized with the data-transmission dynamical system to decode, decrypt, or both decode and decrypt the communication data.

Transmitting and Receiving within a Device

The examples of FIGS. 1-17 are examples only, and alternative embodiments may differ. For example, in the examples of FIGS. 1-17, the data-transmitting device 101 and the data-receiving device 102 are shown as physically separate devices.

Figure 18:
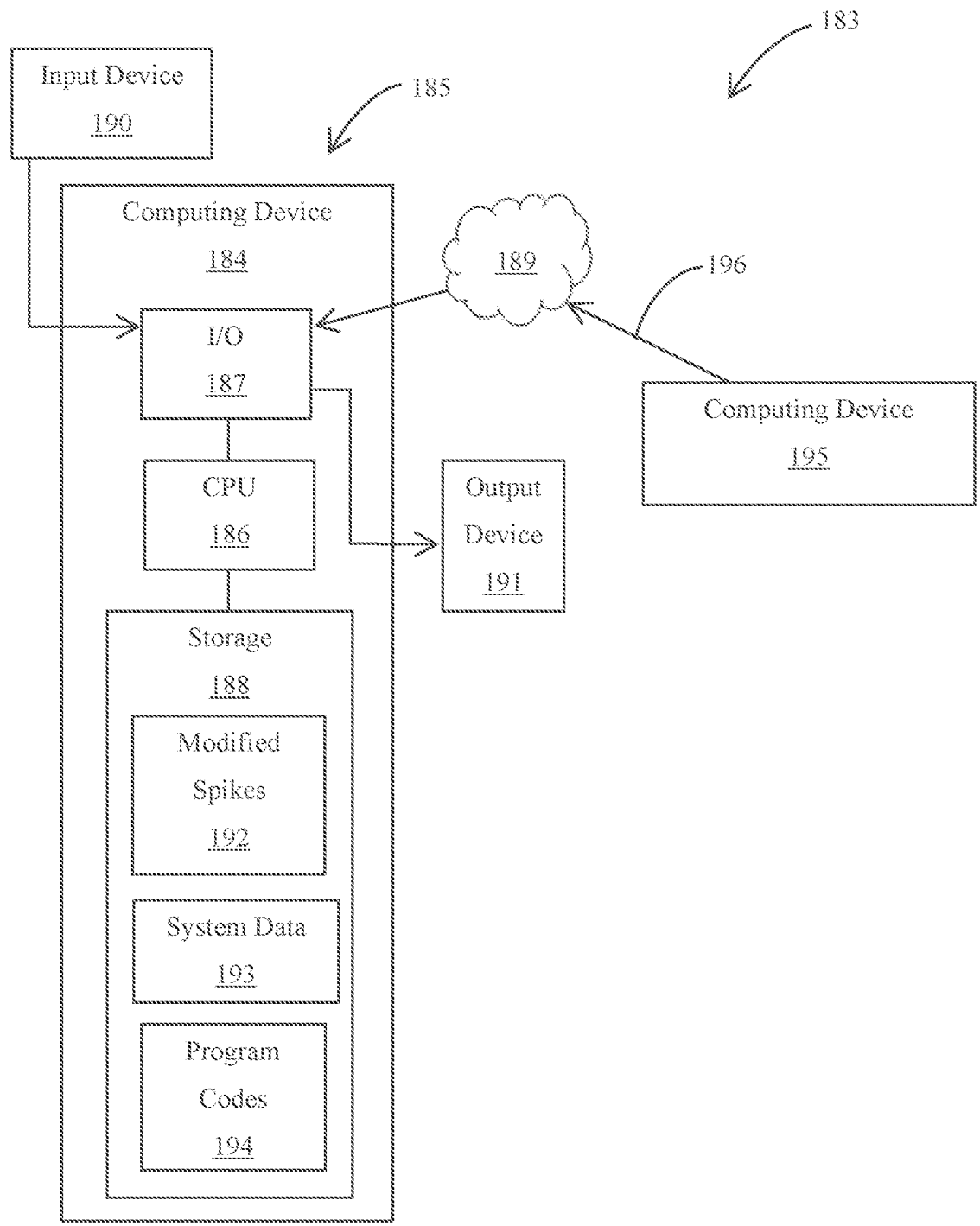
FIG. 18 schematically illustrates a data-transmission system according to another embodiment.

However, referring to FIG. 18, a data-transmission system according to another embodiment is shown generally at 183 and includes a computing device 184. The computing device 184 may, in various embodiments, include a user computing device, a server computing device, a personal computer, a laptop computer, a tablet computer, a smartphone, a smart watch, or one more other devices including one or more other computing devices as described herein, or a combination of two or more thereof.

The computing device 184 includes a processor circuit shown generally at 185 and including a CPU 186. However, alternative embodiments may include one or more alternatives to the CPU 186, such as one or more microprocessors, one or more analog circuits, one or more configurable logic blocks, one or more ASICs, or one or more FPGAS, for example. The processor circuit 185 also includes an I/O interface 187 and a data-storage device 188, both in communication with the CPU 186.

The I/O interface 187 may be similar to the I/O interface 105 and may be operable to transmit signals to, and receive signals from, a computer network 189. The I/O interface 187 may also be operable to receive signals from one or more input devices, such as an input device 190, and to transmit signals to one or more output devices such as an output device 191.

The processor circuit 185 is an example only, and alternative embodiments may differ. For example, alternative embodiments may include more, fewer, or different components. Also, in alternative embodiments, components described herein may be combined or separated into separate components. Alternative embodiments may include one or more alternatives to components as described herein.

The data-storage device 188 may be similar to the data-storage device 106 and may include a modified-spike store 192 that may be similar to the modified-spike store 164. The modified-spike store 192 may store data representing spikes that have been modified according to a method such as one of the methods of FIGS. 3-12 for example, such that the modified-spike store 192 may store encoded or encrypted data.

The data-storage device 188 may also include a system-data store 193 that may be similar to the system-data store 160 and that may store data defining a data-receiving dynamical system implemented by the CPU 186 and data indicating a state for the data defining a data-receiving dynamical system implemented by the CPU 186.

The data-storage device 188 may also include a program-codes store 194 that may be similar to the program-codes store 161. Program codes stored in the program-codes store 194 may include blocks of program codes that, when executed by the CPU 186, cause the processor circuit 185 to propagate the data-receiving dynamical system implemented by the CPU 186 according to data stored in the system-data store 193 and to decode or decrypt the data stored as modified spikes in the modified-spike store 192 according to a method such as one of the methods of FIGS. 13-17 for example.

As a result, the data-storage device 188 may be a data-transmitting device, and the CPU 186 may be a data-receiving device. In general, a data-transmitting device and a data-receiving device may be within one device, such as the computing device 184 for example. In this embodiment, data that are encrypted as modified spikes in the modified-spike store 192 are stored on the computing device 184 as encoded or encrypted data, and are only in a decoded or decrypted form when temporarily accessed as described above. As a result, the decrypted data may be more difficult to obtain.

The system 183 also includes a computing device 195 that may, in various embodiments, include a user computing device, a server computing device, a personal computer, a laptop computer, a tablet computer, a smartphone, a smart watch, or one more other devices including one or more other computing devices as described herein, or a combination of two or more thereof. The computing device 195 may also be in communication with the computer network 189 and may transmit a state-change signal 196 to the computing device 184. The computing device 184 may be programmed such that, in response to receiving the state-change signal 196, the processor circuit 185 causes a change to the data stored in the system-data store 193 such that the CPU 186 is no longer able to decode or decrypt the data stored as modified spikes in the modified-spike store 192.

As a result, in some embodiments, the computing device 184 may be able to decode or decrypt data in the modified-spike store 192 unless and until the computing device 184 receives the state-change signal 196, so the computing device 195 may be able to control whether the computing device 184 is able to decode or decrypt data in the modified-spike store 192.

In some embodiments, program codes stored in the program-codes store 194 may generate the modified spikes represented by data stored in the modified-spike store 192. For example, as described above regarding the embodiment of FIG. 1, the system-data store 193 may store constant weights $w_{ij}$ as described above, but the processor circuit 185 may determine initial node values $v_i$ and the initial input values $r_j$ according to at least a user name, password, or both as entered by the user of the computing device 184 (or, more generally, according to a key). In such embodiments, the processor circuit 185 may, for example, apply a hash function to the a user name, password, or both (or, more generally, to a key) and generate initial node values $v_i$ and initial input values $r_j$ according to output of the hash function.

For example, such a hash function may produce an integer according to the password as entered and as received at the block 198 (or, more generally, according to a key), and such an integer may be a seed for a pseudorandom number generator. The pseudorandom number generator, initialized with such a seed, may then generate initial node values $v_i$ and initial input values $r_j$. However, alternative embodiments may differ.

In such an embodiment, some or all of the node values $v_i$, some or all of the input values $r_j$, or both may be removed from the system-data store 193 after the data representing the modified spikes are stored in the modified-spike store 192. Then, decoding or decrypting data in the modified-spike store 192 would require the user name, password, user name and password, or other key to provide initial node values $v_i$ and input values $r_j$ as required to simulate the same dynamical system that was used to generate the spikes represented by data stored in the modified-spike store 192. As a result, data may be encrypted and stored on the computing device 184 with a user name, password, user name and password, or other key such that the same user name, password, user name and password, or other key would be required to decrypt the data.

User Authentication

In the examples of FIGS. 1-18, communication data may be encoded or encrypted for transmission from a data-transmitting device to a data-receiving device, and decoded or decrypted by the data-receiving device. However, alternative embodiments do not necessarily involve encryption or decryption.

Figure 19:
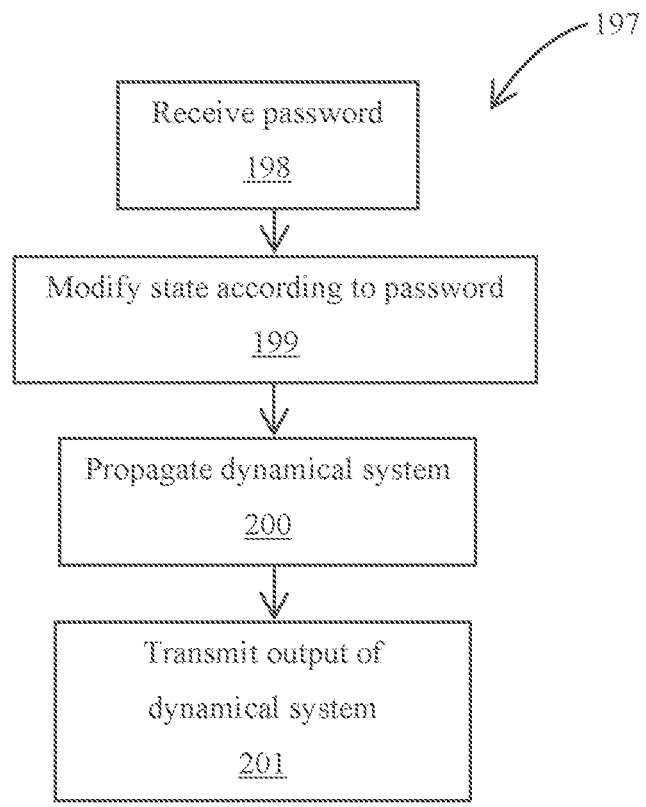
FIG. 19 schematically illustrates other example program codes of the program memory of the data-storage device of the data-transmitting device of the data-transmission system of FIG. 1.

For example, referring to FIGS. 1 and 19, a user of the data-transmitting device 101 may enter a password (or, more generally, a key, which may be any input and not necessarily a password) using an input device such as the input device 108. The program codes stored in the program-codes store 111 may include blocks of program codes shown generally at 197 that, when executed by the CPU 104, cause the processor circuit 103 to produce user-authentication data in response to the password.

The blocks 197 may begin at a block 198 including program codes that, when executed by the CPU 104, cause the processor circuit 103 to receive the password from the input device such as the input device 108.

After the block 198, the blocks 197 may continue at a block 199 including program codes that, when executed by the CPU 104, cause the processor circuit 103 to modify data of the system-data store 110 according to at least the password as entered and as received at the block 198. For example, in some embodiments, the system-data store 110 may store constant weights $w_{ij}$ as described above, but the program codes at the block 199, when executed by the CPU 104, cause the processor circuit 103 to modify the node values $v_i$ and the input values $r_j$ according to at least the password as entered and as received at the block 198 (or, more generally, according to a key).

For example, in some embodiments, the program codes at the block 199, when executed by the CPU 104, cause the processor circuit 103 to apply a hash function to the password as entered and as received at the block 198 (or, more generally, to a key). Such a hash function may produce an integer according to the password as entered and as received at the block 198 (or, more generally, according to a key), and such an integer may be a seed for a pseudorandom number generator. The pseudorandom number generator, initialized with such a seed, may then generate initial node values $v_i$ and initial input values $r_j$. However, alternative embodiments may differ.

After the block 199, the blocks 197 may continue at a block 200 including program codes that, when executed by the CPU 104, cause the processor circuit 103 to propagate a dynamical system (in this example, the data-transmission dynamical system implemented by the data-transmitting device 101 as described above, although alternative embodiments may differ) according to the data of the system-data store 110 as modified at the block 199. For example, in some embodiments, the program codes at the block 200 may, when executed by the CPU 104, cause the processor circuit 103 to generate spikes within a particular range of propagation stages and to store data representing some or all such spikes in the spike store 119.

After the block 200, the blocks 197 may continue at a block 201 including program codes that, when executed by the CPU 104, cause the processor circuit 103 to transmit at least some output of the data-transmission dynamical system implemented by the data-transmitting device 101, from the spike store 119, to the data-receiving device 102. For example, the program codes at the block 201 may, when executed by the CPU 104, cause the processor circuit 103 to transmit one or more data-transmission signals (that may be similar to the one or more data-transmission signals 163, for example). The one or more data-transmission signals may include transmission data including at least some output of the data-transmission dynamical system implemented by the data-transmitting device 101 from the spike store 119, and may be transmitted to the data-receiving device 102 using the computer network 107.

Figure 20:
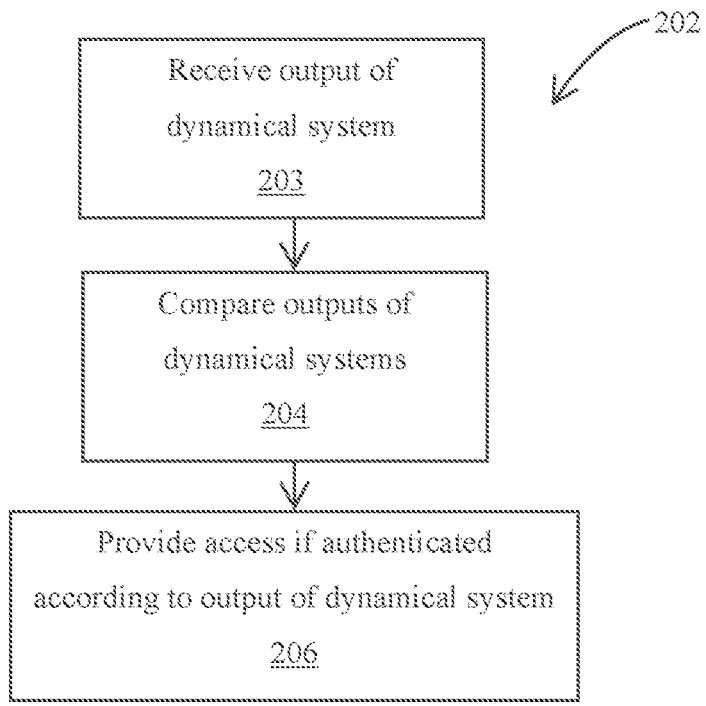
FIG. 20 schematically illustrates other example program codes of the program memory of the data-storage device of the data-receiving device of the data-transmission system of FIG. 1.

Referring to FIGS. 1, 19, and 20, the program codes stored in the program-codes store 161 may include blocks of program codes shown generally at 202 that, when executed by the CPU 157, cause the processor circuit 156 to authenticate the user in response to the user-authentication data (or transmission data) transmitted at the block 201.

The blocks 202 may begin at a block 203 including program codes that, when executed by the CPU 157, cause the processor circuit 156 to receive the user-authentication data (or transmission data) transmitted at the block 201.

After the block 203, the blocks 202 may continue at a block 204 including program codes that, when executed by the CPU 157, cause the processor circuit 156 to compare the user-authentication data received at the block 203 to user-authentication data stored in a user-data store 205 in the data-storage device 159. For example, the user-data store 205 may store user-authentication data as would be transmitted at the block 201 in response to receiving a correct password at the block 198. Such user-authentication data in the user-data store 205 may be generated by simulating a dynamical system synchronized with the dynamical system that was propagated at the block 200. In some embodiments, the user of the data-transmitting device 101 may be authenticated if user-authentication data associated with the user and stored in the user-data store 205 matches the user-authentication data received at the block 203.

After the block 204, the blocks 202 may continue at a block 206 including program codes that, when executed by the CPU 157, cause the processor circuit 156 to provide access to the user of the data-transmitting device 101 if the user of the data-transmitting device 101 was authenticated at the block 204.

If, at the block 206, the user was authenticated, then the data-receiving device 102 may produce the output signal 182 indicating that the user was authenticated, or the data-receiving device 102 may otherwise grant access to the user. For example, if the user was authenticated at the block 206, then the data-receiving device 102 may grant, to the user, access to one or more physical spaces (such as through a door or a building or of a vehicle), to one or more physical objects (such as a computer), to one or more documents, or to one or more websites, applications, data-storage devices, computer networks, computing devices, or other electronic resources that may, for example, allow the user to access information, provide information, or conduct financial or other transactions. Herein, "allow" does not require allowing directly, and may include steps that directly or indirectly allow or permit access.

Document Authentication

Another embodiment may involve document authentication. In such an embodiment, the program codes at the block 201 may, when executed by the CPU 104, cause the processor circuit 103 to transmit one or more data-transmission signals as described above, but the one or more data-transmission signals may include transmission data representing both:

1. the at least some output of the data-transmission dynamical system implemented by the data-transmitting device 101 from the spike store 119 as described above; and
2. a document that may be stored in the data store 121.

Such a document may include a photograph. For example, in embodiments in which data-transmitting device 101 is a camera, such a document may include a photograph captured by an image sensor of the data-transmitting device 101. Of course alternative embodiments may vary, and such a document may include one or more of a variety of different documents. In some embodiments, such a document (or a document described elsewherein herein) includes a document generated, or at least partially generated, by at least one artificial intelligence system. For example, such a document at least partially generated by at least one artificial intelligence system may include one of, more than one of, or all of a photograph, an image, a series of images, an essay, an article, a form, a data table, speech, music, an auditory file, an avitar, a token, a movie, a biomedical signal, medical information, predicted data, a time-series (e.g., a data set that tracks a sample over time), one or more features parameterizing a model (e.g., a model such as a simulated human personality, a fictional non-human agent, representation(s) of living or non-living objects, environmental representations, one or more relationships among objects which may include actions, etc.), etc. generated at least partially by the at least one artificial intelligence system. In some embodiments, the at least one artificial intelligence system includes or is a machine learning system. In some embodiments, the machine learning system includes or is a trained machine learning system.

The at least some output of the data-transmission dynamical system, as described above for document authentication, may be referred to as a watermark. In some embodiments, such a watermark may confirm that a document was generated by the data-transmitting device 101. In some embodiments, such a watermark may be stored in metadata of a document. Also, in some embodiments, if the document is a photograph or other image, then the watermark may be incorporated into the image using steganography, for example.

As a result, transmission data transmitted in one or more data-transmission signals from the data-transmitting device 101 to the data-receiving device 102 may represent a document and may also represent authentication of the document. Such data representing both the document and authentication of the document may stored in the data-storage device 159 or elsewhere and represent an authenticated document.

For example, in some embodiments, the data-receiving device 102 may confirm authentication of a document by receiving transmission data as described above and confirming that the transmission data, representing the at least some output of the data-transmission dynamical system implemented by the data-transmitting device 101 from the spike store 119 as described above, to authentication data, for example as in the block 204 as described above. In some embodiments, the data-receiving device 102 may produce the output signal 182 indicating that the document was authenticated.

The data-transmitting device 101 as described above implements functions including data encoding or encryption, user authentication, and document authentication, and the data-receiving device 102 as described above implements similar related functions. However, alternative embodiments need not implement all such functions or the same functions. Rather, alternative embodiments may implement one, more than one, or all such functions, and may implement alternative or other functions such as those described below or still other functions.

Device Authentication

Other embodiments may involve authenticating possession of output of a device, or authenticating a device.

Figures 21, 22:
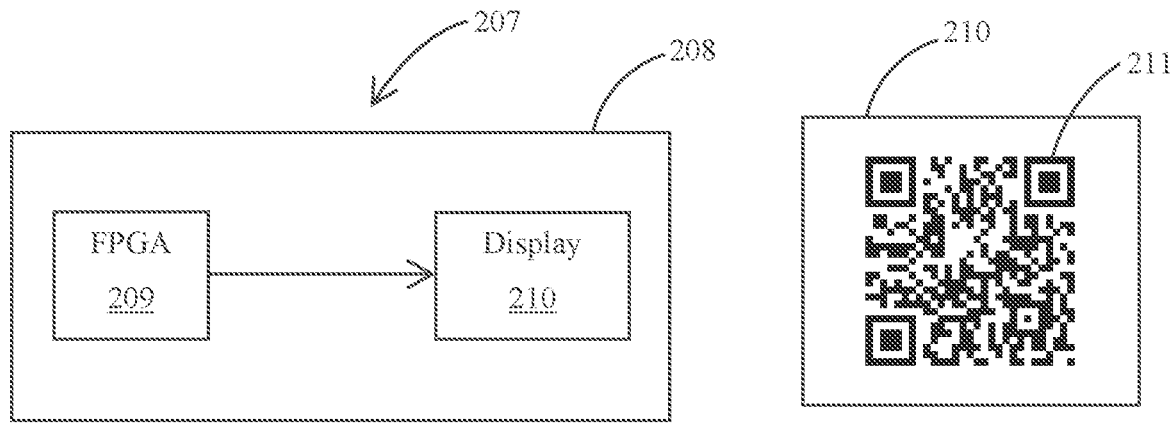
FIG. 21 schematically illustrates a data-transmitting device according to another embodiment.
FIG. 22 schematically illustrates a display device of the data-transmitting device of FIG. 21.

For example, referring to FIG. 21, a data-transmitting device according to another embodiment is shown generally at 207 and includes a card 208. The card 208 may be sized similar to a credit card, for example. The card 208 may be powered by battery power, by light, or by induction, for example.

The card 208 includes an FPGA 209 that may be configured to implement a data-transmission dynamical system such as an artificial spiking neural network as described above. However, the FPGA 209 is an example only, and alternative embodiments may differ. For example, the data-transmitting device 225 (described below) includes an ASIC 226 that may function similarly to the FPGA 209, and still other embodiments may differ.

The FPGA 209 may store node values $v_i$ and input values $r_j$ as those values change, for example during propagation of the artificial spiking neural network. The FPGA 209 may also store data representing weights $w_{ij}$ and of the constants $\tau_s$, $\tau_m$, I, $T_j$, and $s_j$ as those values may or may not change over time. In some embodiments, values of the weights $w_{ij}$ may be encoded in a plurality of resistors or other circuit elements. In such embodiments, the resistors or other circuit elements may allow the FPGA 209 to perform operations according to the weights $w_{ij}$ while the actual values of the weights $w_{ij}$ may be difficult or impossible to determine.

As indicated above, one or more data-transmitting-device-initial-state-indication signals 114 may be transmitted from the data-receiving device 102 or from one or more other devices. In some embodiments, the data-receiving device 102 may generate the initial state for the data-transmission dynamical system implemented by the data-transmitting device 101, for example using a pseudorandom number generator. For example, in the embodiment of FIG. 21, the data-receiving device 102 may generate one or more data-transmitting-device-initial-state-indication signals indicating initial node values $v_i$ and initial input values $r_j$ for a data-transmission dynamical system implemented by the FPGA 209 (and thus by the data-transmitting device 207). Outputs generated by such a data-transmission dynamical system may be transmitted back from the data-transmitting device 207 to the data-receiving device 102, which may simulate such a data-transmission dynamical system using weights $w_{ij}$ that are stored by the FPGA 209, and by comparing outputs that are transmitted back from the data-transmitting device 207 to the data-receiving device 102 to outputs of simulation of the data-transmission dynamical system using weights $w_{ij}$ that are stored by the FPGA 209 by the data-receiving device 102, the data-receiving device 102 may determine whether the outputs that were transmitted to the data-receiving device 102 were transmitted from the data-transmitting device 207.

The card 208 also includes a display device 210 that may be controlled by the FPGA 209 to cause the display device 210 to display, for example, a Quick Response (QR) code 211 as shown in FIG. 22. The display device 210 may be a liquid-crystal display (LCD) or any other display device that may display an optical output such as the QR code 211. The QR code 211 is an example only, and alternative embodiments may include other outputs such as other types of optical outputs. However, in general, output of a data-transmission dynamical system implemented by the FPGA 209 (and thus by the data-transmitting device 207) may be encoded to an output such as a QR code, and the FPGA 209 may control the display device 210 to cause the display device 210 to display an optical output indicating at least some output of the data-transmission dynamical system implemented by the data-transmitting device 207. Also, the display device 210 is an example only, and alternative embodiments may include one or more other types of output. For example, the transmitter 221 (described below) may output radio outputs, and still other alternative embodiments may differ.

In some embodiments, the FPGA 209 may receive at least one signal directing the FPGA 209 to propagate a data-transmission dynamical system implemented by the data-transmitting device 207 to a particular propagation stage. In such embodiments, in response to receiving at least one such signal, the FPGA 209 may propagate the data-transmission dynamical system implemented by the data-transmitting device 207 to the particular propagation stage and cause the display device 210 to display an optical output indicating at least some output of the data-transmission dynamical system implemented by the data-transmitting device 207 when propagated to the particular propagation stage. For example, such output could include representations of some or all of spikes generated by an artificial spiking neural network implemented by the data-transmitting device 207.

In other embodiments, the FPGA 209 may propagate the data-transmission dynamical system implemented by the data-transmitting device 207 periodically or for other reasons. In some such embodiments, the FPGA 209 may cause the display device 210 to display an optical output indicating at least some output of the data-transmission dynamical system implemented by the data-transmitting device 207, and also indicating a propagation stage of the data-transmission dynamical system implemented by the data-transmitting device 207 that created such output.

In some embodiments, the display device 210 may display output as described above at all times. In other embodiments, the display device 210 may display output as described above when requested, for example in response to one or more signals received at the FPGA 209 or in response to user actuation of a user input device of the card 208.

Output of the display device 210 may be presented to a camera 212 (shown in FIG. 1) or one or more other devices that may transmit one or more data-transmission signals 213 (for example, using the computer network 107) to the data-receiving device 102. The one or more data-transmission signals 213 may include transmission data from the camera 212 and representing the QR code 211 or any other visible or optical output of the display device 210.

Figure 23:
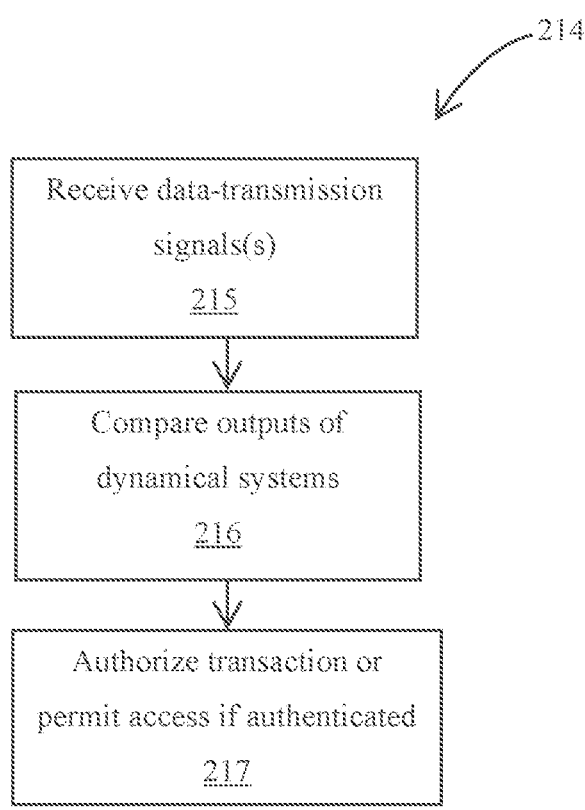
FIG. 23 schematically illustrates other example program codes of the program memory of the data-storage device of the data-receiving device of the data-transmission system of FIG. 1.

Referring to FIGS. 1 and 23, the program codes stored in the program-codes store 161 may include blocks of program codes shown generally at 214 that, when executed by the CPU 157, cause the processor circuit 156 to authenticate possession of output of the data-transmitting device 207 (or of the card 208) in response to receiving the one or more data-transmission signals 213.

The blocks 214 may begin at a block 215 including program codes that, when executed by the CPU 157, cause the processor circuit 156 to receive the one or more data-transmission signals 213.

After the block 215, the blocks 214 may continue at a block 216 including program codes that, when executed by the CPU 157, cause the processor circuit 156 to identify, from transmission data of the one or more data-transmission signals 213, output of the data-transmission dynamical system implemented by the data-transmitting device 207. For example, if the data-transmission dynamical system implemented by the data-transmitting device 207 includes spikes generated by an artificial spiking neural network implemented by the data-transmitting device 207, then the program codes at the block 216, when executed by the CPU 157, may cause the processor circuit 156 to identify, from the transmission data of the one or more data-transmission signals 213, the spikes generated by an artificial spiking neural network implemented by the data-transmitting device 207. Such identification may involve decoding the QR code 211 or other output displayed by the display device 210 and represented in transmission data from the camera 212 and included in the one or more data-transmission signals 213.

The program codes at the block 216, when executed by the CPU 157, may cause the processor circuit 156 to compare the output of the data-transmission dynamical system implemented by the data-transmitting device 207 to simulated output of same dynamical system as the data-transmission dynamical system implemented by the data-transmitting device 207.

As indicated above, in some embodiments, the FPGA 209 may receive at least one signal directing the FPGA 209 to propagate a data-transmission dynamical system implemented by the data-transmitting device 207 to a particular propagation stage. In such embodiments, at the block 216, the simulated output may be simulated output of the same dynamical system to the same particular propagation stage.

As also indicated above, in some embodiments, the FPGA 209 may cause the display device 210 to display an optical output indicating at least some output of the data-transmission dynamical system implemented by the data-transmitting device 207, and also indicating a propagation stage of the data-transmission dynamical system implemented by the data-transmitting device 207 that created such output. In such embodiments, the program codes at the block 216, when executed by the CPU 157, may cause the processor circuit 156 to identify, from transmission data of the one or more data-transmission signals 213, the propagation stage of the data-transmission dynamical system, and the simulated output may be simulated output of the same dynamical system to the propagation stage identified from the data from the one or more data-transmission signals 213.

However, in other embodiments, the FPGA 209 may propagate the data-transmission dynamical system implemented by the data-transmitting device 207 periodically or at other times that the data-receiving device 102 will be able to determine such that the simulated output at the block 216 may be simulated to the correct propagation stage (accounting as may be appropriate for any lag in transmission of the one or more data-transmission signals 213).

At the block 216, possession of output of the data-transmitting device 207 (or of the card 208) may be authenticated if output of the data-transmission dynamical system implemented by the data-transmitting device 207, as identified from transmission data of the one or more data-transmission signals 213, matches the simulated output of same dynamical system as the data-transmission dynamical system implemented by the data-transmitting device 207.

After the block 216, the blocks 214 may continue at a block 217 including program codes that, when executed by the CPU 157, cause the processor circuit 156 to authorize a transaction or permit access if the possession of output of the data-transmitting device 207 (or of the card 208) was authenticated at the block 216.

For example, in some embodiments, the card 208 may be a debit or credit card, and the one or more data-transmission signals 213 may be generated and transmitted to the data-receiving device 102 in response to holding the card 208 near a point-of-sale (POS) device.

In other embodiments, the card 208 may be an access card for accessing a physical spaces (such as through a door or a building or of a vehicle) or a physical object (such as a computer), and the one or more data-transmission signals 213 may be generated and transmitted to the data-receiving device 102 in response to holding the card 208 near an access point to the physical space or object.

In other embodiments, authenticating possession of output of the card 208 (and thus of the data-transmitting device 207) may be used to grant access to one or more physical objects, to one or more documents, or to one or more websites, applications, data-storage devices, computer networks, computing devices, or other electronic resources that may, for example, allow the user to access information, provide information, or conduct financial or other transactions. For example, the camera 212 may be a camera of a personal computer, smartphone, tablet, or other computing device, when signing onto a webpage or into an application using the computing device, when attempting to access a restricted document, or authorizing a transaction such as a financial transaction, a user may hold the data-transmitting device 207 within a field of view of the camera 212, and successful authentication of possession of the output of the data-transmitting device 207 may (either alone, or in combination with other authentication data such as a user name and password for two-factor or multi-factor authentication) may allow access to the webpage, other application, or document, or may authorize the transaction.

For example, a social-media website may require presenting output of the data-transmitting device 207 from time to time (for example, after a particular period of time since the last time that output of the data-transmitting device 207 was presented, or after a particular number of posts to the social-media website since the last time that output of the data-transmitting device 207 was presented). Doing so may allow the social-media website to verify that posts to the social-media website are not automated, and doing so may allow the social-media website to enforce any bans or otherwise restrict posting to individuals who possess a data-transmitting device that authorizes posts to the social-media website.

In other embodiments, authenticating possession of a data-transmitting device may indicate authenticity of a product. In such embodiments, the data-transmitting device 207 may not be a card, but may instead be a device embedded in, attached to, or otherwise associated with a product, and authenticating possession of output of the data-transmitting device 207 may authenticate the product to distinguish the product from any counterfeit that would not produce the same output.

In other embodiments in which a data-transmitting device includes a telephone or another communication device such as a mobile communication device, authenticating possession of the data-transmitting device may indicate possession of the telephone or other communication device. In such embodiments, authenticating possession of output of the telephone or other communication device may be more reliable than voice recognition or conventional caller identification. In such embodiments, another telephone or another communication device may be a data-receiving device that may authenticate a telephone or other communication device that is a data-transmitting device.

In some embodiments, the data-receiving device 102 may produce the output signal 182 indicating that the device was authenticated, for example to grant access or authorize a transaction as described above.

Therefore, the data-transmitting device 207 may be used to authorize financial transactions, to authorize access to a physical location, or for one or more other purposes in response to authenticating possession of output of the data-transmitting device 207 as described above. The data-transmitting device 207 may facilitate relatively secure authentication of possession of output of the data-transmitting device 207 because the one or more data-transmission signals 213 include transmission data representing output of a dynamical system implemented by the data-transmitting device 207, and creating a duplicate of the data-transmitting device 207 (or otherwise creating one or more data-transmission signals that would appear to be from the data-transmitting device 207) would be difficult or impossible without the actual values of the weights $w_{ij}$.

The actual values of the weights $w_{ij}$ may be difficult or impossible to determine from the data-transmitting device 207 itself because, as indicated above, values of the weights $w_{ij}$ may be encoded in a plurality of resistors or other circuit elements that may allow the FPGA 209 to perform operations according to the weights $w_{ij}$ while the actual values of the weights $w_{ij}$ may be difficult or impossible to determine.

Also, the actual values of the weights $w_{ij}$ may be difficult or impossible to determine from the one or more data-transmission signals 213 even if the one or more data-transmission signals 213 are intercepted.

Figure 24:
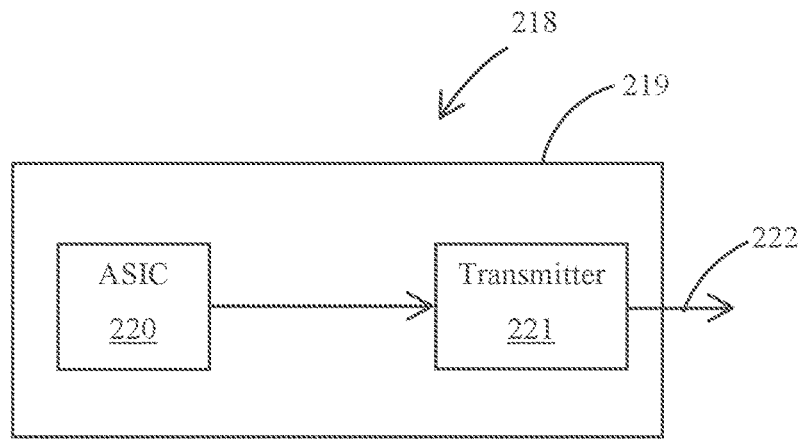
FIG. 24 schematically illustrates a data-transmitting device according to another embodiment.

The data-transmitting device 207 is an example only, and alternative embodiments may differ. For example, referring to FIG. 24, a data-transmitting device according to another embodiment is shown generally at 218 and includes a card 219. The card 219 may be sized similar to a credit card, for example. The card 219 includes an ASIC 220 that may function like the FPGA 209 as described above.

The card 219 also includes a transmitter 221 that may be controlled by the ASIC 220 to cause the transmitter 221 to transmit output 222 such as near-field communication (NFC) radio signals, radio-frequency identification (RFID) radio signals, Bluetooth™ radio signals, or other outputs such as other radio outputs for example. Outputs from the transmitter 221 may function like outputs of the display device 210 as described above.

In some embodiments, the data-transmitting device 218 may be magnetically attached to a smartphone or embedded in or otherwise attached to a case for a smartphone. In such embodiments, the transmitter 221 may transmit the output 222 to such a smartphone, which may enable the smartphone to transmit such data, and be authenticated for possession of the output of the data-transmitting device 218 as described herein for example. In some embodiments, the data-transmitting device 218 may be a wearable device or embedded in or otherwise attached to a wearable device.

The data-transmitting devices 207 and 218 include cards, but alternative embodiments may differ. For example, alternative embodiments may include a user computing device, a server computing device, a personal computer, a laptop computer, a tablet computer, a smartphone, a smart watch, or one more other devices that may function similarly to the data-transmitting devices 207 and 218 as described above.

Figure 25:
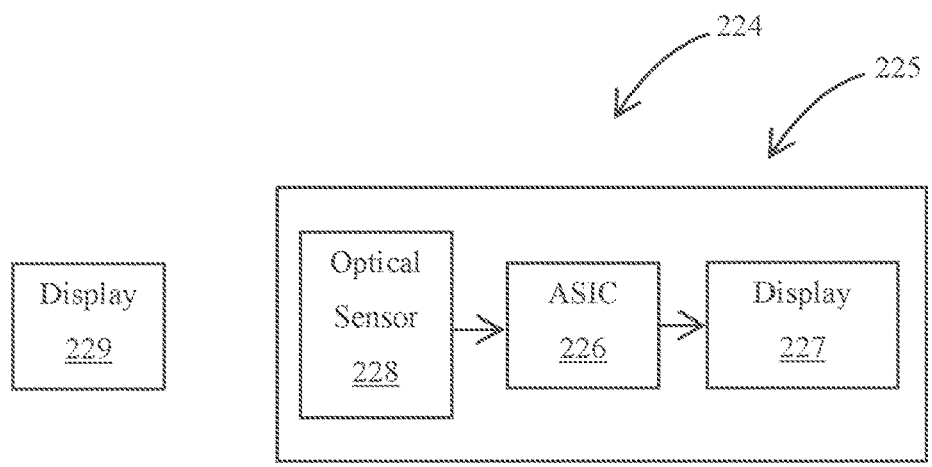
FIG. 25 schematically illustrates a data-transmission system according to another embodiment.

As another example, referring to FIG. 25, a data-transmission system according to another embodiment is shown generally 224 and includes a data-transmitting device 225 that may be similar to the data-transmitting device 207 or 218. The data-transmitting device 225 includes an ASIC 226 that may be similar to the ASIC 220 as described above. The data-transmitting device 225 may therefore implement a data-transmission dynamical system as described above.

The data-transmitting device 225 also includes a display device 227 that may be similar to the display device 210 as described above.

However, the data-transmitting device 225 also includes an optical sensor 228 that may receive one or more optical signals that may indicate some or all of an initial state of the data-transmission dynamical system implemented by the data-transmitting device 225. For example, a display device 229 may flash or otherwise transmit one or more optical signals to the optical sensor 228. Such one or more optical signals transmitted from the display device 229 to the optical sensor 228 may function as one or more data-transmitting-device-initial-state-indication signals as described herein. In other words, a computing device may transmit, using one or more optical signals transmitted from the display device 229 to the optical sensor 228, some or all of an initial state for the data-transmission dynamical system implemented by the data-transmitting device 225. The display device 227 may then display an optical output indicating at least some output of the data-transmission dynamical system implemented by the data-transmitting device 207 as described above.

In the embodiment of FIG. 25, holding the data-transmitting device 225 near both the display device 229 and the camera 212 may facilitate transmission of both the one or more data-transmitting-device-initial-state-indication signals from the display device 229 to the optical sensor 228 and the output indicating at least some output of the data-transmission dynamical system implemented by the data-transmitting device 207 from the display device 227 to the camera 212 for relatively fast and easy authentication of possession of the output of the data-transmitting device 225.

Other embodiments may differ. For example, another embodiment may include the FPGA 209 as described above and the transmitter 221 as described above, or still other alternatives. For example, alternative embodiments may include one or more alternatives to the FPGA 209 or one or more alternatives to the ASIC 220, such as one or more analog circuits or one or more configurable logic blocks, for example. As another example, alternative embodiments may include one or more alternatives to the display 210 or one or more alternatives to the transmitter 221, and outputs in such alternatives may include one or more alternatives to optical outputs or radio outputs as described above.

In some embodiments, a device may be authenticated, periodically for example, to determine whether the device is authorized to access one or more websites, applications, data-storage devices, computer networks, computing devices, or other electronic resources. For example, the data-transmitting device 101 may, periodically for example, generate output of the data-transmission dynamical system implemented by the data-transmitting device 101 similar to the output of the data-transmission dynamical system implemented by the FPGA 209 as described above. In some embodiments, each time that the data-transmitting device 101 generates such output, such output may be transmitted to the data-receiving device 102 in one or more data-transmission signals. In response to receiving such one or more data-transmission signals, the data-receiving device 102 may authenticate the data-transmitting device 101, and data-transmitting device 101 may have access to a computer network or other electronic resource for only a limited period of time after each such authentication. Repeated or periodic such authentication may permit the data-transmitting device 101 to maintain access to such a computer network or other electronic resource.

In embodiments such as those described herein, a data-transmitting device may be prevented from such authentication if, for example, the data-receiving device 102 is configured no longer to accept authentication according to output of a data-transmission dynamical system implemented by the data-transmitting device. Preventing such further device authentication may be desirable for example to prevent use of a debit or credit card that is data-transmitting as described herein, for example, if the card has been reported as lost or is otherwise no longer authorized for use. As another example, preventing such further device authentication may be desirable to prevent a data-transmitting device from accessing one or more electronic resources, or to prevent the data-transmitting device from allowing access to one or more physical spaces or physical objects if, for example, the data-transmitting device has been reported as lost or is or had been possessed by an employee who has been terminated or otherwise is no longer authorized such access.

Multiple Data-Transmitting Devices

In some embodiments, more than one data-transmitting device may collectively function as a data-transmitting device as described above. Such data-transmitting devices may be independent from each other data-transmitting device implementing the data-transmission dynamical system.

Figure 27:
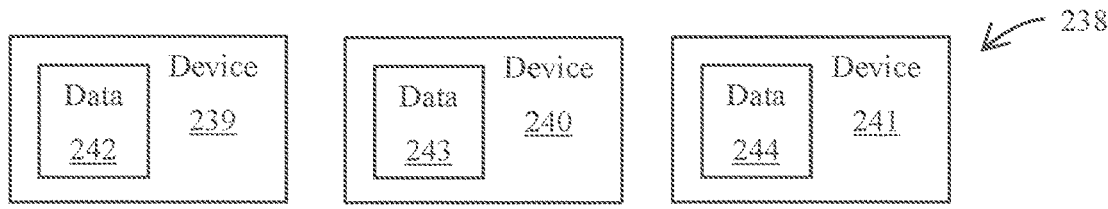
FIG. 27 schematically illustrates a data-transmitting device according to another embodiment.

For example, referring to FIG. 27, a data-transmitting device according to another embodiment is shown generally at 238 and includes a data-transmitting device 239, a data-transmitting device 240, and a data-transmitting device 241. Alternative examples may include more or fewer data-transmitting devices.

In the embodiment shown, each of the data-transmitting devices 239, 240, and 241 may function similar to the data-transmitting device 101 or any other data-transmitting device as described herein. The data-transmitting device 239 includes a data-storage device that may be similar to the data-storage device 106 and that includes a system-data store 242 that may be similar to the system-data store 110. The data-transmitting device 240 includes a data-storage device that may be similar to the data-storage device 106 and that includes a system-data store 243 that may be similar to the system-data store 110. The data-transmitting device 241 includes a data-storage device that may be similar to the data-storage device 106 and that includes a system-data store 244 that may be similar to the system-data store 110.

However, unlike the data-transmitting device 101, the system-data stores 242, 243, and 244 do not individually store all of the data defining a data-transmission dynamical system, but rather collectively store all of the data defining a data-transmission dynamical system. As a result, the data-transmitting devices 239, 240, and 241 may collectively implement a data-transmission dynamical system as otherwise described herein, for example.

In such an embodiment, transmission data as described herein, for example, may indicate involvement of all of the data-transmitting devices 239, 240, and 241 in generation of the transmission data. Such an indication of involvement may indicate that particular devices (such as the data-transmitting devices 239, 240, and 241) or particular individuals (such as users of the data-transmitting devices 239, 240, and 241) participated in generation of the transmission data as described herein, for example.

One-Way Function

An artificial neural network as described above may generate M spikes during a range of propagation stages of the artificial neural network. Each spike k E $\{1, 2, 3, \ldots, M\}$ of the M spikes may be represented as an ordered pair ordered pair such as $(i, t_{jk})$ where $i \in \{1, 2, 3, \ldots, N\}$ is an identifier identifying the artificial neuron i that generated the spike k and $t_{jk}$ represents a propagation stage of the artificial spiking neural network when the spike k was generated. Such M spikes generated by an artificial neural network may be represented as an M-tuple $s_i=((i, t_{i1}), (i, t_{i2}), (i, t_{i3}), \ldots, (i, t_{iM}))$. Such an M-tuple $s_i$ may be converted to a sequence of 2M input values $r_{i,1}, r_{i,2}, r_{i,3}, \ldots, r_{i,2M}$ that may be some of input values $r_j$ ($j \in \{1, 2, 3, \ldots, N\}$) as described above to further propagation of the artificial neural network.

Some or all of other input values $r_{i,2M+1}, r_{i,2M+2}, r_{i,2M+3}, \ldots, r_{i,N}$ may be determined from other input. For example, some or all of the other input values $r_{2M+1}, r_{2M+2}, r_{2M+3}, \ldots, r_N$ may be determined from input to a one-way hash function or another one-way function.

A sequence $s_1, s_2, s_3, \ldots$ such of M-tuples may be defined according to a function $f$ such that $s_{i+1}=f(s_i, r_{i,2M+1}, r_{i,2M+2}, r_{i,2M+3}, \ldots, r_{i,N})$ where $r_{i,2M+1}, r_{i,2M+2}, r_{i,2M+3}, \ldots, r_{i,N}$ are other input values as described above. According to such a function, $s_{i+1}$ may represent spikes generated by an artificial neural network when inputs $r_j$ ($j \in \{1, 2, 3, \ldots, N\}$) to the artificial neural network as described above include some or all of $r_{i,1}, r_{i,2}, r_{i,3}, \ldots, r_{i,2M}$ (which, as indicated above, may be converted from M spikes of $s_i$) and some or all of other input values such as $r_{2M+1}, r_{2M+2}, r_{2M+3}, \ldots, r_N$.

Figure 26:
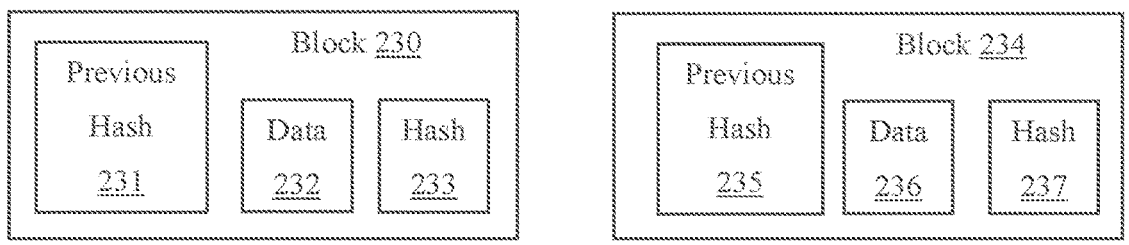
FIG. 26 schematically illustrates blocks of a public ledger according to one embodiment.

In one embodiment, such a function $f$ may be used to define a public ledger such as a blockchain as shown in FIG. 26. Such a function may be implemented by one or more devices, such as the data-transmitting device 101, and such a public ledger may be stored in a storage device, such as the data-storage device 106.

In the example of FIG. 26, a first block 230 stores a previous hash value 231 of a previous block in the blockchain. The block 230 also stores some data 232 and a hash value 233. The hash value 233 may be a function of the previous hash value 231 and of the data 232. For example, the previous hash value 231 may be $s_i=((i, t_{i1}), (i, t_{i2}), (i, t_{i3}), \ldots, (i, t_{iM}))$ from the previous block, the data 232 may be some or all of $r_{i,2M+1}, r_{i,2M+2}, r_{i,2M+3}, \ldots, r_{i,N}$, and the hash value 233 may be a function $s_{i+1}=f(s_i, r_{i,2M+1}, r_{i,2M+2}, r_{i,2M+3}, \ldots, r_{i,N})$ as described above. Likewise, in the example of FIG. 26, a second block 234 stores a previous hash value 235 equal to the hash value 233 of the previous block 230. The block 234 also stores some data 236 and a hash value 237. The hash value 237 may be a function $s_{i+2}=f(s_{i+1}, r_{i+1,2M+1}, r_{i+1,2M+2}, r_{i+1,2M+3}, \ldots, r_{i+1,N})$ as described above.

In some embodiments, hash values as described above may be transmitted between devices in transmission data representing at least one or more blocks (such as the blocks 230 and 234) of a public ledger. In such embodiments, the values of the weights $w_{ij}$ may be publicly available or available to at least some participants or users of the public ledger. Therefore, the values of the weights $w_{ij}$ may be used by some or all such participants or users to add blocks (such as the blocks 230 and 234) to the public ledger including hash values as described above.

However, once a hash value such as $s_{i+1}=f(s_i, r_{i,2M+1}, r_{i,2M+2}, r_{i,2M+3}, \ldots, r_{i,N})$ is stored in blocks (such as the hash value $s_{i+1}=f(s_i, r_{i,2M+1}, r_{i,2M+2}, r_{i,2M+3}, \ldots, r_{i,N})$ as stored as the hash value 233 in the block 230 as the previous hash value 235 in the block 234), then any modifications to the data 232 in the block 230 would be apparent when considering the block 234 (and any block subsequent to the block 230) because the previous hash value 235 in the block 234 (and the previous hash value in any block subsequent to the block 230) would be inconsistent with any modifications to the data 232 in the block 230.

Therefore, the function $f$ as described above may be a one-way cryptographic hash function that may be used in blockchains or in other distributed ledgers, for example when an additional block including a hash value such as $s_{i+1}=f(s_i, r_{i,2M+1}, r_{i,2M+2}, r_{i,2M+3}, \ldots, r_{i,N})$ is represented in transmission data that may be transmitted between devices. The function $f$ may be more efficient than at least some other one-way cryptographic hash functions.

Data Authentication

Another embodiment may involve verification or authentication of data from a source. Data may include one or more of a variety of different types of data. In some embodiments, such data includes documents (such as documents described elsewhere herein), measurements taken by a sensor, an output from an artificial intelligence system, etc. The source may be one or more of a variety of different data sources including a hardware device or a software implemented device as described above. In some embodiments, the source includes or is a human user, an artificial intelligence system, a server, a sensor, a software system other than an artificial intelligence system, etc. A source may include at least one identifier such as a serial number (or more generally a key). The at least one identifier may be unique to the source and uniquely identifies the source.

In some embodiments, data verification or authentication may be used to securely store data. In some such embodiments, program codes stored in the program-codes store 194 may generate the modified spikes represented by data stored in the modified-spike store 192. For example, as described above regarding the embodiment of FIG. 18, the system-data store 193 may store constant weights $w_{ij}$ as described above, but the processor circuit 185 may determine initial node values $v_i$ and the initial input values $r_j$ according to at least a key corresponding to a data source such as a serial number of the data source that is provided to the processor circuit 185. The key may be provided to the processor circuit 185 by a user, may be transmitted to the processor circuit 185, etc. In such embodiments, the processor circuit 185 may, for example, apply a hash function to the key and generate initial node values $v_i$ and initial input values $r_j$ according to output of the hash function.

For example, such a hash function may produce an integer according to the key as received, and such an integer may be a seed for a pseudorandom number generator. The pseudo-random number generator, initialized with such a seed, may then generate initial node values $v_i$ and initial input values $r_j$. However, alternative embodiments may differ.

In such an embodiment, some or all of the node values $v_i$, some or all of the input values $r_j$, or both may be removed from the system-data store 193 after the data representing the modified spikes are stored in the modified-spike store 192. Then, decoding or decrypting data in the modified-spike store 192 would require the key to provide initial node values $v_i$ and input values $r_j$ as required to simulate the same dynamical system that was used to generate the spikes represented by data stored in the modified-spike store 192. As a result, data may be encrypted and stored on the computing device 184 with a key such that the same key would be required to decrypt the data.

Figure 28:
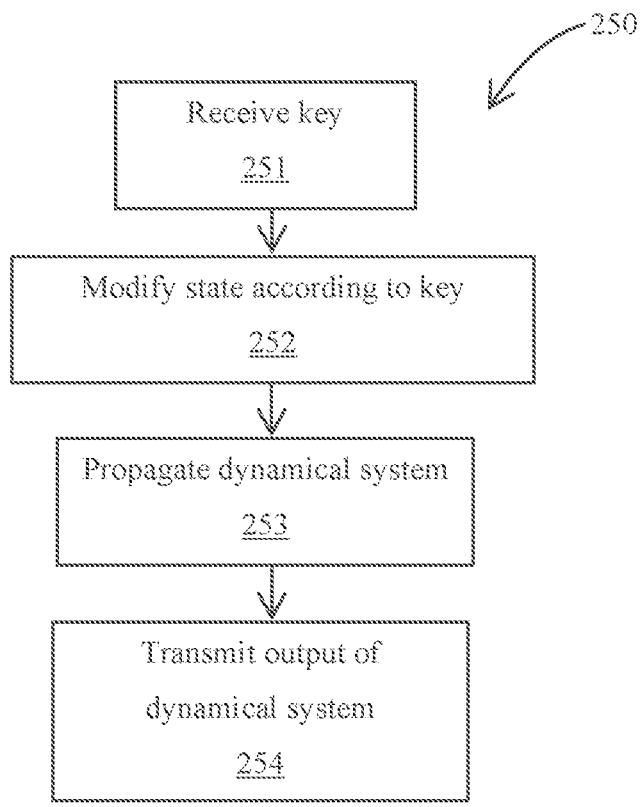
FIG. 28 schematically illustrates other example program codes of the program memory of the data-storage device of the data-transmitting device of the data-transmission system of FIG. 1.

In some embodiments, referring to FIGS. 1 and 28, a key corresponding to a data source is provided to data-transmitting device 101. The key may be provided to data-transmitting device 101 by using the I/O interface 105. The program codes stored in the program-codes store 111 may include blocks of program codes shown generally at 250 that, when executed by the CPU 104, cause the processor circuit 103 to produce data-authentication data in response to the key.

The blocks 250 may begin at a block 251 including program codes that, when executed by the CPU 104, cause the processor circuit 103 to receive the key from the data source such as by using the I/O interface 105.

After the block 251, the blocks 250 may continue at a block 252 including program codes that, when executed by the CPU 104, cause the processor circuit 103 to modify data of the system-data store 110 according to at least the key as entered and as received at the block 251. For example, in some embodiments, the system-data store 110 may store constant weights $w_{ij}$ as described above, but the program codes at the block 252, when executed by the CPU 104, cause the processor circuit 103 to modify the node values $v_i$ and the input values $r_j$ according to at least the key as received at the block 251.

For example, in some embodiments, the program codes at the block 252, when executed by the CPU 104, cause the processor circuit 103 to apply a hash function to the key as received at the block 251. Such a hash function may produce an integer according to the key as received at the block 251, and such an integer may be a seed for a pseudorandom number generator. The pseudorandom number generator, initialized with such a seed, may then generate initial node values $v_i$ and initial input values $r_j$. However, alternative embodiments may differ.

After the block 252, the blocks 250 may continue at a block 223 including program codes that, when executed by the CPU 104, cause the processor circuit 103 to propagate a dynamical system (in this example, the data-transmission dynamical system implemented by the data-transmitting device 101 as described above, although alternative embodiments may differ) according to the data of the system-data store 110 as modified at the block 252. For example, in some embodiments, the program codes at the block 253 may, when executed by the CPU 104, cause the processor circuit 103 to generate spikes within a particular range of propagation stages and to store data representing some or all such spikes in the spike store 119.

After the block 200, the blocks 250 may continue at a block 224 including program codes that, when executed by the CPU 104, cause the processor circuit 103 to transmit at least some output of the data-transmission dynamical system implemented by the data-transmitting device 101, from the spike store 119, to the data-receiving device 102. For example, the program codes at the block 253 may, when executed by the CPU 104, cause the processor circuit 103 to transmit one or more data-transmission signals (that may be similar to the one or more data-transmission signals 163, for example). The one or more data-transmission signals may include transmission data including at least some output of the data-transmission dynamical system implemented by the data-transmitting device 101 from the spike store 119, and may be transmitted to the data-receiving device 102 using the computer network 107.

Figure 29:
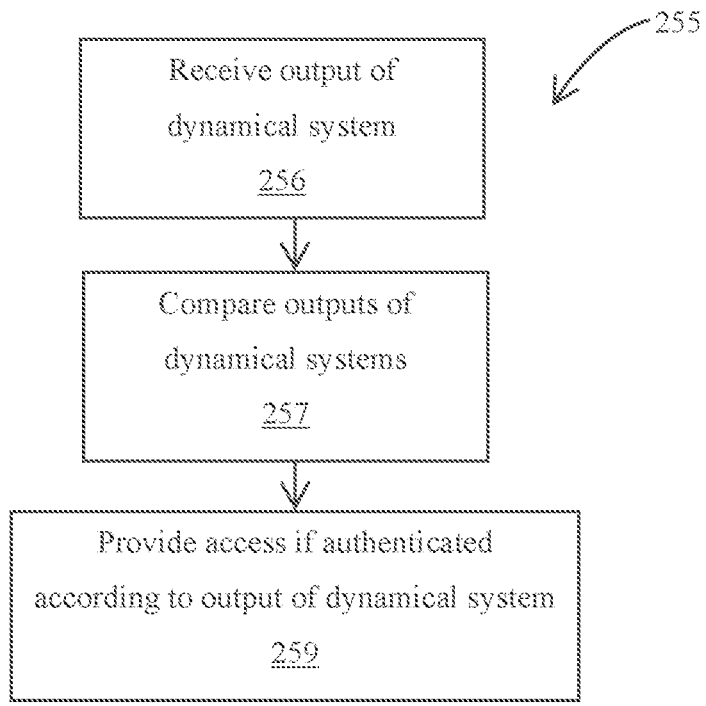
FIG. 29 schematically illustrates other example program codes of the program memory of the data-storage device of the data-receiving device of the data-transmission system of FIG. 1.

Referring to FIGS. 1, 28, and 29, the program codes stored in the program-codes store 161 may include blocks of program codes shown generally at 255 that, when executed by the CPU 157, cause the processor circuit 156 to authenticate the data in response to the user-authentication data (or transmission data) transmitted at the block 254.

The blocks 255 may begin at a block 256 including program codes that, when executed by the CPU 157, cause the processor circuit 156 to receive the data-authentication data (or transmission data) transmitted at the block 254.

After the block 256, the blocks 255 may continue at a block 257 including program codes that, when executed by the CPU 157, cause the processor circuit 156 to compare the data-authentication data received at the block 256 to data-authentication data stored in a data authentication-data store (not shown) in the data-storage device 159. For example, the data authentication-data store may store data-authentication data as would be transmitted at the block 254 in response to receiving a correct key at the block 251. Such data-authentication data in the data authentication-data store may be generated by simulating a dynamical system synchronized with the dynamical system that was propagated at the block 253. In some embodiments, the data of the data-transmitting device 101 may be authenticated if data-authentication data associated with the data and stored in the data authentication-data store matches the data-authentication data received at the block 256.

After the block 257, the blocks 255 may continue at a block 259 including program codes that, when executed by the CPU 157, cause the processor circuit 156 to provide access to the data from the data source of the data-transmitting device 101 if the data of the data-transmitting device 101 was authenticated at the block 257.

If, at the block 259, the data was authenticated, then the data-receiving device 102 may produce the output signal 182 indicating that the data was authenticated, or the data-receiving device 102 may otherwise grant access to the data. For example, if the data was authenticated at the block 259, then the data-receiving device 102 may grant access to one or more documents, sensor measurements, etc. Herein, "allow" does not require allowing directly, and may include steps that directly or indirectly allow or permit access.

In another embodiment, the program codes at the block 254 may, when executed by the CPU 104, cause the processor circuit 103 to transmit one or more data-transmission signals as described above, but the one or more data-transmission signals may include transmission data representing both:

1. the at least some output of the data-transmission dynamical system implemented by the data-transmitting device 101 from the spike store 119 as described above; and
2. data that may be stored in the data store 121.

Such data may include documents, measurements taken by at least one sensor, or any other data. For example, in embodiments in which data-transmitting device 101 is a camera, such data may include a photograph captured by an image sensor of the data-transmitting device 101 and the key may include a serial number of the camera.

The at least some output of the data-transmission dynamical system, as described above for data authentication, may be referred to as a watermark or authenticity certificate. In some embodiments, such a watermark or authenticity certificate may confirm that data was generated by a source. In some embodiments, such a watermark or authenticity certificate may be stored in metadata of the data. Transmission data transmitted in one or more data-transmission signals from the data-transmitting device 101 to the data-receiving device 102 may, for example, represent data and may also represent authentication of the data. Such transmission data representing both the data (e.g., a document) and authentication of the data may be stored in the data-storage device 159 or elsewhere and represent authenticated data.

In some embodiments, the data-receiving device 102 may confirm authentication of data by receiving transmission data as described above and confirming that the transmission data, representing the at least some output of the data-transmission dynamical system implemented by the data-transmitting device 101 from the spike store 119 as described above, to authentication data, for example as in the block 257 as described above. In some embodiments, the data-receiving device 102 may produce the output signal 182 indicating that the document was authenticated.

The data-transmitting device 101 as described above implements functions including data encoding or encryption, and data authentication, and the data-receiving device 102 as described above implements similar related functions. However, alternative embodiments need not implement all such functions or the same functions. Rather, alternative embodiments may implement one, more than one, or all such functions, and may implement alternative or other functions such as those described below or still other functions.

In some embodiments, a one-way function, as described above, may be used to define a data record such as a ledger or log. For example, data may be accessed and modified by a plurality of users, devices (including artificial intelligence systems), etc. A data record may keep track of information such as who accessed the data, who made changes to the data, when were changes to the data made, etc. The data record may be recursed to verify authenticity of the stored data, audit changes in data, etc.

Figure 30:
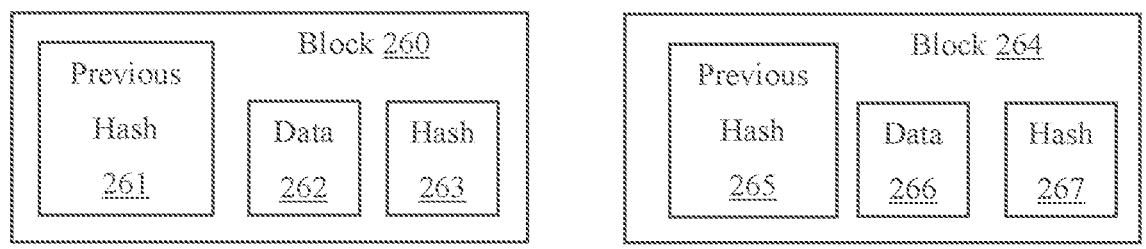
FIG. 30 schematically illustrates blocks of a data record according to one embodiment.

In some embodiments, the one-way function used to define the data record is a one-way hash function such as a one-way hash function described above. For example, referring to FIG. 30, a first block 260 stores a previous hash value 261 of a previous block. The block 260 also stores some data 262 and a hash value 263. The hash value 263 may be a function of the previous hash value 261 and of the data 262. The hash value 263 may also be a function of a key corresponding to a source of data 262. A second block 264 stores a previous hash value 265 equal to the hash value 263 of the previous block 260. The block 264 also stores some data 266 and a hash value 267. The hash value 267 may be a function of the previous hash value 265 and of the data 266. The hash value 267 may also be a function of a key corresponding to a source of data 266.

Once a hash value is stored in blocks such as the hash value 263 stored in the block 260 and as the previous hash value 265 in the block 264, then any modifications to the data 262 in the block 260 would, for example, be apparent when considering the block 264 (and any block subsequent to the block 260) because the previous hash value 265 in the block 264 (and the previous hash value in any block subsequent to the block 260) would be inconsistent with any modification to the data 262 in the block 260.

In some embodiments, a hash function described herein includes or is a dynamical system as described elsewhere herein.

In some embodiments, a one-way function is at least partially applied to spikes generated by a dynamical system. In some embodiments, a hash function is at least partially applied to spikes generated by a dynamical system.

CONCLUSION

The embodiments described above are examples only, and alternative embodiments may differ. For example, alternative embodiments may include one or more components from one embodiments described above and one or more components from one or more other embodiments described above. Components described above may be interchanged or varied. Also, one or more components of embodiments described above may be combined or separated into separate components. For example, embodiments described with an FPGA may instead include an ASIC, and vice versa. Likewise, embodiments described with an FPGA or an ASIC may instead include a microprocessor, and vice versa.

In general, one or more devices may be configured to implement functions such as those described herein by program codes as described above, by configuration of an FPGA or an ASIC, by one or more other ways of configuring one or more devices, or by a combination of two or more thereof.

In general, embodiments such as those described herein may facilitate data transmission between devices.

At least some embodiments described above, such as embodiments including one or more ASICs or one or more analog circuits, for example, may facilitate data transmission between devices with relatively low power requirements. Further, embodiments including one or more FPGAs or one or more analog circuits, for example, may implement dynamical systems using parallel processing, which may facilitate data transmission relatively efficiently.

Although specific embodiments have been described and illustrated, such embodiments should be considered illustrative only and not as limiting the invention as construed according to the accompanying claims.

FURTHER EXAMPLES

This disclosure also includes the following non-limiting examples, which include examples of embodiments described and illustrated herein.

1. A data-transmission method comprising:
    causing at least one data-receiving device to receive at least one data-transmission signal from at least one data-transmitting device implementing a data-transmission dynamical system; and
    causing the at least one data-receiving device to compare
    (a) at least some of transmission data transmitted by the at least one data-transmission signal to
    (b) at least some output of a data-receiving dynamical system implemented by the at least one data-receiving device.
2. A data-transmission method comprising:
    causing at least one data-transmitting device to generate transmission data according to, at least, at least some output of a data-transmission dynamical system implemented by the at least one data-transmitting device; and
    causing the at least one data-transmitting device to transmit, to at least one data-receiving device implementing a data-receiving dynamical system, at least one data-transmission signal transmitting at least the transmission data.
3. The method of example 2 further comprising causing the at least one data-receiving device to compare
    (a) at least some of the transmission data to
    (b) at least some output of the data-receiving dynamical system.
4. The method of example 1, 2, or 3 further comprising causing the at least one data-receiving device to authenticate a user of the at least one data-transmitting device.
5. The method of example 4, when dependent from example 1 or 3, wherein causing the at least one data-receiving device to authenticate the user comprises causing the at least one data-receiving device to authenticate the user in response to at least comparing the at least some of the transmission data to the at least some of the output of the data-receiving dynamical system.

6. The method of example 5 wherein causing the at least one data-receiving device to authenticate the user comprises causing the at least one data-receiving device to authenticate the user further in response to at least a password entered by the user.
7. The method of example 5 or 6 further comprising causing the at least one data-receiving device to allow the user to access at least one electronic resource in response to at least authenticating the user.
8. The method of example 5, 6, or 7 further comprising causing the at least one data-receiving device to allow the user to access at least one physical space in response to at least authenticating the user.
9. The method of example 5, 6, 7, or 8 further comprising causing the at least one data-receiving device to allow the user to authorize at least a financial transaction in response to at least authenticating the user.
10. The method of example 1, 2, or 3 further comprising causing the at least one data-receiving device to authenticate the at least one data-transmitting device.
11. The method of example 10 wherein causing the at least one data-receiving device to authenticate the at least one data-transmitting device comprises causing the at least one data-receiving device to authenticate possession of output of the at least one data-transmitting device.
12. The method of example 10 or 11, when dependent from example 1 or 3, wherein causing the at least one data-receiving device to authenticate the at least one data-transmitting device comprises causing the at least one data-receiving device to authenticate the at least one data-transmitting device in response to at least comparing the at least some of the transmission data to the at least some of the output of the data-receiving dynamical system.
13. The method of example 10, 11, or 12 further comprising causing the at least one data-receiving device to allow the at least one data-transmitting device to access at least one electronic resource in response to at least authenticating the at least one data-transmitting device.
14. The method of example 1, 2, or 3 further comprising causing the at least one data-transmitting device to authenticate a document.
15. The method of example 14 wherein the document comprises a photograph.
16. The method of example 14 or 15, when dependent from example 2 or 3, wherein causing the at least one data-transmitting device to authenticate the document comprises causing the document to encode, at least, the at least some output of the data-transmission dynamical system.
17. The method of example 14, 15, or 16 further comprising causing the at least one data-receiving device to confirm authentication of the document.
18. The method of example 1, 2, or 3 further comprising causing the at least one data-receiving device to confirm authentication of a document.
19. The method of example 17 or 18, when dependent from example 1 or 3, wherein causing the at least one data-receiving device to confirm authentication of the document comprises causing the at least one data-receiving device to confirm authentication of the document in response to at least comparing the at least some of the transmission data to the at least some of the output of the data-receiving dynamical system.
20. The method of any one of examples 14 to 19 wherein the document comprises a document at least partially generated by at least one artificial intelligence system.
21. The method of example 20 wherein the at least one artificial intelligence system comprises a machine learning system.
22. The method of example 21 wherein the machine learning system comprises a trained machine learning system.
23. The method of example 2 or 3 wherein causing the at least one data-transmitting device to generate the transmission data comprises causing the at least one data-transmitting device to encrypt communication data to be transmitted from the at least one data-transmitting device to the at least one data-receiving device by, at least, modifying the at least some output of the data-transmission dynamical system according to the communication data to create differences between the at least some output of the data-transmission dynamical system and the transmission data.
24. The method of example 23, when dependent from example 3, wherein causing the at least one data-receiving device to compare the at least some of the transmission data to the at least some output of the data-receiving dynamical system comprises causing the at least one data-receiving device to decrypt the communication data by, at least, identifying differences between the transmission data and the at least some output of the data-receiving dynamical system.
25. The method of example 1 or 3, or of example 23 when dependent from example 3, wherein causing the at least one data-receiving device to compare the at least some of the transmission data to the at least some output of the data-receiving dynamical system comprises causing the at least one data-receiving device to decrypt communication data, transmitted from the at least one data-transmitting device to the at least one data-receiving device, by, at least, identifying differences between the transmission data and the at least some output of the data-receiving dynamical system.
26. The method of example 25 further comprising causing the at least one data-receiving device to be unable to decrypt communication data, wherein causing the at least one data-receiving device to be unable to decrypt communication data comprises causing the at least one data-receiving device to modify the data-receiving dynamical system implemented by the at least one data-receiving device.
27. The method of example 25 or 26 wherein the at least one data-transmitting device is at least one data-storage device of the at least one data-receiving device.
28. The method of example 1, 2, or 3 further comprising causing the at least one data-receiving device to authenticate a data source of the at least one data-transmitting device.
29. The method of example 28, when dependent from example 1 or 3, wherein causing the at least one data-receiving device to authenticate the data source comprises causing the at least one data-receiving device to authenticate the data source in response to at least comparing the at least some of the transmission data to the at least some of the output of the data-receiving dynamical system.
30. The method of example 29 further comprising causing the at least one data-receiving device to allow access to data from the data source in response to authenticating the data source.

31. The method of example 30 wherein allowing access to the data from the data source comprises allowing the at least one data-transmitting device to access the data from the data source.
32. The method of example 1, 2, or 3 further comprising causing the at least one data-transmitting device to authenticate data from a data source.
33. The method of example 32 wherein causing the at least one data-transmitting device to authenticate the data from the data source comprises causing the data to encode, at least, the at least some output of the data-transmission dynamical system.
34. The method of example 33 further comprising causing the at least one data-receiving device to confirm authentication of the data.
35. The method of example 1, 2, or 3 further comprising causing the at least one data-receiving device to confirm authentication of data from a data source.
36. The method of example 34 or 35, when dependent from example 1 or 3, wherein causing the at least one data-receiving device to confirm authentication of the data comprises causing the at least one data-receiving device to confirm authentication of the data in response to at least comparing the at least some of the transmission data to the at least some of the output of the data-receiving dynamical system.
37. The method of any one of examples 1 to 36 wherein the at least one data-transmitting device is physically separate from the at least one data-receiving device.
38. The method of any one of examples 1 to 37 wherein the data-transmission dynamical system and the data-receiving dynamical system are synchronized.
39. The method of example 38 further comprising causing the data-transmission dynamical system and the data-receiving dynamical system to be synchronized.
40. The method of any one of examples 1 to 39 further comprising causing the at least one data-transmitting device to receive at least one data-transmitting-device-initial-state-indication signal indicating at least some of an initial state for the data-transmission dynamical system.
41. The method of any one of examples 1 to 39 further comprising causing the at least one data-transmitting device to generate at least some of an initial state for the data-transmission dynamical system.
42. The method of example 41 wherein causing the at least one data-transmitting device to generate the at least some of the initial state for the data-transmission dynamical system comprises causing the at least one data-transmitting device to generate the at least some of the initial state for the data-transmission dynamical system in response to at least user input to the at least one data-transmitting device.
43. The method of example 42 wherein the user input comprises a password.
44. The method of example 41 wherein causing the at least one data-transmitting device to generate the least some of the initial state for the data-transmission dynamical system comprises causing the at least one data-transmitting device to generate the least some of the initial state for the data-transmission dynamical system in response to at least a pseudorandom number generator implemented by the at least one data-transmitting device.
45. The method of example 41 wherein causing the at least one data-receiving device to generate the at least some of the initial state for the data-transmission dynamical system comprises causing the at least one data-receiving device to generate the at least some of the initial state for the data-transmission dynamical system in response to at least a pseudorandom number generator implemented by the at least one data-receiving device.
46. The method of example 44 or 45, when dependent from any one of examples 28 to 36, wherein the data source comprises at least one identifier, and the method further comprising generating a seed for the pseudorandom number generator from the at least one identifier.
47. The method of example 46, wherein generating the seed for the pseudorandom number generator comprises applying a hash function to the at least one identifier.
48. The method of any one of examples 41 to 47 wherein the at least one data-transmission signal further encodes the at least some of the initial state for the data-transmission dynamical system.
49. The method of example 48, when directly or indirectly dependent from example 1 or 3, further comprising causing the at least one data-receiving device to generate the at least some output of the data-receiving dynamical system according to at least the at least some of the initial state.
50. The method of example 48 or 49, when directly or indirectly dependent from example 2, further comprising causing the at least one data-transmitting device to generate the at least some output of the data-transmission dynamical system according to at least the at least some of the initial state.
51. The method of any one of examples 1 to 50 further comprising causing the at least one data-receiving device to receive at least one data-receiving-device-initial-state-indication signal indicating at least some of an initial state for the data-receiving dynamical system.
52. The method of any one of examples 1 to 51 wherein the at least one data-transmission signal further encodes at least an identification of a range of propagation stages of the data-transmission dynamical system resulting in the output of the data-transmission dynamical system.
53. The method of any one of examples 1 to 51 further comprising causing the at least one data-transmitting device to receive at least one propagation-identification signal identifying at least a range of propagation stages of the data-transmission dynamical system for producing the output of the data-transmission dynamical system.
54. The method of example 52 or 53, when directly or indirectly dependent from example 2, further comprising causing the at least one data-transmitting device to generate the at least some output of the data-transmission dynamical system according to at least the range of propagation stages.
55. The method of any one of examples 1 to 54 wherein:
the data-transmission dynamical system comprises a data-transmission artificial neural network having a plurality of data-transmission node values associated with respective artificial neurons of a plurality of data-transmission artificial neurons of the data-transmission artificial neural network, each node value of the plurality of data-transmission node values modifiable according to at least one of a plurality of data-transmission input values; and the data-receiving dynamical system comprises a data-receiving artificial neural network having a plurality of data-receiving node values associated with respective artificial neurons of a plurality of data-receiving artificial neurons of the data-receiving artificial neural network, each node value of the plurality of data-receiving node values modifiable according to at least one of a plurality of data-receiving input values.

56. The method of any one of examples 1 to 54 wherein:
the data-transmission dynamical system comprises a plurality of data-transmission node values, each node value of the plurality of data-transmission node values modifiable according to at least one of a plurality of data-transmission input values; and
the data-receiving dynamical system comprises a plurality of data-receiving node values, each node value of the plurality of data-receiving node values modifiable according to at least one of a plurality of data-receiving input values.

57. The method of example 55 or 56 wherein:
the data-transmission dynamical system is defined at least in part by a plurality of data-transmission weights, each weight of the plurality of data-transmission weights defining at least part of an effect of a respective one of the plurality of data-transmission input values on a respective node value of the plurality of data-transmission node values; and
the data-receiving dynamical system is defined at least in part by a plurality of data-receiving weights, each weight of the plurality of data-receiving weights defining at least part of an effect of a respective one of the plurality of data-receiving input values on a respective node value of the plurality of data-receiving node values.

58. The method of example 57 wherein the plurality of data-transmission weights and the plurality of data-receiving weights are synchronized.

59. The method of example 57 or 58 wherein the plurality of data-transmission weights remain constant during implementation of the data-transmission dynamical system, and the plurality of data-receiving weights remain constant during implementation of the data-receiving dynamical system.

60. The method of example 55, or of example 57, 58, or 59 when directly or indirectly dependent from example 55, wherein:
the data-transmission artificial neural network is a data-transmission spiking artificial neural network that, when implemented, identifies a plurality of data-transmission dynamical-system events, each event of the plurality of data-transmission dynamical-system events associated with a respective artificial neuron of the plurality of data-transmission artificial neurons and with a respective propagation stage of the data-transmission spiking artificial neural network when the respective artificial neuron satisfied a data-transmission spiking criterion;
the data-receiving artificial neural network is a data-receiving spiking artificial neural network that, when implemented, identifies a plurality of data-receiving dynamical-system events, each event of the plurality of data-receiving dynamical-system events associated with a respective artificial neuron of the plurality of data-receiving artificial neurons and with a respective propagation stage of the data-receiving spiking artificial neural network when the respective artificial neuron satisfied a data-receiving spiking criterion; and
the transmission data identify at least some dynamical-system events.

61. The method of example 56, or of example 57, 58, or 59 when directly or indirectly dependent from example 56, wherein:
the data-transmission dynamical system, when implemented, identifies a plurality of data-transmission dynamical-system events, each event of the plurality of data-transmission dynamical-system events associated with a respective node value of the plurality of data-transmission node values and with a respective propagation stage of the data-transmission dynamical system when the respective node value satisfied a data-transmission discretizing criterion;
the data-receiving dynamical system, when implemented, identifies a plurality of data-receiving dynamical-system events, each event of the plurality of data-receiving dynamical-system events associated with a respective node value of the plurality of data-receiving node values and with a respective propagation stage of the data-receiving dynamical system when the respective node value satisfied a data-receiving discretizing criterion; and
the transmission data identify at least some dynamical-system events.

62. The method of any one of examples 1 to 59 wherein:
the data-transmission dynamical system, when implemented, identifies a plurality of data-transmission dynamical-system events, each event of the plurality of data-transmission dynamical-system events associated with the data-transmission dynamical system satisfying a data-transmission discretizing criterion;
the data-receiving dynamical system, when implemented, identifies a plurality of data-receiving dynamical-system events, each event of the plurality of data-receiving dynamical-system events associated with the data-receiving dynamical system satisfying a data-receiving discretizing criterion; and
the transmission data identify at least some dynamical-system events.

63. The method of example 60, 61, or 62, when directly or indirectly dependent from example 1 or 3, wherein the output of the data-receiving dynamical system comprises identifications of at least some of the plurality of data-receiving dynamical-system events.

64. The method of example 63, when dependent from example 25, wherein the differences between the transmission data and the at least some output of the data-receiving dynamical system comprise differences between the dynamical-system events identified by the transmission data and the at least some of the plurality of data-receiving dynamical-system events.

65. The method of any one of examples 60 to 64, when directly or indirectly dependent from example 2, wherein the output of the data-transmission dynamical system comprises identifications of at least some of the plurality of data-transmission dynamical-system events.

66. The method of example 65, when dependent from example 23, wherein the differences between the at least some output of the data-transmission dynamical system and the transmission data comprise differences between the at least some of the plurality of data-transmission dynamical-system events and the dynamical-system events identified by the transmission data.
67. The method of example 64 or 66, or of example 65 when dependent from example 64, wherein the differences comprise at least one added dynamical-system event added to the dynamical-system events identified by the transmission data.
68. The method of example 67 wherein each added dynamical-system event of the at least one added dynamical-system event encodes a respective bit of the communication data.
69. The method of example 64, 66, 67, or 68, or of example 65 when dependent from example 64, wherein the differences comprise at least one omitted dynamical-system event omitted from the dynamical-system events identified by the transmission data.
70. The method of example 69 wherein each omitted dynamical-system event of the at least one omitted dynamical-system event encodes a respective bit of the communication data.
71. The method of example 64, of example 65 when dependent from example 64, or of any one of examples 66 to 70, wherein the differences comprise at least one shifted dynamical-system event, each shifted dynamical system of the at least one shifted dynamical-system event shifted to a respective different propagation stage by a respective shift amount.
72. The method of any one of examples 64 to 70, when dependent from example 55 or 56, wherein the differences comprise at least one shifted dynamical-system event, each shifted dynamical system of the at least one shifted dynamical-system event shifted to a respective different data-transmission node value by a respective shift amount.
73. The method of example 71 or 72 wherein each shift amount of the at least one shifted dynamical-system event indicates a respective amplitude of a respective basis function of the communication data.
74. The method of example 71 or 72 wherein each shift amount of the at least one shifted dynamical-system event encodes at least one bit of the communication data.
75. The method of any one of examples 63 to 74, when dependent from example 60, wherein the identification of a dynamical-system event comprises identifications of the artificial neuron and the propagation stage associated with the dynamical-system event.
76. The method of any one of examples 63 to 74, when directly or indirectly dependent from example 61, wherein the identification of a dynamical-system event comprises identifications of the node value and the propagation stage associated with the dynamical-system event.
77. The method of any one of examples 1 to 76 wherein the at least one data-transmitting device is a single device.
78. The method of any one of examples 1 to 77 wherein the at least one data-transmitting device comprises a mobile device.
79. The method of any one of examples 1 to 77 wherein the at least one data-transmitting device comprises a telephone.
80. The method of any one of examples 1 to 77 wherein the at least one data-transmitting device comprises a camera.
81. The method of any one of examples 1 to 77 wherein the at least one data-transmitting device is a card.
82. The method of any one of examples 1 to 77 wherein the at least one data-transmitting device comprises a data-transmitting medical device.
83. The method of any one of examples 1 to 77 wherein the at least one data-transmitting device comprises a network node for a computer network.
84. The method of any one of examples 1 to 77 wherein the at least one data-transmitting device comprises a router for a computer network.
85. The method of any one of examples 1 to 77 wherein the at least one data-transmitting device comprises an artificial intelligence system.
86. The method of example 85 wherein the at least one data-transmitting device comprises a machine learning system.
87. The method of example 86 wherein the machine learning system comprises a trained machine learning system.
88. The method of any one of examples 1 to 77 wherein the at least one data-transmitting device comprises a data collection device.
89. The method of example 88 wherein the data collection device comprises a sensor.
90. The method of any one of examples 1 to 89 wherein the at least one data-receiving device comprises a mobile device.
91. The method of any one of examples 1 to 89 wherein the at least one data-receiving device comprises a telephone.
92. The method of any one of examples 1 to 89 wherein the at least one data-receiving device comprises a network node for a computer network.
93. The method of any one of examples 1 to 89 wherein the at least one data-receiving device comprises a router for a computer network.
94. The method of any one of examples 1 to 91 wherein the at least one data-receiving device comprises a user computing device.
95. The method of any one of examples 1 to 80 wherein the at least one data-transmitting device comprises a user computing device.
96. The method of any one of examples 1 to 89 wherein the at least one data-receiving device comprises a server computing device.
97. The method of any one of examples 1 to 92 wherein the at least one data-transmitting device comprises a server computing device.
98. The method of any one of examples 1 to 97 wherein the at least one data-receiving device comprises a data-receiving medical device.
99. The method of any one of examples 1 to 89 wherein the at least one data-receiving device comprises an artificial intelligence system.
100. The method of example 99 wherein the at least one data-receiving device comprises a machine learning system.
101. The method of example 100 wherein the machine learning system comprises a trained machine learning system.
102. The method of any one of examples 1 to 89 wherein the at least one data-receiving device comprises a data-receiving principal device.
103. The method of any one of examples 1 to 102 wherein the at least one data-transmitting device comprises a plurality of data-transmitting devices independent from each other and collectively implementing the data-transmission dynamical system.

104. The method of any one of examples 1 to 102 wherein the at least one data-transmitting device and the at least one data-receiving device implement a machine-to-machine system.

105. The method of any one of examples 1 to 104 wherein the at least one data-transmission signal comprises at least one radio signal.

106. The method of any one of examples 1 to 105 wherein the at least one data-transmission signal comprises at least one optical signal displayed by the at least one data-transmitting device.

107. The method of example 106 wherein the at least one optical signal comprises a QR code.

108. The method of any one of examples 1 to 107 wherein the at least one data-transmitting device comprises at least one data-transmission processor circuit simulating the data-transmission dynamical system.

109. The method of example 108, when dependent from example 57, wherein the at least one data-transmission processor circuit comprises at least one computer-readable data-transmission memory storing the plurality of data-transmission weights.

110. The method of example 109 wherein the plurality of data-transmission weights is encrypted in the at least one computer-readable data-transmission memory.

111. The method of any one of examples 1 to 107 wherein the at least one data-transmitting device comprises at least one data-transmission circuit directly implementing the data-transmission dynamical system.

112. The method of example 111 wherein the at least one data-transmission circuit comprises at least one data-transmission analog circuit.

113. The method of example 112, when dependent from example 57, wherein the at least one data-transmission analog circuit comprises a plurality of resistors defining the plurality of data-transmission weights.

114. The method of example 111 wherein the at least one data-transmission circuit comprises data-transmission configurable logic blocks.

115. The method of example 114 wherein the at least one data-transmission circuit comprises a data-transmission field-programmable gate array (FPGA) comprising the data-transmission configurable logic blocks.

116. The method of any one of examples 1 to 115 wherein the at least one data-receiving device comprises at least one data-receiving processor circuit simulating the data-receiving dynamical system.

117. The method of example 116, when dependent from example 57, wherein the at least one data-receiving processor circuit comprises at least one computer-readable data-receiving memory storing the plurality of data-receiving weights.

118. The method of example 117 wherein the plurality of data-receiving weights is encrypted in the at least one computer-readable data-receiving memory.

119. The method of any one of examples 1 to 115 wherein the at least one data-receiving device comprises at least one data-receiving circuit directly implementing the data-receiving dynamical system.

120. The method of example 119 wherein the at least one data-receiving circuit comprises at least one data-receiving analog circuit.

121. The method of example 120, when dependent from example 57, wherein the at least one data-receiving analog circuit comprises a plurality of resistors defining the plurality of data-receiving weights.

122. The method of example 119 wherein the at least one data-receiving circuit comprises data-receiving configurable logic blocks.

123. The method of example 122 wherein the at least one data-receiving circuit comprises a data-receiving FPGA comprising the data-receiving configurable logic blocks.

124. The method of example 1 or 3, or of any one of examples 4 to 123 when directly or indirectly dependent from example 1 or 3, further comprising causing the at least one data-receiving device to produce at least one output signal in response to at least comparing the at least some of the transmission data to the at least some output of the data-receiving dynamical system.

125. The method of example 124, when directly or indirectly dependent from example 4, wherein the at least one output signal indicates, at least, whether authentication of the user was successful.

126. The method of example 124, when directly or indirectly dependent from example 17 or 18, wherein the at least one output signal indicates, at least, that the document was authenticated.

127. The method of example 124, when directly or indirectly dependent from any one of examples 28 to 36, wherein the at least one output signal indicates, at least, that the data was authenticated.

128. The method of example 124, when directly or indirectly dependent from example 24 or 25, wherein the at least one output signal indicates, at least, at least some of the communication data.

129. The method of any one of examples 1 to 102 wherein the at least one data-transmitting device and the at least one data-receiving device comprise a network of devices.

130. The method of example 129 wherein at least one device in the network of devices comprises an artificial intelligence system.

131. The method of example 130 wherein the artificial intelligence system comprises a machine learning system.

132. The method of example 131 wherein the machine learning system comprises a trained machine learning system.

133. A method of producing a cryptographic hash output, the method comprising:
causing at least one device to receive at least one input signal encoding at least one input value, wherein the at least one device implements a dynamical system comprising a plurality of node values, each node value of the plurality of node values modifiable according to at least the at least one input value;
causing the at least one device to identify at least a plurality of dynamical-system events, each event of the plurality of dynamical-system events associated with a respective node value of the plurality of node values and with a respective propagation stage of the dynamical system when the node value satisfied a discretizing criterion; and
causing the at least one device to produce at least one output signal identifying at least the plurality of dynamical-system events.

134. The method of example 133 wherein the dynamical system is defined at least in part by a plurality of weights, each weight of the plurality of weights defining at least part of an effect of a respective one of the at least one input value on a respective node value of the plurality of node values.

135. The method of example 134 wherein the dynamical system is a spiking artificial neural network, each node value of the plurality of node values associated with a respective artificial neuron of a plurality of artificial neurons, each event of the plurality of dynamical-system events associated with a respective artificial neuron of the plurality of artificial neurons and with a respective propagation stage of the spiking artificial neural network when the respective artificial neuron satisfied a spiking criterion.

136. The method of example 133, 134, or 135 further comprising causing the at least one device to create a new entry in a ledger comprising a previously existing entry, wherein:
the at least one input value comprises at least a portion of data from the previously existing entry; and
the new entry comprises identifications of at least some of the plurality of dynamical-system events.

137. The method of example 136 wherein the ledger is a public ledger.

138. The method of example 137 wherein the public ledger is a blockchain.

139. The method of any one of examples 136 to 138 further comprising recursing through the ledger.

140. The method of example 139 wherein recursing through the ledger comprises verifying data corresponding to the input values.

141. The method of example 139 or 140 wherein recursing through the ledger comprises auditing data corresponding to the input values.

142. A data-transmission apparatus comprising at least one data-receiving device configured to, at least:
receive at least one data-transmission signal from at least one data-transmitting device configured to implement a data-transmission dynamical system; and
compare
(a) at least some of transmission data transmitted by the at least one data-transmission signal to
(b) at least some output of a data-receiving dynamical system implemented by the at least one data-receiving device.

143. A data-transmission apparatus comprising at least one data-transmitting device configured to, at least:
generate transmission data according to, at least, at least some output of a data-transmission dynamical system implemented by the at least one data-transmitting device; and
transmit, to at least one data-receiving device configured to implement a data-receiving dynamical system, at least one data-transmission signal transmitting at least the transmission data.

144. The apparatus of example 143 further comprising the at least one data-receiving device, wherein the at least one data-receiving device is configured to, at least, compare
(a) at least some of the transmission data to
(b) at least some output of the data-receiving dynamical system.

145. The apparatus of example 142, 143, or 144 wherein the at least one data-receiving device is further configured to, at least, authenticate a user of the at least one data-transmitting device.

146. The apparatus of example 145, when dependent from example 142 or 144, wherein the at least one data-receiving device is configured to authenticate the user by, at least, authenticating the user in response to at least comparing the at least some of the transmission data to the at least some of the output of the data-receiving dynamical system.

147. The apparatus of example 146 wherein the at least one data-receiving device is configured to authenticate the user by, at least, authenticating the user further in response to at least a password entered by the user.

148. The apparatus of example 146 or 147 wherein the at least one data-receiving device is further configured to, at least, allow the user to access at least one electronic resource in response to at least authenticating the user.

149. The apparatus of example 146, 147, or 148 wherein the at least one data-receiving device is further configured to, at least, allow the user to access at least one physical space in response to at least authenticating the user.

150. The apparatus of example 146, 147, 148, or 149 wherein the at least one data-receiving device is further configured to, at least, allow the user to authorize at least a financial transaction in response to at least authenticating the user.

151. The apparatus of example 142, 143, or 144 wherein the at least one data-receiving device is further configured to, at least, authenticate the at least one data-transmitting device.

152. The apparatus of example 151 wherein the at least one data-receiving device is configured to authenticate the at least one data-transmitting device by, at least, authenticating possession of output of the at least one data-transmitting device.

153. The apparatus of example 151 or 152, when dependent from example 142 or 144, wherein the at least one data-receiving device is configured to authenticate the at least one data-transmitting device by, at least, authenticating the at least one data-transmitting device in response to at least comparing the at least some of the transmission data to the at least some of the output of the data-receiving dynamical system.

154. The apparatus of example 151, 152, or 153 wherein the at least one data-receiving device is further configured to, at least, allow the at least one data-transmitting device to access at least one electronic resource in response to at least authenticating the at least one data-transmitting device.

155. The apparatus of example 142, 143, or 144 wherein the at least one data-transmitting device is further configured to, at least, authenticate a document.

156. The apparatus of example 155 wherein the document comprises a photograph.

157. The apparatus of example 155 or 156, when dependent from example 143 or 144, wherein the at least one data-transmitting device is configured to authenticate the document by, at least, causing the document to encode, at least, the at least some output of the data-transmission dynamical system.

158. The apparatus of example 155, 156, or 157 wherein the at least one data-receiving device is further configured to, at least, confirm authentication of the document.

159. The apparatus of example 142, 143, or 144 wherein the at least one data-receiving device is further configured to, at least, confirm authentication of a document.

160. The apparatus of example 158 or 159, when dependent from example 142 or 144, wherein the at least one data-receiving device is configured to confirm authentication of the document, at least, in response to at least comparing the at least some of the transmission data to the at least some of the output of the data-receiving dynamical system.

161. The apparatus of any one of examples 155 to 160 wherein the document comprises a document at least partially generated by at least one artificial intelligence system.

162. The apparatus of example 161 wherein the least one artificial intelligence system comprises a machine learning system.

163. The apparatus of example 162 wherein the machine learning system comprises a trained machine learning system.

164. The apparatus of example 143 or 144 wherein the at least one data-transmitting device is configured to generate the transmission data by, at least, encrypting communication data to be transmitted from the at least one data-transmitting device to the at least one data-receiving device by, at least, modifying the at least some output of the data-transmission dynamical system according to the communication data to create differences between the at least some output of the data-transmission dynamical system and the transmission data.

165. The apparatus of example 164, when dependent from example 144, wherein the at least one data-receiving device is configured to compare the at least some of the transmission data to the at least some output of the data-receiving dynamical system by, at least, decrypting the communication data by, at least, identifying differences between the transmission data and the at least some output of the data-receiving dynamical system.

166. The apparatus of example 142 or 144, or of example 164 when dependent from example 144, wherein the at least one data-receiving device is configured to compare the at least some of the transmission data to the at least some output of the data-receiving dynamical system by, at least, decrypting communication data, transmitted from the at least one data-transmitting device to the at least one data-receiving device, by, at least, identifying differences between the transmission data and the at least some output of the data-receiving dynamical system.

167. The apparatus of example 166 wherein the at least one data-receiving device is further configured to, at least, become unable to decrypt communication data by, at least, modifying the data-receiving dynamical system implemented by the at least one data-receiving device.

168. The apparatus of example 166 or 167 wherein the at least one data-transmitting device is at least one data-storage device of the at least one data-receiving device.

169. The apparatus of example 142, 143, or 144 wherein the at least one data-receiving device is configured to authenticate a data source of the at least one data-transmitting device.

170. The apparatus of example 169, when dependent from example 142 or 144, wherein the at least one data-receiving device is configured to authenticate the data source in response to at least comparing the at least some of the transmission data to the at least some of the output of the data-receiving dynamical system.

171. The apparatus of example 170 wherein the at least one data-receiving device is configured to allow access to data from the data source in response to authenticating the data source.

172. The apparatus of example 171 wherein allowing access to the data from the data source comprises allowing the at least one data-transmitting device to access the data from the data source.

173. The apparatus of example 142, 143, or 144 wherein the at least one data-transmitting device is configured to authenticate data from a data source.

174. The apparatus of example 173 wherein the at least one data-transmitting device is configured to cause the data to encode, at least, the at least some output of the data-transmission dynamical system.

175. The apparatus of example 174 wherein the at least one data-receiving device is configured to confirm authentication of the data.

176. The apparatus of example 142, 143, or 144 the at least one data-receiving device is configured to confirm authentication of data from a data source.

177. The apparatus of example 175 or 176, when dependent from example 142 or 144, wherein the at least one data-receiving device is configured to confirm authentication of the data in response to at least comparing the at least some of the transmission data to the at least some of the output of the data-receiving dynamical system.

178. The apparatus of any one of examples 142 to 177 wherein the at least one data-transmitting device is physically separate from the at least one data-receiving device.

179. The apparatus of any one of examples 142 to 178 wherein the data-transmission dynamical system and the data-receiving dynamical system are configured to be synchronized.

180. The apparatus of any one of examples 142 to 179 wherein the at least one data-transmitting device is further configured to, at least, receive at least one data-transmitting-device-initial-state-indication signal indicating at least some of an initial state for the data-transmission dynamical system.

181. The apparatus of any one of examples 142 to 179 wherein the at least one data-transmitting device is further configured to, at least, generate at least some of an initial state for the data-transmission dynamical system.

182. The apparatus of example 181 wherein the at least one data-transmitting device is configured to generate the at least some of the initial state for the data-transmission dynamical system by, at least, generating the at least some of the initial state for the data-transmission dynamical system in response to at least user input to the at least one data-transmitting device.

183. The apparatus of example 182 wherein the user input comprises a password.

184. The apparatus of example 181 wherein the at least one data-transmitting device is configured to generate the at least some of the initial state for the data-transmission dynamical system by, at least, generating the at least some of the initial state for the data-transmission dynamical system in response to at least a pseudorandom number generator implemented by the at least one data-transmitting device.

185. The apparatus of example 181 wherein the at least one data-receiving device is configured to generate the at least some of the initial state for the data-transmission dynamical system by, at least, generating the at least some of the initial state for the data-transmission dynamical system in response to at least a pseudorandom number generator implemented by the at least one data-receiving device.

186. The apparatus of example 184 or 185, when dependent from any one of examples 169 to 177, wherein the data source comprises at least one identifier, and the apparatus is configured to generate a seed for the pseudorandom number generator from the at least one identifier.

187. The apparatus of example 186 wherein generating the seed for the pseudorandom number generator comprises applying a hash function to the at least one identifier.

188. The apparatus of any one of examples 181 to 186 wherein the at least one data-transmission signal further encodes the at least some of the initial state for the data-transmission dynamical system.

189. The apparatus of example 188, when directly or indirectly dependent from example 142 or 144, wherein the at least one data-receiving device is further configured to, at least, generate the at least some output of the data-receiving dynamical system according to at least the at least some of the initial state.

190. The apparatus of example 188 or 189, when directly or indirectly dependent from example 143, wherein the at least one data-transmitting device is further configured to, at least, generate the at least some output of the data-transmission dynamical system according to at least the at least some of the initial state.

191. The apparatus of any one of examples 142 to 190 wherein the at least one data-receiving device is further configured to, at least, receive at least one data-receiving-device-initial-state-indication signal indicating at least some of an initial state for the data-receiving dynamical system.

192. The apparatus of any one of examples 142 to 191 wherein the at least one data-transmission signal further encodes at least an identification of a range of propagation stages of the data-transmission dynamical system resulting in the output of the data-transmission dynamical system.

193. The apparatus of any one of examples 142 to 191 wherein the at least one data-transmitting device is further configured to, at least, receive at least one propagation-identification signal identifying at least a range of propagation stages of the data-transmission dynamical system for producing the output of the data-transmission dynamical system.

194. The apparatus of example 192 or 193, when directly or indirectly dependent from example 143, wherein the at least one data-transmitting device is further configured to, at least, generate the at least some output of the data-transmission dynamical system according to at least the range of propagation stages.

195. The apparatus of any one of examples 142 to 194 wherein:
the data-transmission dynamical system comprises a data-transmission artificial neural network having a plurality of data-transmission node values associated with respective artificial neurons of a plurality of data-transmission artificial neurons of the data-transmission artificial neural network, each node value of the plurality of data-transmission node values modifiable according to at least one of a plurality of data-transmission input values; and
the data-receiving dynamical system comprises a data-receiving artificial neural network having a plurality of data-receiving node values associated with respective artificial neurons of a plurality of data-receiving artificial neurons of the data-receiving artificial neural network, each node value of the plurality of data-receiving node values modifiable according to at least one of a plurality of data-receiving input values.

196. The apparatus of any one of examples 142 to 194 wherein:
the data-transmission dynamical system comprises a plurality of data-transmission node values, each node value of the plurality of data-transmission node values modifiable according to at least one of a plurality of data-transmission input values; and
the data-receiving dynamical system comprises a plurality of data-receiving node values, each node value of the plurality of data-receiving node values modifiable according to at least one of a plurality of data-receiving input values.

197. The apparatus of example 195 or 196 wherein:
the data-transmission dynamical system is defined at least in part by a plurality of data-transmission weights, each weight of the plurality of data-transmission weights defining at least part of an effect of a respective one of the plurality of data-transmission input values on a respective node value of the plurality of data-transmission node values; and
the data-receiving dynamical system is defined at least in part by a plurality of data-receiving weights, each weight of the plurality of data-receiving weights defining at least part of an effect of a respective one of the plurality of data-receiving input values on a respective node value of the plurality of data-receiving node values.

198. The apparatus of example 197 wherein the plurality of data-transmission weights and the plurality of data-receiving weights are configured to be synchronized.

199. The apparatus of example 197 or 198 wherein the plurality of data-transmission weights remain constant during implementation of the data-transmission dynamical system, and the plurality of data-receiving weights remain constant during implementation of the data-receiving dynamical system.

200. The apparatus of example 195, or of example 197, 198, or 199 when directly or indirectly dependent from example 195, wherein:
the data-transmission artificial neural network is a data-transmission spiking artificial neural network that, when implemented, identifies a plurality of data-transmission dynamical-system events, each event of the plurality of data-transmission dynamical-system events associated with a respective artificial neuron of the plurality of data-transmission artificial neurons and with a respective propagation stage of the data-transmission spiking artificial neural network when the respective artificial neuron satisfied a data-transmission spiking criterion;
the data-receiving artificial neural network is a data-receiving spiking artificial neural network that, when implemented, identifies a plurality of data-receiving dynamical-system events, each event of the plurality of data-receiving dynamical-system events associated with a respective artificial neuron of the plurality of data-receiving artificial neurons and with a respective propagation stage of the data-receiving spiking artificial neural network when the respective artificial neuron satisfied a data-receiving spiking criterion; and the transmission data identify at least some dynamical-system events.
201. The apparatus of example 196, or of example 197, 198, or 199 when directly or indirectly dependent from example 196, wherein:
the data-transmission dynamical system, when implemented, identifies a plurality of data-transmission dynamical-system events, each event of the plurality of data-transmission dynamical-system events associated with a respective node value of the plurality of data-transmission node values and with a respective propagation stage of the data-transmission dynamical system when the respective node value satisfied a data-transmission discretizing criterion;
the data-receiving dynamical system, when implemented, identifies a plurality of data-receiving dynamical-system events, each event of the plurality of data-receiving dynamical-system events associated with a respective node value of the plurality of data-receiving node values and with a respective propagation stage of the data-receiving dynamical system when the respective node value satisfied a data-receiving discretizing criterion; and
the transmission data identify at least some dynamical-system events.
202. The apparatus of any one of examples 142 to 199 wherein:
the data-transmission dynamical system, when implemented, identifies a plurality of data-transmission dynamical-system events, each event of the plurality of data-transmission dynamical-system events associated with the data-transmission dynamical system satisfying a data-transmission discretizing criterion;
the data-receiving dynamical system, when implemented, identifies a plurality of data-receiving dynamical-system events, each event of the plurality of data-receiving dynamical-system events associated with the data-receiving dynamical system satisfying a data-receiving discretizing criterion; and
the transmission data identify at least some dynamical-system events.
203. The apparatus of example 200, 201, or 202, when directly or indirectly dependent from example 142 or 144, wherein the output of the data-receiving dynamical system comprises identifications of at least some of the plurality of data-receiving dynamical-system events.
204. The apparatus of example 203, when dependent from example 166, wherein the differences between the transmission data and the at least some output of the data-receiving dynamical system comprise differences between the dynamical-system events identified by the transmission data and the at least some of the plurality of data-receiving dynamical-system events.
205. The apparatus of any one of examples 200 to 204, when directly or indirectly dependent from example 143, wherein the output of the data-transmission dynamical system comprises identifications of at least some of the plurality of data-transmission dynamical-system events.
206. The apparatus of example 205, when dependent from example 164, wherein the differences between the at least some output of the data-transmission dynamical system and the transmission data comprise differences between the at least some of the plurality of data-transmission dynamical-system events and the dynamical-system events identified by the transmission data.
207. The apparatus of example 204 or 206, or of example 205 when dependent from example 204, wherein the differences comprise at least one added dynamical-system event added to the dynamical-system events identified by the transmission data.
208. The apparatus of example 207 wherein each added dynamical-system event of the at least one added dynamical-system event encodes a respective bit of the communication data.
209. The apparatus of example 204, 206, 207, or 208, or of example 205 when dependent from example 204, wherein the differences comprise at least one omitted dynamical-system event omitted from the dynamical-system events identified by the transmission data.
210. The apparatus of example 209 wherein each omitted dynamical-system event of the at least one omitted dynamical-system event encodes a respective bit of the communication data.
211. The apparatus of example 204, of example 205 when dependent from example 204, or of any one of examples 206 to 210, wherein the differences comprise at least one shifted dynamical-system event, each shifted dynamical system of the at least one shifted dynamical-system event shifted to a respective different propagation stage by a respective shift amount.
212. The apparatus of any one of examples 204 to 210, when dependent from example 195 or 196, wherein the differences comprise at least one shifted dynamical-system event, each shifted dynamical system of the at least one shifted dynamical-system event shifted to a respective different data-transmission node value by a respective shift amount.
213. The apparatus of example 211 or 212 wherein each shift amount of the at least one shifted dynamical-system event indicates a respective amplitude of a respective basis function of the communication data.
214. The apparatus of example 211 or 212 wherein each shift amount of the at least one shifted dynamical-system event encodes a at least one bit of the communication data.
215. The apparatus of any one of examples 63 to 74, when dependent from example 200, wherein the identification of a dynamical-system event comprises identifications of the artificial neuron and the propagation stage associated with the dynamical-system event.
216. The apparatus of any one of examples 63 to 74, when directly or indirectly dependent from example 201, wherein the identification of a dynamical-system event comprises identifications of the node value and the propagation stage associated with the dynamical-system event.
217. The apparatus of any one of examples 142 to 216 wherein the at least one data-transmitting device is a single device.
218. The apparatus of any one of examples 142 to 217 wherein the at least one data-transmitting device comprises a mobile device.
219. The apparatus of any one of examples 142 to 217 wherein the at least one data-transmitting device comprises a telephone.
220. The apparatus of any one of examples 142 to 217 wherein the at least one data-transmitting device comprises a camera.
221. The apparatus of any one of examples 142 to 217 wherein the at least one data-transmitting device is a card.

222. The apparatus of any one of examples 142 to 217 wherein the at least one data-transmitting device comprises a data-transmitting medical device.
223. The apparatus of any one of examples 142 to 217 wherein the at least one data-transmitting device comprises a network node for a computer network.
224. The apparatus of any one of examples 142 to 217 wherein the at least one data-transmitting device comprises a router for a computer network.
225. The apparatus of any one of examples 142 to 217 wherein the at least one data-transmitting device comprises an artificial intelligence system.
226. The apparatus of example 225 wherein the at least one data-transmitting device comprises a machine learning system.
227. The apparatus of example 226 wherein the machine learning system comprises a trained machine learning system.
228. The apparatus of any one of examples 142 to 217 wherein the at least one data-transmitting device comprises a data collection device.
229. The apparatus of example 228 wherein the data collection device comprises a sensor.
230. The apparatus of any one of examples 142 to 229 wherein the at least one data-receiving device comprises a mobile device.
231. The apparatus of any one of examples 142 to 229 wherein the at least one data-receiving device comprises a telephone.
232. The apparatus of any one of examples 142 to 229 wherein the at least one data-receiving device comprises a network node for a computer network.
233. The apparatus of any one of examples 142 to 229 wherein the at least one data-receiving device comprises a router for a computer network.
234. The apparatus of any one of examples 142 to 231 wherein the at least one data-receiving device comprises a user computing device.
235. The apparatus of any one of examples 142 to 220 wherein the at least one data-transmitting device comprises a user computing device.
236. The apparatus of any one of examples 142 to 224 wherein the at least one data-receiving device comprises a server computing device.
237. The apparatus of any one of examples 142 to 232 wherein the at least one data-transmitting device comprises a server computing device.
238. The apparatus of any one of examples 142 to 237 wherein the at least one data-receiving device comprises a data-receiving medical device.
239. The apparatus of any one of examples 142 to 229 wherein the at least one data-receiving device comprises an artificial intelligence system.
240. The apparatus of example 239 wherein the at least one data-receiving device comprises a machine learning system.
241. The apparatus of example 240 wherein the machine learning system comprises a trained machine learning system.
242. The apparatus of any one of examples 142 to 229 wherein the at least one data-receiving device comprises a data-receiving principal device.
243. The apparatus of any one of examples 142 to 238 wherein the at least one data-transmitting device comprises a plurality of data-transmitting devices independent from each other and collectively implementing the data-transmission dynamical system.
244. The apparatus of any one of examples 142 to 242 wherein the at least one data-transmitting device and the at least one data-receiving device are configured to implement a machine-to-machine system.
245. The apparatus of any one of examples 142 to 244 wherein the at least one data-transmission signal comprises at least one radio signal.
246. The apparatus of any one of examples 142 to 245 wherein the at least one data-transmission signal comprises at least one optical signal displayed by the at least one data-transmitting device.
247. The apparatus of example 246 wherein the at least one optical signal comprises a QR code.
248. The apparatus of any one of examples 142 to 247 wherein the at least one data-transmitting device comprises at least one data-transmission processor circuit configured to simulate the data-transmission dynamical system.
249. The apparatus of example 248, when dependent from example 197, wherein the at least one data-transmission processor circuit comprises at least one computer-readable data-transmission memory storing the plurality of data-transmission weights.
250. The apparatus of example 249 wherein the plurality of data-transmission weights is encrypted in the at least one computer-readable data-transmission memory.
251. The apparatus of any one of examples 142 to 247 wherein the at least one data-transmitting device comprises at least one data-transmission circuit configured to implement directly the data-transmission dynamical system.
252. The apparatus of example 251 wherein the at least one data-transmission circuit comprises at least one data-transmission analog circuit.
253. The apparatus of example 252, when dependent from example 197, wherein the at least one data-transmission analog circuit comprises a plurality of resistors defining the plurality of data-transmission weights.
254. The apparatus of example 251 wherein the at least one data-transmission circuit comprises data-transmission configurable logic blocks.
255. The apparatus of example 254 wherein the at least one data-transmission circuit comprises a data-transmission FPGA comprising the data-transmission configurable logic blocks.
256. The apparatus of any one of examples 142 to 255 wherein the at least one data-receiving device comprises at least one data-receiving processor circuit configured to simulate the data-receiving dynamical system.
257. The apparatus of example 256, when dependent from example 197, wherein the at least one data-receiving processor circuit comprises at least one computer-readable data-receiving memory storing the plurality of data-receiving weights.
258. The apparatus of example 257 wherein the plurality of data-receiving weights is encrypted in the at least one computer-readable data-receiving memory.
259. The apparatus of any one of examples 142 to 255 wherein the at least one data-receiving device comprises at least one data-receiving circuit configured to implement directly the data-receiving dynamical system.
260. The apparatus of example 259 wherein the at least one data-receiving circuit comprises at least one data-receiving analog circuit.

261. The apparatus of example 260, when dependent from example 197, wherein the at least one data-receiving analog circuit comprises a plurality of resistors defining the plurality of data-receiving weights.

262. The apparatus of example 259 wherein the at least one data-receiving circuit comprises data-receiving configurable logic blocks.

263. The apparatus of example 262 wherein the at least one data-receiving circuit comprises a data-receiving FPGA comprising the data-receiving configurable logic blocks.

264. The apparatus of example 142 or 144, or of any one of examples 145 to 263 when directly or indirectly dependent from example 142 or 144, wherein the at least one data-receiving device is further configured to, at least, produce at least one output signal in response to at least comparing the at least some of the transmission data to the at least some output of the data-receiving dynamical system.

265. The apparatus of example 264, when directly or indirectly dependent from example 145, wherein the at least one output signal indicates, at least, whether authentication of the user was successful.

266. The apparatus of example 264, when directly or indirectly dependent from example 158 or 159, wherein the at least one output signal indicates, at least, that the document was authenticated.

267. The apparatus of example 264, when directly or indirectly dependent from any one of examples 169 to 177, wherein the at least one output signal indicates, at least, that the data was authenticated.

268. The apparatus of example 264, when directly or indirectly dependent from example 165 or 166, wherein the at least one output signal indicates, at least, at least some of the communication data.

269. The apparatus of any one of examples 142 to 242 wherein the at least one data-transmitting device and the at least one data-receiving device comprise a network of devices.

270. The apparatus of example 269 wherein at least one device in the network of devices comprises an artificial intelligence system.

271. The apparatus of example 270 wherein the artificial intelligence system comprises a machine learning system.

272. The apparatus of example 271 wherein the machine learning system comprises a trained machine learning system.

273. An apparatus for producing a cryptographic hash output, the apparatus comprising at least one device configured to, at least:
  receive at least one input signal encoding at least one input value, wherein the at least one device is configured to implement a dynamical system comprising a plurality of node values, each node value of the plurality of node values modifiable according to at least the at least one input value;
  identify at least a plurality of dynamical-system events, each event of the plurality of dynamical-system events associated with a respective node value of the plurality of node values and with a respective propagation stage of the dynamical system when the node value satisfied a discretizing criterion; and
  produce at least one output signal identifying at least the plurality of dynamical-system events.

274. The apparatus of example 273 wherein the dynamical system is defined at least in part by a plurality of weights, each weight of the plurality of weights defining at least part of an effect of a respective one of the at least one input value on a respective node value of the plurality of node values.

275. The apparatus of example 274 wherein the dynamical system is a spiking artificial neural network, each node value of the plurality of node values associated with a respective artificial neuron of a plurality of artificial neurons, each event of the plurality of dynamical-system events associated with a respective artificial neuron of the plurality of artificial neurons and with a respective propagation stage of the spiking artificial neural network when the respective artificial neuron satisfied a spiking criterion.

276. The apparatus of example 273, 274, or 275 wherein the at least one device is further configured to, at least, create a new entry in a ledger comprising a previously existing entry, wherein:
  the at least one input value comprises at least a portion of data from the previously existing entry; and
  the new entry comprises identifications of at least some of the plurality of dynamical-system events.

277. The apparatus of example 276 wherein the ledger is a public ledger.

278. The apparatus of example 277 wherein the public ledger is a blockchain.

279. The apparatus of any one of examples 276 to 278 wherein the at least one device is configured to recurse through the ledger.

280. The apparatus of example 279 wherein the at least one device is configured to recurse through the ledger to verify data corresponding to the input values.

281. The apparatus of example 279 or 280 wherein the at least one device is configured to recurse through the ledger to audit data corresponding to the input values.

The invention claimed is:

1. A data-transmission method comprising:
  causing at least one data-receiving device to receive at least one data-transmission signal from at least one data-transmitting device implementing a data-transmission dynamical system; and
  causing the at least one data-receiving device to compare
  (a) at least some of transmission data transmitted by the at least one data-transmission signal to
  (b) at least some output of a data-receiving dynamical system implemented by the at least one data-receiving device,
  wherein the data-transmission dynamical system comprises a data-transmission artificial neural network having a plurality of data-transmission node values associated with respective artificial neurons of a plurality of data-transmission artificial neurons of the data-transmission artificial neural network, each node value of the plurality of data-transmission node values modifiable according to at least one of a plurality of data-transmission input values,
  the data-receiving dynamical system comprises a data-receiving artificial neural network having a plurality of data-receiving node values associated with respective artificial neurons of a plurality of data-receiving artificial neurons of the data-receiving artificial neural network, each node value of the plurality of data-receiving node values modifiable according to at least one of a plurality of data-receiving input values,
  wherein the data-transmission dynamical system is defined at least in part by a plurality of data-transmission weights, each weight of the plurality of data-transmission weights defining at least part of an effect of a respective one of the plurality of data-transmission input values on a respective node value of the plurality of data-transmission node values, wherein the data-receiving dynamical system is defined at least in part by a plurality of data-receiving weights, each weight of the plurality of data-receiving weights defining at least part of an effect of a respective one of the plurality of data-receiving input values on a respective node value of the plurality of data-receiving node values, and wherein the plurality of data-transmission weights remain constant during implementation of the data-transmission dynamical system, and the plurality of data-receiving weights remain constant during implementation of the data-receiving dynamical system.

2. A data-transmission method comprising:

causing at least one data-transmitting device to generate transmission data according to, at least, at least some output of a data-transmission dynamical system implemented by the at least one data-transmitting device; and causing the at least one data-transmitting device to transmit, to at least one data-receiving device implementing a data-receiving dynamical system, at least one data-transmission signal transmitting at least the transmission data, wherein said causing the at least one data-transmitting device to generate the transmission data comprises causing the at least one data-transmitting device to encrypt communication data to be transmitted from the at least one data-transmitting device to the at least one data-receiving device by, at least, modifying the at least some output of the data-transmission dynamical system according to the communication data to create differences between the at least some output of the data-transmission dynamical system and the transmission data.

3. The method of claim 2, further comprising causing the at least one data-receiving device to compare (a) at least some of the transmission data to (b) at least some output of the data-receiving dynamical system.

4. The method of claim 2, wherein:

the data-transmission dynamical system, when implemented, identifies a plurality of data-transmission dynamical-system events, each event of the plurality of data-transmission dynamical-system events associated with the data-transmission dynamical system satisfying a data-transmission discretizing criterion;

the data-receiving dynamical system, when implemented, identifies a plurality of data-receiving dynamical-system events, each event of the plurality of data-receiving dynamical-system events associated with the data-receiving dynamical system satisfying a data-receiving discretizing criterion;

the transmission data identify at least some dynamical-system events; and the output of the data-transmission dynamical system comprises identifications of at least some of the plurality of data-transmission dynamical-system events.

5. The method of claim 4, wherein:

causing the at least one data-transmitting device to generate the transmission data comprises causing the at least one data-transmitting device to encrypt communication data to be transmitted from the at least one data-transmitting device to the at least one data-receiving device by, at least, modifying the at least some output of the data-transmission dynamical system according to the communication data to create differences between the at least some output of the data-transmission dynamical system and the transmission data; and the differences between the at least some output of the data-transmission dynamical system and the transmission data comprise differences between the at least some of the plurality of data-transmission dynamical-system events and the dynamical-system events identified by the transmission data.

6. The method of claim 5, wherein the differences comprise at least one added dynamical-system event added to the dynamical-system events identified by the transmission data, at least one omitted dynamical-system event omitted from the dynamical-system events identified by the transmission data, or at least one shifted dynamical-system event, each shifted dynamical system of the at least one shifted dynamical-system event shifted to a respective different propagation stage by a respective shift amount.

7. A data-transmission apparatus comprising at least one data-receiving device configured to, at least:

receive at least one data-transmission signal from at least one data-transmitting device configured to implement a data-transmission dynamical system; and compare (a) at least some of transmission data transmitted by the at least one data-transmission signal to (b) at least some output of a data-receiving dynamical system implemented by the at least one data-receiving device wherein the data-transmission dynamical system comprises a data-transmission artificial neural network having a plurality of data-transmission node values associated with respective artificial neurons of a plurality of data-transmission artificial neurons of the data-transmission artificial neural network, each node value of the plurality of data-transmission node values modifiable according to at least one of a plurality of data-transmission input values, wherein the data-receiving dynamical system comprises a data-receiving artificial neural network having a plurality of data-receiving node values associated with respective artificial neurons of a plurality of data-receiving artificial neurons of the data-receiving artificial neural network, each node value of the plurality of data-receiving node values modifiable according to at least one of a plurality of data-receiving input values, wherein the data-transmission dynamical system is defined at least in part by a plurality of data-transmission weights, each weight of the plurality of data-transmission weights defining at least part of an effect of a respective one of the plurality of data-transmission input values on a respective node value of the plurality of data-transmission node values, wherein the data-receiving dynamical system is defined at least in part by a plurality of data-receiving weights, each weight of the plurality of data-receiving weights defining at least part of an effect of a respective one of the plurality of data-receiving input values on a respective node value of the plurality of data-receiving node values, and wherein the plurality of data-transmission weights remain constant during implementation of the data-transmission dynamical system, and the plurality of data-receiving weights remain constant during implementation of the data-receiving dynamical system.

8. An apparatus for transmitting data, the apparatus comprising:
a processor;
a non-transitory storage medium operatively connected to the processor, the non-transitory storage medium comprising computer-readable instructions;
the processor, upon executing the instructions, being configured for:
generating transmission data according to, at least, at least some output of a data-transmission dynamical system implemented by the apparatus; and
transmitting, to at least one data-receiving device implementing a data-receiving dynamical system, at least one data-transmission signal transmitting at least the transmission data,
wherein said generating the transmission data comprises encrypting communication data to be transmitted from the apparatus to the at least one data-receiving device by, at least, modifying the at least some output of the data-transmission dynamical system according to the communication data to create differences between the at least some output of the data-transmission dynamical system and the transmission data.

9. The apparatus of claim 8, wherein the processor is further configured to compare
(a) at least some of the transmission data to
(b) at least some output of the data-receiving dynamical system.

10. The apparatus of claim 8, wherein:
the data-transmission dynamical system, when implemented, identifies a plurality of data-transmission dynamical-system events, each event of the plurality of data-transmission dynamical-system events associated with the data-transmission dynamical system satisfying a data-transmission discretizing criterion;
the data-receiving dynamical system, when implemented, identifies a plurality of data-receiving dynamical-system events, each event of the plurality of data-receiving dynamical-system events associated with the data-receiving dynamical system satisfying a data-receiving discretizing criterion;
the transmission data identify at least some dynamical-system events; and
the output of the data-transmission dynamical system comprises identifications of at least some of the plurality of data-transmission dynamical-system events.

11. An apparatus for authenticating a device, the apparatus comprising:
a processor;
a non-transitory storage medium operatively connected to the processor, the non-transitory storage medium comprising computer-readable instructions;
the processor, upon executing the instructions, being configured for:
receiving, from the device, first spike data about a given spike generated by the dynamical system of the device, the first spike data comprising an identification of a given artificial neuron and a given time at which the given spike was generated by the given artificial neuron;
comparing the first spike data to predetermined spike data each comprising a respective identification of a particular artificial neuron and a respective time at which the particular spike was generated by the particular artificial neuron using the dynamical system; and
when a given one of the predetermined spike data matches the first spike data, authenticating the device.

12. A computer-implemented method for authenticating a device, the method being executed by at least one processor, the method comprising:
receiving, from the device, first spike data about a given spike generated by the dynamical system of the device, the first spike data comprising an identification of a given artificial neuron and a given time at which the given spike was generated by the given artificial neuron;
comparing the first spike data to predetermined spike data each comprising a respective identification of a particular artificial neuron and a respective time at which the particular spike was generated by the particular artificial neuron using the dynamical system; and
when a given one of the predetermined spike data matches the first spike data, authenticating the device.

13. An apparatus for authenticating a device, the apparatus comprising:
a processor;
a non-transitory storage medium operatively connected to the processor, the non-transitory storage medium comprising computer-readable instructions;
the processor, upon executing the instructions, being configured for:
receiving transmission data from a data-transmitting device implementing a first dynamical system;
comparing the received transmission data to an output of a second dynamical system implemented by the apparatus, thereby obtaining a comparison result, the second dynamical system being identical to the first dynamical system; and
authenticating the data-transmitting device based on the comparison result.

14. The apparatus of claim 13, wherein the processor is further configured for:
transmitting to the data-transmitting device initial state data, the transmission data being generated by the first dynamical system based on the initial state data and the output of the second dynamical system being generated by the initial state data.

15. The apparatus of claim 13, wherein the data-transmitting device is authenticated when the received transmission data corresponds to the output of the second dynamical system.

16. The apparatus of claim 13, wherein said comparing comprises identifying differences between the received transmission data and the output of the second dynamical system to obtain communication data encrypted in the transmission data, said authenticating being performed based on the communication data.

17. The apparatus of claim 13, wherein the processor is further configured for modifying the received transmission data to obtain modified transmission data, said comparing comprising comparing the modified transmission data to the output of the second dynamical system.

18. The apparatus of claim 13, wherein:
said receiving transmission data comprises receiving, from the data-transmitting device, first spike data about at least one given spike generated by the first dynamical system, the at least one given first spike data comprising an identification of at least one given artificial neuron and at least one given time at which the at least one given spike was generated by the at least one given artificial neuron;
said comparing the received transmission data comprises comparing the first spike data to second spike data comprising a respective identification of at least one particular artificial neuron and at least one respective time at which at least one particular spike was generated by the at least one particular artificial neuron of the second dynamical system, thereby obtaining the comparison result.

19. The apparatus of claim 18, wherein the processor is further configured for:
transmitting to the data-transmitting device initial state data, the first spike data being generated by the first dynamical system based on the initial state data and the second spike data being generated by the second dynamical system based on the initial state data, the initial state data comprising initial node values and initial input values.

20. The apparatus of claim 18, wherein said comparing comprises identifying differences between the first spike data and the second spike data to obtain communication data, said authenticating being performed based on the communication data.

21. The apparatus of claim 13, wherein:
said generating the transmission data comprises encrypting communication data to be transmitted to the at least one data-receiving device by, at least, modifying the at least some output of the data-transmission dynamical system according to the communication data to create differences between the at least some output of the data-transmission dynamical system and the transmission data; and
the differences between the at least some output of the data-transmission dynamical system and the transmission data comprise differences between the at least some of the plurality of data-transmission dynamical-system events and the dynamical-system events identified by the transmission data.

22. The apparatus of claim 14, wherein the differences comprise at least one added dynamical-system event added to the dynamical-system events identified by the transmission data, at least one omitted dynamical-system event omitted from the dynamical-system events identified by the transmission data, or at least one shifted dynamical-system event, each shifted dynamical system of the at least one shifted dynamical-system event shifted to a respective different propagation stage by a respective shift amount.

23. A computer-implemented method for authenticating a device, the method being executed by at least one processor, the method comprising:
receiving transmission data from a data-transmitting device implementing a first dynamical system;
comparing the received transmission data to an output of a second dynamical system implemented by the apparatus, thereby obtaining a comparison result, the second dynamical system being identical to the first dynamical system; and
authenticating the data-transmitting device based on the comparison result.

24. The computer-implemented method of claim 23, further comprising:
transmitting to the data-transmitting device initial state data, the transmission data being generated by the first dynamical system based on the initial state data and the output of the second dynamical system being generated by the initial state data.

25. The computer-implemented method of claim 23, wherein the data-transmitting device is authenticated when the received transmission data corresponds to the output of the second dynamical system.

26. The computer-implemented method of claim 23, wherein said comparing comprises identifying differences between the received transmission data and the output of the second dynamical system to obtain communication data encrypted in the transmission data, said authenticating being performed based on the communication data.

27. The computer-implemented method of claim 23, wherein the processor is further configured for modifying the received transmission data to obtain modified transmission data, said comparing comprising comparing the modified transmission data to the output of the second dynamical system.

28. The computer-implemented method of claim 23, wherein:
said receiving transmission data comprises receiving, from the data-transmitting device, first spike data about at least one given spike generated by the first dynamical system, the at least one given first spike data comprising an identification of at least one given artificial neuron and at least one given time at which the at least one given spike was generated by the at least one given artificial neuron;
said comparing the received transmission data comprises comparing the first spike data to second spike data comprising a respective identification of at least one particular artificial neuron and at least one respective time at which at least one particular spike was generated by the at least one particular artificial neuron of the second dynamical system, thereby obtaining the comparison result.

29. The computer-implemented method of claim 28, wherein said comparing comprises identifying differences between the first spike data and the second spike data to obtain communication data, said authenticating being performed based on the communication data.

* * * * *